US008370373B2

(12) United States Patent
Yamamoto

(10) Patent No.: US 8,370,373 B2
(45) Date of Patent: Feb. 5, 2013

(54) DOCUMENT PROCESSING SYSTEM AND CONTROL METHOD THEREOF, PROGRAM, AND STORAGE MEDIUM

(75) Inventor: Masahito Yamamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 230 days.

(21) Appl. No.: 12/562,063

(22) Filed: Sep. 17, 2009

(65) Prior Publication Data
US 2010/0082709 A1 Apr. 1, 2010

(30) Foreign Application Priority Data

Oct. 1, 2008 (JP) ................................ 2008-256639

(51) Int. Cl.
G06F 7/00 (2006.01)
G06F 17/30 (2006.01)
(52) U.S. Cl. ......... 707/758; 707/795; 707/812; 707/915
(58) Field of Classification Search .................. 707/758, 707/795, 812, 915
See application file for complete search history.

(56) References Cited

U.S. PATENT DOCUMENTS

| 6,035,308 | A | 3/2000 | Yano et al. | |
|---|---|---|---|---|
| 6,061,150 | A | 5/2000 | Yamamoto | |
| 6,061,478 | A * | 5/2000 | Kanoh et al. | 382/305 |
| 6,285,999 | B1 | 9/2001 | Page | |
| 6,424,429 | B1 | 7/2002 | Takahashi et al. | |
| 7,017,816 | B2 * | 3/2006 | Yen et al. | 235/462.25 |
| 7,734,654 | B2 * | 6/2010 | Carro | 707/795 |
| 2002/0111960 | A1 * | 8/2002 | Irons et al. | 707/204 |
| 2004/0220962 | A1 * | 11/2004 | Kaneda | 707/102 |
| 2005/0067496 | A1 * | 3/2005 | Yen et al. | 235/462.08 |
| 2005/0086224 | A1 * | 4/2005 | Franciosa et al. | 707/6 |
| 2005/0160115 | A1 * | 7/2005 | Starkweather | 707/104.1 |
| 2006/0016321 | A1 * | 1/2006 | Hsieh et al. | 84/602 |
| 2006/0044635 | A1 * | 3/2006 | Suzuki et al. | 358/527 |
| 2007/0043744 | A1 * | 2/2007 | Carro | 707/100 |
| 2007/0076249 | A1 | 4/2007 | Emori et al. | |

(Continued)

FOREIGN PATENT DOCUMENTS

JP 7296140 A 11/1995
JP 9091301 A 4/1997

(Continued)

OTHER PUBLICATIONS

Page et al, The PageRank Citation Ranking: Bringing Order to the Web', 1998, http://www-db.stanford.edu/~backrub/pageranksub.ps.

(Continued)

Primary Examiner — Phong Nguyen
(74) Attorney, Agent, or Firm — Fitzpatrick, Cella, Harper & Scinto

(57) ABSTRACT

This invention is directed to a document processing system and control method thereof. The system stores a plurality of items of document data each containing metadata pertaining to the contents of each item of document data, and relation information representing the relations between the plurality of items of document data. When scanned image data or facsimile-received image data is input, document data related to the input image data is specified among the plurality of items of stored document data, based on the metadata contained in each item of document data. Relation information representing the relation between the input image data and the specified related document data is stored. Even document data obtained from a paper document is able to be stored as document data subjected to search processing.

8 Claims, 34 Drawing Sheets

U.S. PATENT DOCUMENTS

| | | | |
|---|---|---|---|
| 2007/0127043 A1* | 6/2007 | Maekawa | 358/1.9 |
| 2008/0069450 A1* | 3/2008 | Minami et al. | 382/199 |
| 2008/0178120 A1 | 7/2008 | Yamamoto | |
| 2008/0219560 A1* | 9/2008 | Morimoto et al. | 382/195 |
| 2009/0154778 A1* | 6/2009 | Lei et al. | 382/112 |

FOREIGN PATENT DOCUMENTS

| | | |
|---|---|---|
| JP | 11143908 A | 5/1999 |
| JP | 3486452 B2 | 1/2004 |
| JP | 2004078735 A | 3/2004 |
| JP | 2005275847 A | 10/2005 |
| JP | 2007122685 A | 5/2007 |

OTHER PUBLICATIONS

U.S. Appl. No. 12/562,042, filed Sep. 17, 2009 by Masahito Yamamoto.

Japanese Office Action dated Aug. 6, 2012 in corresponding Japanese Application No. 2008-256639.

* cited by examiner

FIG. 13

| RELATION ID | REFERENCE SOURCE DOCUMENT ID | REFERENCE DESTINATION DOCUMENT ID | RELATION TYPE | DEGREE OF RELATION |
|---|---|---|---|---|
| r1 | d1 | ... | DOCUMENT MATCH (OLD EDITION) | 1 |
| r1 | ... | d1 | DOCUMENT MATCH (NEW EDITION) | 1 |
| r2 | d2 | d4 | MANUAL RELATING (REFERENCE DESTINATION) | 1 |
| r2 | d4 | d2 | MANUAL RELATING (REFERENCE SOURCE) | 1 |
| r3 | d1 | d3 | AUTHOR MATCH | 1 |
| r3 | d3 | d1 | AUTHOR MATCH | 1 |
| r4 | d4 | d5 | INCLUSION (INCLUDED) | 1 |
| r4 | d5 | d4 | INCLUSION (INCLUDING) | 1 |
| r5 | d7 | ... | CREATION DATE MATCH | 1 |
| r5 | ... | d7 | CREATION DATE MATCH | 1 |
| r6 | d6 | d7 | TAG MATCH | 1 |
| r6 | d7 | d6 | TAG MATCH | 1 |
| r7 | d7 | d8 | SIMILAR DOCUMENT CONTENT DATA | 1 |
| r7 | d8 | d7 | SIMILAR DOCUMENT CONTENT DATA | 1 |
| r8 | d8 | d9 | SAME JOB PROCESSING TARGET | 1 |
| r8 | d9 | d8 | SAME JOB PROCESSING TARGET | 1 |
| r9 | d2 | d10 | TAG MATCH | 1 |
| r9 | d10 | d2 | TAG MATCH | 1 |
| r10 | d5 | d10 | DOCUMENT MATCH (NEW EDITION) | 1 |
| r10 | d10 | d5 | DOCUMENT MATCH (OLD EDITION) | 1 |
| r11 | d5 | d11 | SIMILAR IMAGE (RE-DIGITIZED INPUT) | 0.6 |
| r11 | d11 | d5 | SIMILAR IMAGE (ONLINE) | 0.6 |
| r12 | d9 | d11 | MEDIUM ID MATCH (RE-DIGITIZED INPUT) | 0.9 |
| r12 | d11 | d9 | MEDIUM ID MATCH (ONLINE) | 0.9 |

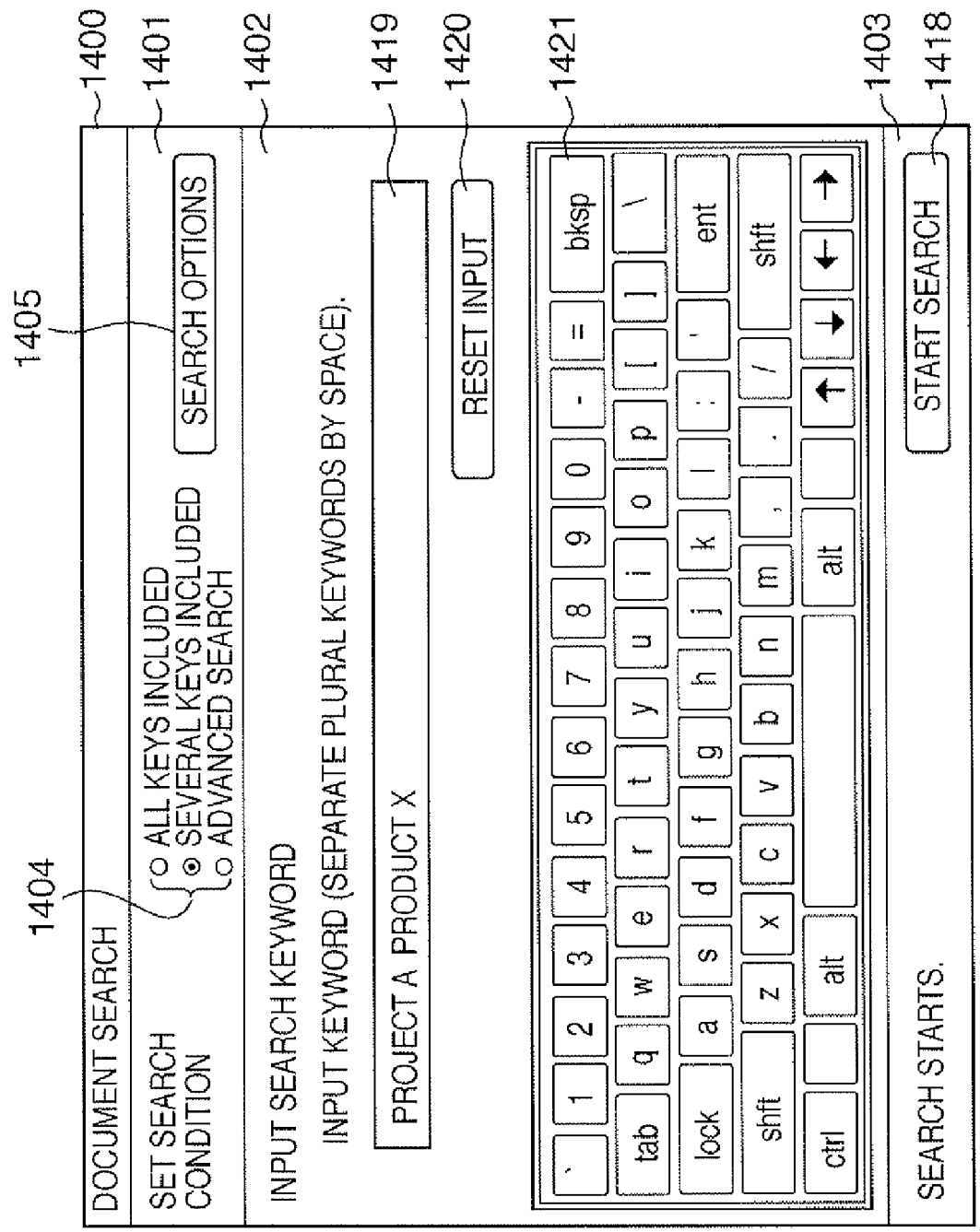

F I G. 28A

| RELATION ID | REFERENCE SOURCE DOCUMENT ID | REFERENCE DESTINATION DOCUMENT ID | RELATION TYPE | PROPAGATION OF RANK |
|---|---|---|---|---|
| r1 | d1 | ... | MANUAL RELATING (REFERENCE SOURCE) | 0 |
| r1 | ... | d1 | MANUAL RELATING (REFERENCE DESTINATION) | 1 |
| r2 | d1 | ... | INCLUSION (INCLUDING) | 0 |
| r2 | ... | d1 | INCLUSION (INCLUDED) | 1 |
| r3 | d1 | ... | SAME PART SHARED (CITING) | 0 |
| r3 | ... | d1 | SAME PART SHARED (CITED) | 1 |
| r4 | d2 | ... | SAME PART SHARED (LOW DENSITY) | 0 |
| r4 | ... | d2 | SAME PART SHARED (HIGH DENSITY) | 1 |
| r5 | d2 | ... | NEW AND OLD EDITIONS OF SAME DOCUMENT (NEW EDITION) | 1 |
| r5 | ... | d2 | NEW AND OLD EDITIONS OF SAME DOCUMENT (OLD EDITION) | 0 |
| r6 | d2 | ... | MANUAL RELATING (REFERENCE DESTINATION) | 1 |
| r6 | ... | d2 | MANUAL RELATING (REFERENCE SOURCE) | 0 |
| r7 | d2 | ... | INCLUSION (INCLUDED) | 1 |
| r7 | ... | d2 | INCLUSION (INCLUDING) | 0 |
| r8 | d1 | d3 | SAME JOB PROCESSING TARGET | 1 |
| r8 | d3 | d1 | SAME JOB PROCESSING TARGET | 1 |
| r9 | d3 | ... | SAME PART SHARED (CITED) | 1 |
| r9 | ... | d3 | SAME PART SHARED (CITING) | 0 |

FIG. 28B

| | | | |
|---|---|---|---|
| r10 | d3 | ... | |
| r10 | ... | SAME PART SHARED (HIGH DENSITY) | 1 |
| r10 | d3 | SAME PART SHARED (LOW DENSITY) | 0 |
| r11 | d3 | NEW AND OLD EDITIONS OF SAME DOCUMENT (NEW EDITION) | 1 |
| r11 | d4 | NEW AND OLD EDITIONS OF SAME DOCUMENT (OLD EDITION) | 0 |
| r12 | d4 | MANUAL RELATING (REFERENCE DESTINATION) | 1 |
| r12 | d5 | MANUAL RELATING (REFERENCE SOURCE) | 0 |
| ... | ... | ... | ... |
| r100 | d2 | SIMILAR IMAGE | 1 |
| r100 | d10 | SIMILAR IMAGE | 1 |
| r101 | d5 | SAME CONTENT SHARED (HIGH DENSITY) | 1 |
| r101 | d10 | SAME CONTENT SHARED (LOW DENSITY) | 0 |
| r102 | d5 | INCLUSION (INCLUDED) | 1 |
| r102 | d11 | INCLUSION (INCLUDING) | 0 |
| r103 | d9 | MEDIUM ID MATCH | 1 |
| r103 | d11 | MEDIUM ID MATCH | 1 |

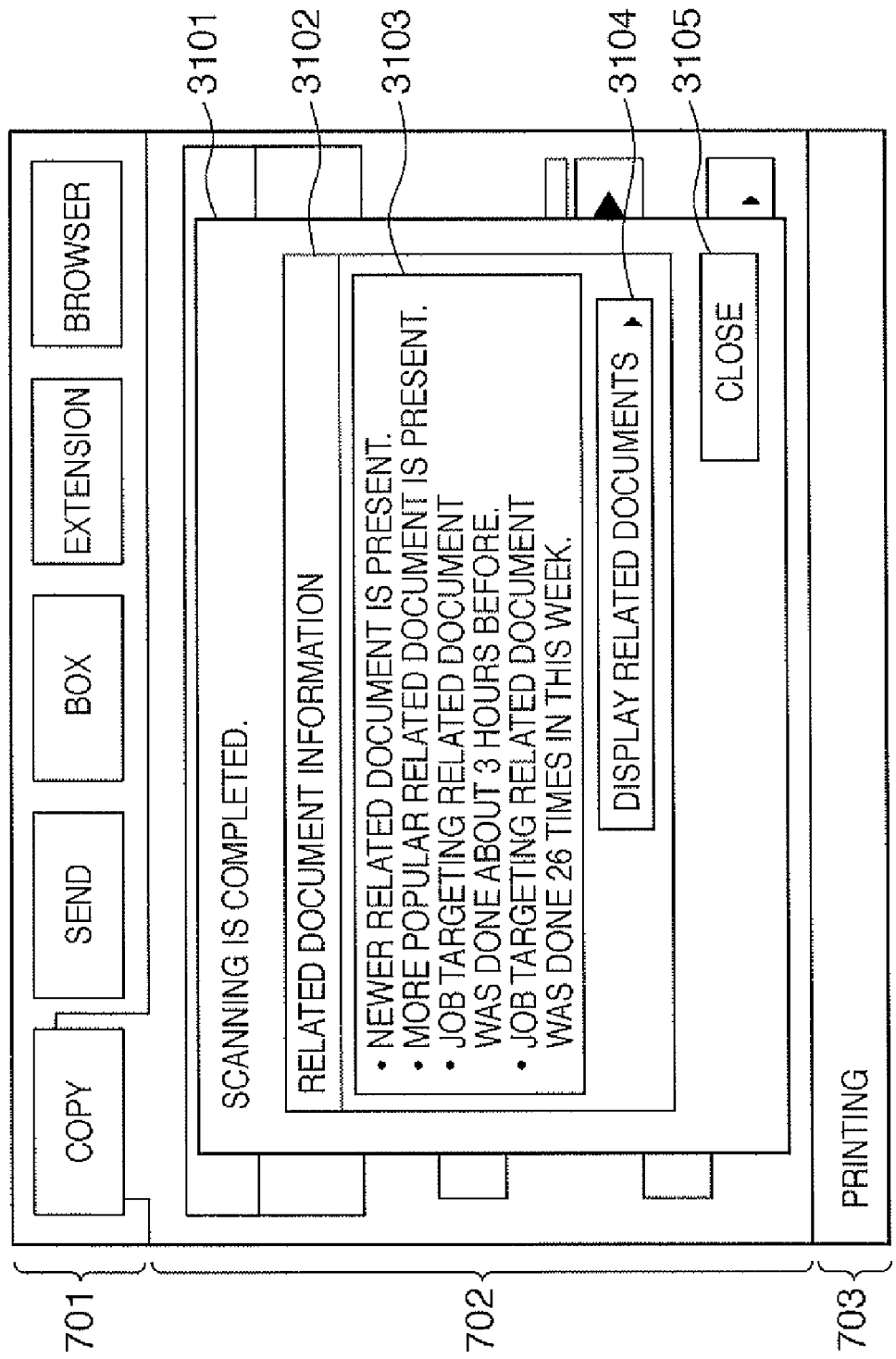

DOCUMENT PROCESSING SYSTEM AND CONTROL METHOD THEREOF, PROGRAM, AND STORAGE MEDIUM

BACKGROUND OF THE INVENTION

1. Field of the Invention

The present invention relates to a document processing system which stores a plurality of items of document data and relation information representing the relations between the items of document data, a control method thereof, a program, and a storage medium.

2. Description of the Related Art

Advanced storage techniques that require low costs enable accumulation and management of a larger amount of document data than was impossible using conventional techniques. File servers, document management systems and groupware for implementing such functions have prevailed; progress continues on information processing apparatuses such as PCs; and various devices including a copying machine, printer, image scanner, facsimile apparatus, digital camera, document storage, and MFP (Multi-Function Peripheral) having image transmission and reception functions can now connected to a network. In a network environment on the customer side, a large amount of document data is exchanged between information processing apparatuses and various office machines. A storage infrastructure is coming into practical use capable of proactively storing document traffic distributed throughout an office network.

An example of such a storage infrastructure is a multi-function image processing apparatus disclosed in Japanese Patent No. 3486452 (reference 1). The image processing apparatus connects at least two image output apparatuses in order to provide a multi-function image processing apparatus which reliably makes a copy of a necessary image without troubling a user. This apparatus monitors the processing parameters of an image processing job, and determines whether an activated job satisfies a predetermined condition. When a job determined to satisfy the condition is executed, the apparatus sends image data to an original output destination and to another image output apparatus (e.g., an image file). One goal of this storage infrastructure is to audit security in order to prevent leakage of confidential information. The storage infrastructure also has a purpose of efficiently reusing existing assets by minimizing the re-execution of document processing similar to that already performed.

A storage infrastructure which proactively stores document traffic distributed throughout an office network stores document content data and also various types of additional information, that is, metadata related to documents. For example, relation information between two documents, and history information on the lifecycle of a document are stored as metadata in association with a given document. Examples of related documents are grouped documents belonging to the same category, documents of old and revised editions, application data and a snapshot document created while in printing, similar documents, documents containing the same page, and documents containing similar images. Metadata pertaining to the lifecycle of a document includes, for example, information on the contents of processing executed for the document, parameters, time, apparatus used, location, and the operator of the processing.

Japanese Patent Laid-Open No. 2004-78735 (reference 2) discloses a filing system which implements some document management functions in a document-handling apparatus (e.g., a printer, scanner, copying machine, FAX, projector, or digital camera). Every time the system handles a document, it transmits the document information to a document management server together with additional information on a person concerned who handled the document.

In the field of electronic document data files, a file format is used to express metadata associated with document content data in relation to document data. According to OpenDocument Format (ISO/IEC 26300) and Office Open XML (Ecma-376), the document file format contains a metadata representation by an XML document.

Japanese Patent Laid-Open No. 09-91301 (reference 3) discloses a document information management system which builds the continuity and relation of information between the digital world of a computer and a paper document. According to this technique, a paper document is embedded in the document information management system in the digital world. The system allows directly accessing the digital world via a paper document. Further, the system implements a hypertext using a paper document. The system adds selection information to description information recorded at an arbitrary position on paper to search for and output a desired relation information file (electronized document). Paper also records link information for searching for the relation information file.

A technique well known as PageRank® is described in U.S. Pat. No. 6,285,999 (reference 5) and Lawrence Page, Sergey Brin, Rajeev Motwani, Terry Winograd, in "The PageRank Citation Ranking: Bringing Order to the Web", 1998, http://www-db.stanford.edu/~backrub/pageranksub.ps (reference 6). This technique exploits the vast link structure of the Web. A link from one page to another is regarded as a supporting vote, and the importance of the page is determined from this "poll"; that is, from the sum of all votes. At this time, not only the given poll, that is, the link count on the page is taken into consideration, but also the page that cast a given vote is analyzed. A vote cast by a page of higher "importance" is evaluated more highly, and the given page is regarded to as more "important".

The volume of stored documents that are considered critical office resources is expected to greatly increase. Creation and processing of documents are basic office tasks, and the document growth capacity is ever increasing. It is difficult to organize a large number of dynamically accumulated documents in a tree structure classification such as by category. An improved method is required for efficient searching for a desired document among many accumulated and unorganized documents. As such a search method, in addition to Internet search services, full text search and content search within an office network (also known as an enterprise search), are becoming popular.

To efficiently search for a desired document among a large number of accumulated documents, it is important to use document data, a variety of metadata associated with the document, as well as relations with other documents. A more advanced and practical search function can be provided if metadata reflecting a user activity in the office, such as processing executed for a document by a user, can be used as a key for search.

Applicability will be widely expanded by setting a plurality of documents and metadata as nodes, and exploiting a semantic network formed by the relations between documents and relations between metadata as a kind of knowledge representation. The network of documents and metadata is usable for so-called data mining and business intelligence upon classification, analysis, and modification. The network expresses a document and the action of an office worker in association with the document. A so-called "Wisdom of Crowds" or "Collective Intelligence" can be derived and exploited by integrating the network by statistical processing. Note that the "Wisdom of Crowds" has received attention as a factor which features the trend of "Web 2.0" in the Internet. An application of the "Wisdom of Crowds" to even an intranet is expected to greatly increase the productivity of an office as a whole.

However, once printed on paper or facsimile-sent, an online document electronically linked to the semantic network or an electronic document of a file format containing metadata loses its metadata and relation data to other documents. That is, a document offline in the network such as a paper document or facsimile document is disconnected from metadata and a semantically related network.

According to reference 4 described above, link information is recorded on paper to search for a relation information file in the digital world. However, in processing such as paper scanning or facsimile reception, an offline document and metadata associated with the processing cannot be linked again to an online semantic network. In other words, an online document in a storage infrastructure and a paper document having undergone the processing (and metadata associated with the processing) cannot be accumulated and managed in association with each other.

SUMMARY OF THE INVENTION

An aspect of the present invention is to eliminate the above-mentioned problems with the conventional technology.

It is an object of the present invention to provide a technique of relating input image data and document data related to the input image data among a plurality of items of document data stored in a storage unit.

According to an aspect of the present invention, there is provided a document processing system comprises a storage unit that stores a plurality of items of document data, each containing metadata pertaining to a content of each item of document data, and relation information representing relations between the plurality of items of document data; an input unit that inputs image data; a related document specifying unit that specifies document data related to the image data input by the input unit among the plurality of items of document data stored in the storage unit, based on the metadata contained in each item of document data; and a control unit that controls the storage unit to store relation information representing a relation between the image data input by the input unit and the related document data specified by the related document specifying unit.

According to an aspect of the present invention, there is provided a method of controlling a document processing system having a storage unit which stores a plurality of items of document data, each containing metadata pertaining to a content of each item of document data, and relation information representing relations between the plurality of items of document data, the method comprising the steps of: inputting image data; specifying document data related to the image data input in the inputting step among the plurality of items of document data stored in the storage unit, based on the metadata contained in each item of document data; and controlling the storage unit to store relation information representing a relation between the image data input in the inputting step and the related document data specified in the specifying step.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 depicts a view describing an example of a data representation using a table structure to represent relation information recorded in the instances of relation records according to the first embodiment;

FIGS. 24A and 24B depict views describing examples in which a re-digitized input document having metadata propagated via a plurality of estimated relations is hit high in search results in the second embodiment;

FIGS. 28A and 28B depict views illustrating examples of a data representation using a table structure to represent relation information accompanied by propagation of document ranks recorded in the instances of relation records by a document search application according to the third embodiment;

FIG. 31 depicts a view describing an example of a window for displaying and manipulating information on a document related to an input document displayed on the console unit of an image processing apparatus according to the fourth embodiment.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
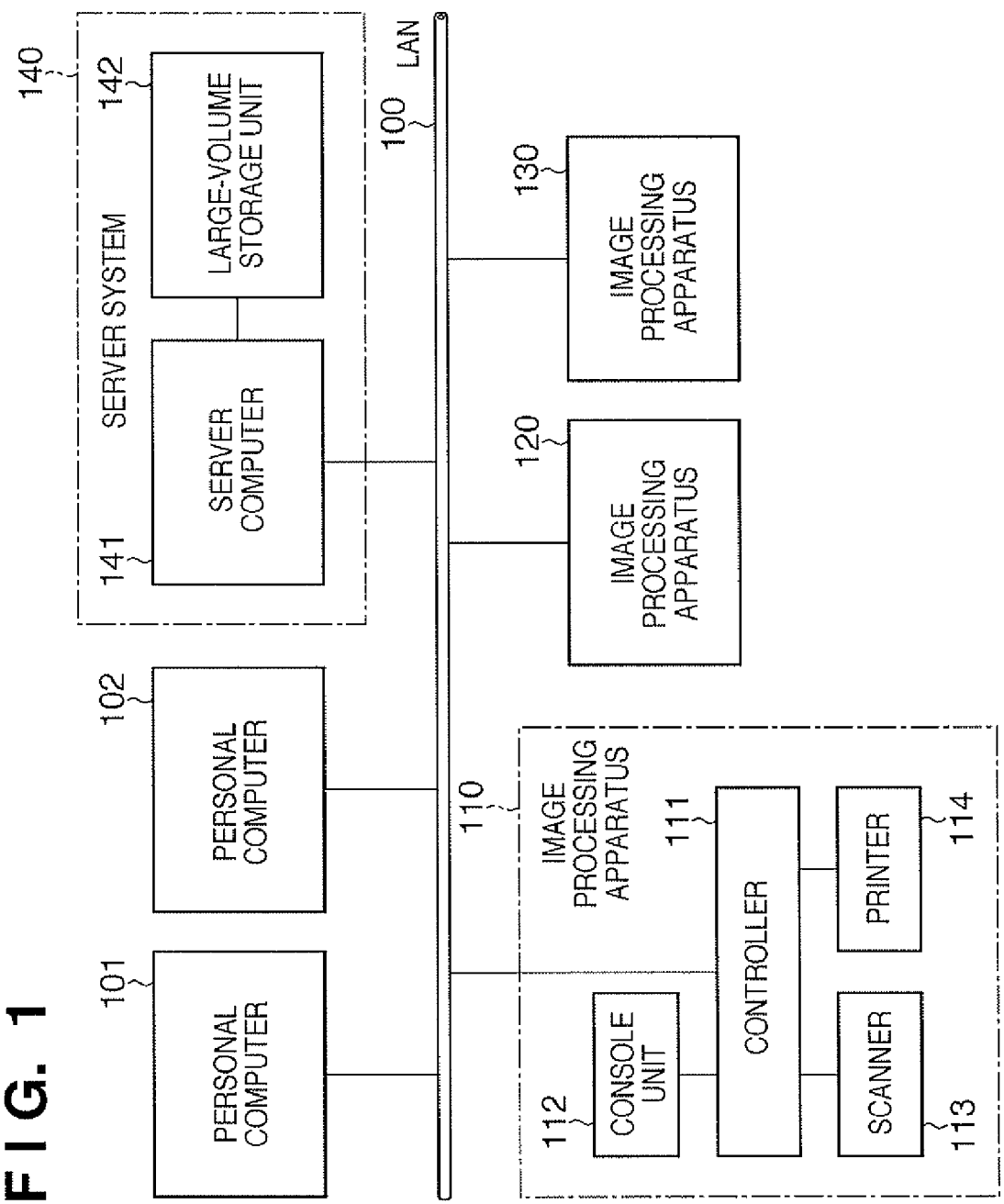
FIG. 1 is a block diagram illustrating the overall configuration of a document processing system according to an exemplary embodiment of the present invention.

FIG. 1 is a block diagram describing the overall configuration of a document processing system according to an embodiment of the present invention.

The document processing system includes image processing apparatuses 110, 120, and 130, personal computers (information processing apparatuses) 101 and 102, and a server system 140, which are connected to each other via a network. The network is formed from, for example, a LAN (Local Area Network) 100. The image processing apparatuses 110, 120, and 130 can be applicable as document processing apparatuses, but will be referred to as image processing apparatuses.

The image processing apparatus 110 includes a scanner 113 serving as an image input device, a printer 114 serving as an image output device, a controller 111, and a console unit 112 serving as a user interface. The scanner 113, printer 114, and console unit 112 are connected to the controller 111, and controlled based on instructions from the controller 111. The controller 111 is connected to the LAN 100. The image processing apparatuses 120 and 130 have the same arrangement as that of the image processing apparatus 110, and a description thereof will not be repeated.

The personal computers 101 and 102 are information processing apparatuses mainly used personally by respective users, and store application programs used by users, user data, and the like. The server system 140 includes a server computer 141 and large-volume storage unit 142. The server computer 141 stores server applications which provide services to a plurality of users and client systems, shared data, and the like. The large-volume storage unit 142 is a high-performance large-volume secondary storage unit with high reliability, and stores data of a database management system (DBMS) mainly running on the server computer 141. The operation of the document processing system will be explained by referring to the image processing apparatus 110 and personal computer 101. However, another image processing apparatus and personal computer can also execute the same processing.

One of server applications serviced by the server system 140 is a database (DB) application which archives (i.e., accumulates and manages) a job document distributed through the LAN 100. The DB application will be called a job archive application. The job archive application forms a distributed application called a job archive system in cooperation with software programs respectively installed in other apparatuses connected to the LAN 100.

The personal computer 101 cooperates with the image processing apparatuses 110, 120, and 130, and the server system 140 via the LAN 100. For example, the personal computer 101 transmits document data to the image processing apparatus 110 or receives document data from the image processing apparatus 110 to print, scan, or facsimile-send/receive it. The personal computer 101 executes a job to, for example, accumulate document data in a box (a document management system incorporated in the image processing apparatus 110) or read document data out from the box. When executing a job to process document data on the network, the job archive application running on the server system 140 archives a copy of job information and a copy of document data to be processed by the job. For example, for a print job, the printer driver of the personal computer 101 supplies a job to the image processing apparatus 110, and also transmits information on the job and document data to be processed to the server system 140 to archive them.

The image processing apparatus 110 cooperates with the image processing apparatuses 120 and 130, the personal computers 101 and 102, and the server system 140 via the LAN 100. For example, the image processing apparatus 110 executes a job to scan a document image, convert it into digital data, and transmit the digital data to another apparatus, or a job to retrieve data held in another apparatus, and print it, accumulate it in a box, or transfer it to another apparatus. Also when executing such a job to process document data, the job archive application running on the server system 140 archives a copy of job information and a copy of document data to be processed by the job. For example, for a push scan job, the "send" application of the image processing apparatus 110 sends, to an original destination, digital document data obtained by reading a document by the scanner 113. At the same time, the "send" application sends information on the job and document data to be processed to the server system 140 to archive them.

In this manner, the job archive application archives document data distributed through the LAN 100.

Figure 2:
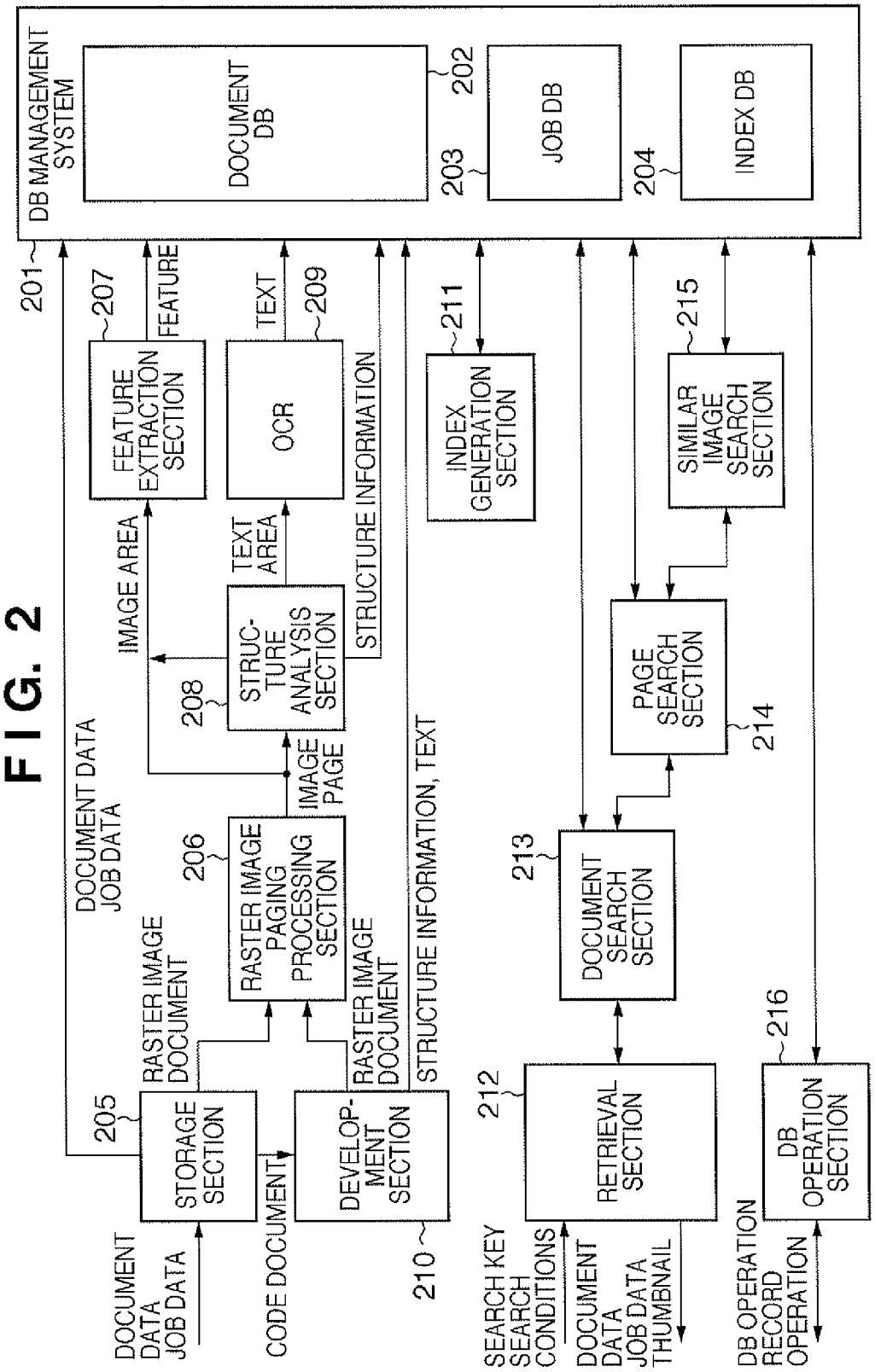
FIG. 2 is a block diagram illustrating the software configuration of a job archive application running on a server system according to the embodiment.

FIG. 2 is a block diagram describing the software configuration of the job archive application running on the server system 140 according to the embodiment.

A DB (DataBase) management system 201 stores a large capacity of data containing many records as a database structured together with the relations between the records. As described above, the large-volume storage unit 142 stores data of the DB management system 201. In response to an inquiry by a query language such as SQL, the DB management system 201 quickly retrieves a record meeting a condition from the database. The DB management system 201 includes a document DB 202, job DB 203, and index DB 204. The DB management system 201 can be implemented by mounting a well-known relational database, object oriented database, or the like.

The document DB 202 stores document data which is accumulated and managed by the job archive system. The document DB 202 stores, as document records, document content data and metadata related to documents. Records stored in the document DB 202 and job DB 203 are associated with each other. The job DB 203 stores, as job records, job data which is accumulated and managed by the job archive system. The index DB 204 stores index records to allow for quickly search for desired data from document data and job data which are accumulated and managed by the job archive system. An index record stored in the index DB 204 refers to records in the document DB 202 and job DB 203.

A storage section 205 is a storage request accepting module which receives document data and job data from a client apparatus such as the image processing apparatus 110 or personal computer 101, and stores them in the DB management system 201. The storage section 205 stores the received document data and job data in the DB management system 201. In accordance with the data format of received document data, the storage section 205 switches processing to generate metadata. More specifically, when received document data is image data read by a scanner, captured by a digital camera, or received by a facsimile apparatus, the storage section 205 sends the image data to a raster image paging processing section 206. When received document data is coded document data, that is, has one of document formats in a page description language and vector representation, and document formats of various applications such as a DTP, word-processor, and spreadsheet software, the storage section 205 sends the document data to a development section 210. The development section 210 develops code document data into raster image data, and outputs the raster image data to the raster image paging processing section 206.

The raster image paging processing section 206 is a module which divides raster image data into pages of data and performs processing for each page. The raster image paging processing section 206 sends each divided page image to a feature extraction section 207 and structure analysis section 208. In this case, the raster image is image data read by a scanner or received by a facsimile apparatus. Hence, the raster image is data in which each character in the image is not coded. To the contrary, document data which is not a raster image is data in which each contained character or sign is coded to allow editing and changing the layout and contents of the document.

The feature extraction section 207 is a module which extracts a feature used as a criterion to determine similarity between images by analyzing raster image data of one page. The feature extraction section 207 sends the extracted feature to the DB management system 201, and the DB management system 201 stores the feature. There are known many feature extraction methods effective for searching for similar images. The embodiment employs a plurality of effective methods independently of a specific algorithm. For example, the employable methods include the followings. More specifically, an object is extracted from an edge in an image to determine the shape, and uses the shape, layout, color pattern, positional relationship between objects. Instead, a combination of dominant colors or a color pattern which forms an entire image is extracted and used based on a histogram. Further, a variety of mathematical processes (e.g., Fourier-Mellin transform) are used to derive a feature amount having a feature close to cognitive similarity determination.

The structure analysis section 208 is a module which analyzes the structure of a page from raster image data of the page. The structure analysis section 208 decomposes one image area (page) into a plurality of areas (for example, text area, image area, photographic area, graphic area, monochrome area, and color area) having different characteristics (features). The structure analysis section 208 analyzes and classifies the structure of each area. The structure analysis section 208 also analyzes and classifies the layer structure between an underlayer pattern such as the background and an object such as a text or shape arranged on the underlayer pattern. The structure analysis section 208 sends, to the feature extraction section 207, raster image data of an image area (or image layer) obtained as a result of the analysis. The structure analysis section 208 sends, to an OCR (optical character recognition) section 209, raster image data of a text area (or text layer) obtained as a result of the analysis. The structure analysis section 208 sends, to the DB management system 201, structure information obtained as a result of the analysis, and the DB management system 201 stores the structure information. The OCR section 209 is a module which receives raster image data of a rendered character and analyzes it to recognize the character. The OCR section 209 sends the recognized text data (i.e., data coded by Unicode or the like) to the DB management system 201, and the DB management system 201 stores the text data.

An index generation section 211 is a module which generates index information for quickly searching the document DB 202 and job DB 203 for data. The index information is used to quickly search for a document record containing an image similar to an image given as a search key, or quickly perform a full text search for a document record whose document content data or page content data contains a text given as a search key. The index information is also used to quickly search for a document record or job record having metadata meeting a condition given as a search key. Index information is generated by a plurality of known methods. Index information for a full text search is generated using, for example, N-gram. Index information for searching for a similar image is generated by classifying (clustering) in advance feature vectors representing the features of images and ordering the feature vectors by a hash function. The index generation section 211 generates index information when the document DB 202 or job DB 203 is updated by, for example, additionally registering or editing document data or job data. The index generation section 211 can also generate index information by batch processing asynchronously with update of each DB. The generated index information is stored in the index DB 204 of the DB management system 201.

A retrieval section 212 is a module which accepts a search key image or search key text and a search request from a client apparatus such as the image processing apparatus 110 or personal computer 101, and retrieves document data from the DB management system 201 based on the search key and search request. The retrieval section 212 sends back hit document data, a thumbnail image related to the document, and metadata such as job data to the client apparatus. A document search section 213 is a module which searches for a document matching a document search request. According to a search request and the type of search key supplied from the retrieval section 212, the document search section 213 searches for a document by combining search based on document content data, search based on page data contained in a document, and search based on metadata of the document, and search based on a job related to the document. The document search section 213 finds a plurality of document record candidates matching the search request. In response to a search request based on page data contained in document data, a page search section 214 searches the document DB 202 for a plurality of page record candidates (and documents containing the pages) meeting the condition of the search request. In response to a similar image search request based on an image given as a search key, a similar image search section 215 finds a plurality of page records (and documents containing the pages) having page content data containing images similar to an image serving as a search key. In the similar image search, the similar image search section 215 performs the same image feature extraction as that by the feature extraction section 207 for an image serving as a search key, and searches for a similar image based on the similarity of the image feature. The embodiment adopts a combination of known similar image search methods for searching for a similar image using an image as a search key. An example of the methods extracts an object from the edge of an image to determine the shape, and uses the shape, layout, color pattern, positional relationship between objects. Another example extracts, based on a histogram, a combination of dominant colors or color pattern which forms an entire image, and uses the extracted one.

A DB operation section 216 is a database operation module which accepts a request from the management console of the server computer 141 or a client apparatus such as the image processing apparatus 110 or personal computer 101 to manipulate the DB management system 201, and processes the request. For example, operations to a record in the database include addition and editing of metadata (for example, tag).

Figure 3:
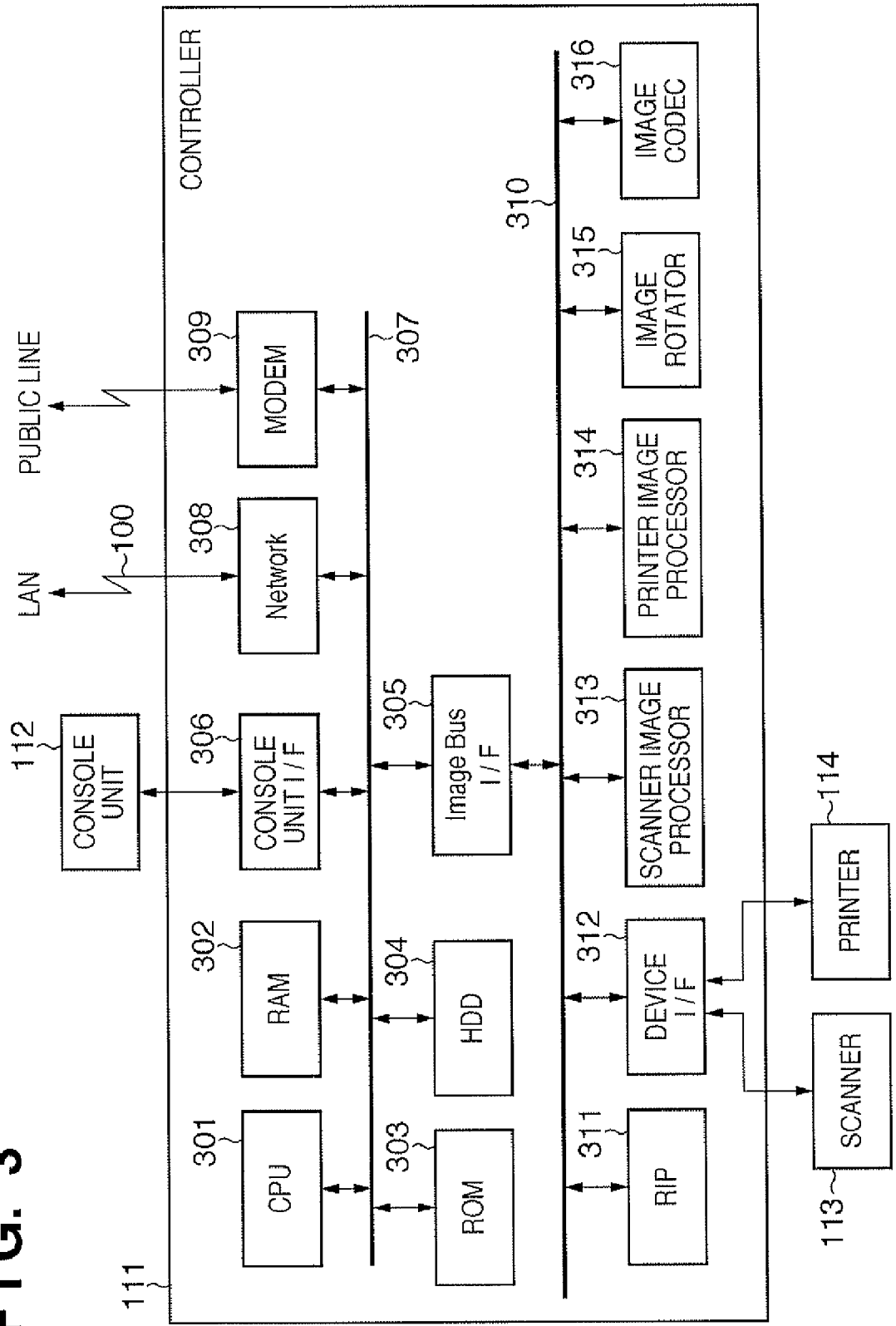
FIG. 3 is a block diagram illustrating the hardware configuration of an image processing apparatus according to the embodiment.

FIG. 3 is a block diagram describing the hardware configuration of the image processing apparatus according to the embodiment. The image processing apparatuses 110, 120, and 130 have the same configuration, so the image processing apparatus 110 will be exemplified. FIG. 3 mainly shows the arrangement of the controller 111 in FIG. 1.

The controller 111 is connected to the scanner 113 and printer 114 on one side, and the LAN 100 and a public line (WAN) on the other side to input/output image information and device information. A CPU 301 is a controller for controlling the overall controller 111. A RAM 302 provides a system work area used to run the CPU 301. The RAM 302 is also used as an image memory for temporarily storing image data. A ROM 303 is a boot ROM which stores a system boot program. An HDD (Hard Disk Drive) 304 stores system software, image data, and the like. A console unit I/F 306 interfaces the console unit (UI) 112 and outputs image data to the console unit 112 to display it on the console unit 112. The console unit I/F 306 transfers, to the CPU 301, information input by a user via the console unit 112. A network interface (Network) 308 is connected to the LAN 100 and inputs/outputs information to/from the LAN 100. A modem (MODEM) 309 is connected to a public line and inputs/outputs information to/from the public line. These devices are connected to a system bus 307.

An image bus interface (Image Bus I/F) 305 is a bus bridge which connects the system bus 307 to an image bus 310 for transferring image data at high speed. The image bus interface 305 converts a data structure. The image bus 310 is formed from a PCI bus or IEEE1394 bus. The following devices are connected to the image bus 310. A raster image processor (RIP) 311 rasterizes a PDL code transmitted from the LAN 100 into a bitmap image. A device I/F 312 connects the scanner 113 and printer 114 to the controller 111, and performs synchronous/asynchronous conversion of image data. A scanner image processor 313 corrects, modifies, and edits image data input from the scanner 113. A printer image processor 314 performs correction, resolution or conversion corresponding to the performance of the printer 114 for image data to be output to the printer 114. An image rotator 315 rotates image data. An image codec 316 executes JPEG compression/decompression for multi-valued image data, and JBIG, MMR, or MH compression/decompression for binary image data.

Figure 4:
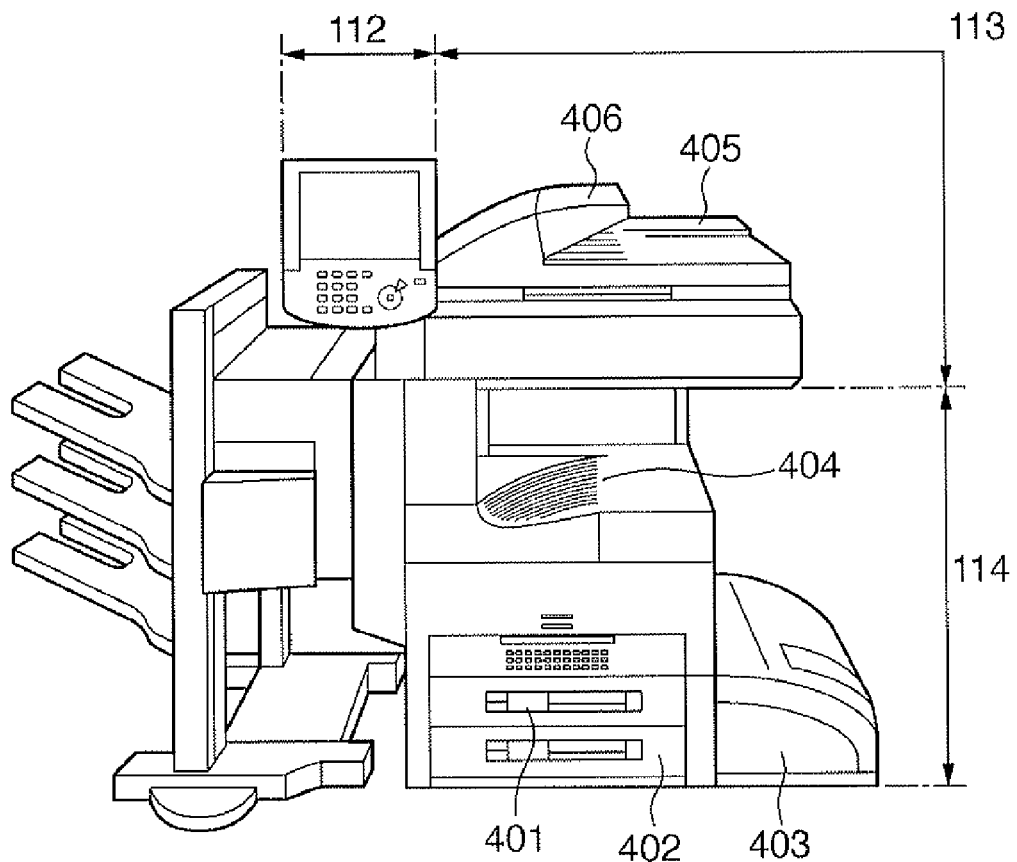
FIG. 4 depicts a perspective view illustrating the outer appearance of the image processing apparatus according to the embodiment.

FIG. 4 depicts a perspective view illustrating the outer appearance of the image processing apparatus 110 according to the embodiment. The image processing apparatuses 120 and 130 also have the same outer appearance.

The scanner 113 illuminates an image on document paper and scans a CCD line sensor (not shown) to generate raster image data. The user sets a document on a tray 406 of a document feeder 405 and designates the start of reading on the console unit 112. Then, the CPU 301 of the controller 111 gives the instruction to the scanner 113. While feeding set document sheets one by one from the tray 406, the scanner 113 reads an image on each document sheet.

The printer 114 prints raster image data on a sheet. The printing method is arbitrary, for example, an electrophotographic method using a photosensitive drum or photosensitive belt, or an ink-jet method of discharging ink from a small-nozzle array to directly print an image on a sheet. The print operation of the printer 114 starts in accordance with an instruction from the CPU 301. The printer 114 has a plurality of paper sources to allow a user to select different paper sizes or different orientations, and has corresponding paper cassettes 401, 402, and 403. A paper discharge tray 404 receives and supports discharged printed sheets.

Figure 5:
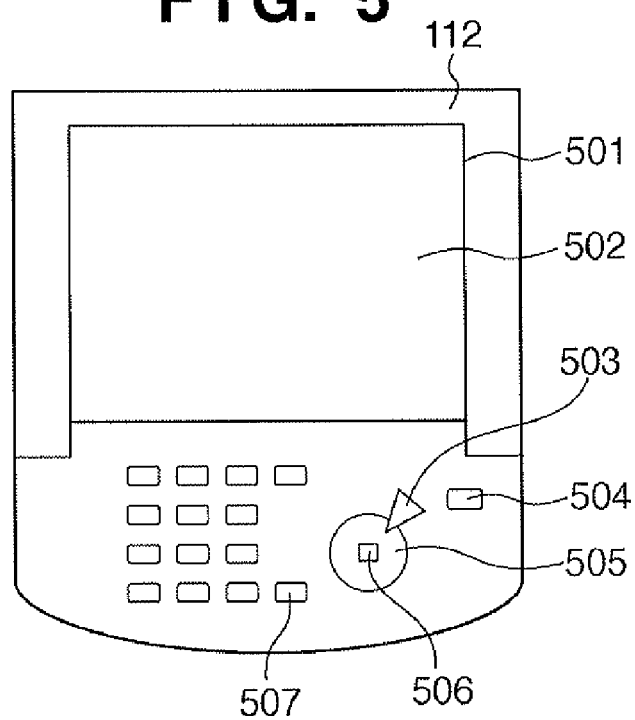
FIG. 5 depicts a plan view illustrating the arrangement of the console unit of the image processing apparatus according to the embodiment.

FIG. 5 depicts a plan view illustrating the arrangement of the console unit 112 of the image processing apparatus according to the embodiment.

An LCD display 501 is configured by adhering a touch panel 502 to an LCD (Liquid Crystal Display), and displays the operation window and soft keys of the image processing apparatus 110. When the user presses a displayed key, the LCD display 501 transfers position information representing the pressed position to the CPU 301 of the controller 111. A start key 505 is pressed to designate a document reading operation. An LED 506 in two, green and red colors is arranged at the center of the start key 505. The color of the LED 506 represents whether or not the start key 505 is operable. A stop key 503 is pressed to stop the operation of the running image processing apparatus 110. An ID key 507 is pressed to input the user ID of a user. A reset key 504 is pressed to initialize settings via the console unit 112.

Figure 6:
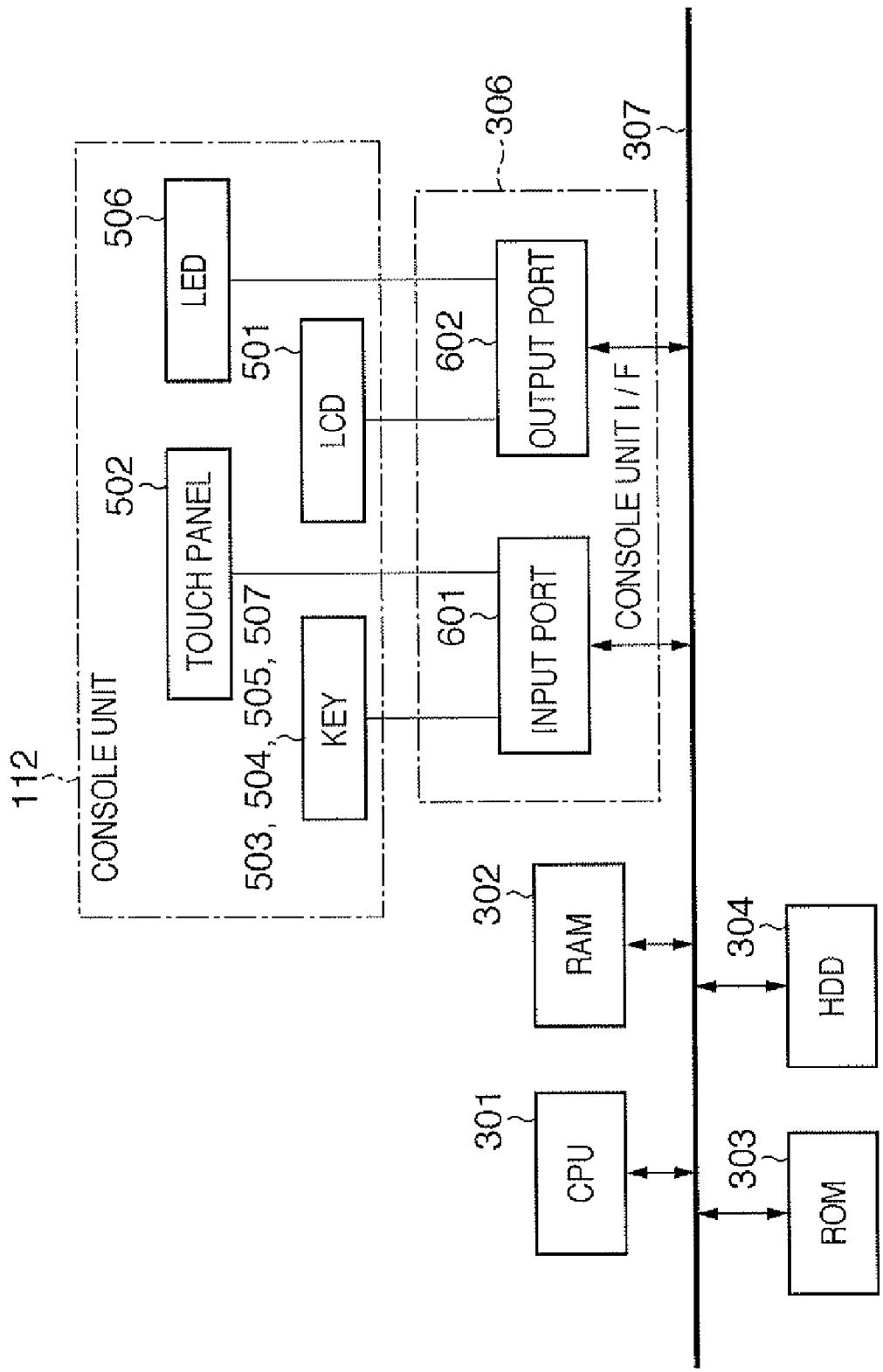
FIG. 6 is a block diagram illustrating the arrangements of the console unit and console unit I/F of the image processing apparatus in correspondence with the arrangement of a controller according to the embodiment.

FIG. 6 is a block diagram describing the arrangements of the console unit 112 and console unit I/F 306 of the image processing apparatus in correspondence with the arrangement of the controller according to the embodiment.

As described above, the console unit 112 is connected to the system bus 307 via the console unit I/F 306. The CPU 301, RAM 302, ROM 303, and HDD 304 are connected to the system bus 307. The CPU 301 comprehensively controls access to all devices connected to the system bus 307 based on control programs and the like stored in the ROM 303 and HDD 304.

User input information from the touch panel 502 or hard key 503, 504, 505, or 507 is transferred to the CPU 301 via an input port 601. The CPU 301 generates display data based on the contents of the user input information and the control programs, and outputs the display data to the LCD display 501 via an output port 602. If necessary, the CPU 301 controls display of the two-color LED 506.

Figure 7:
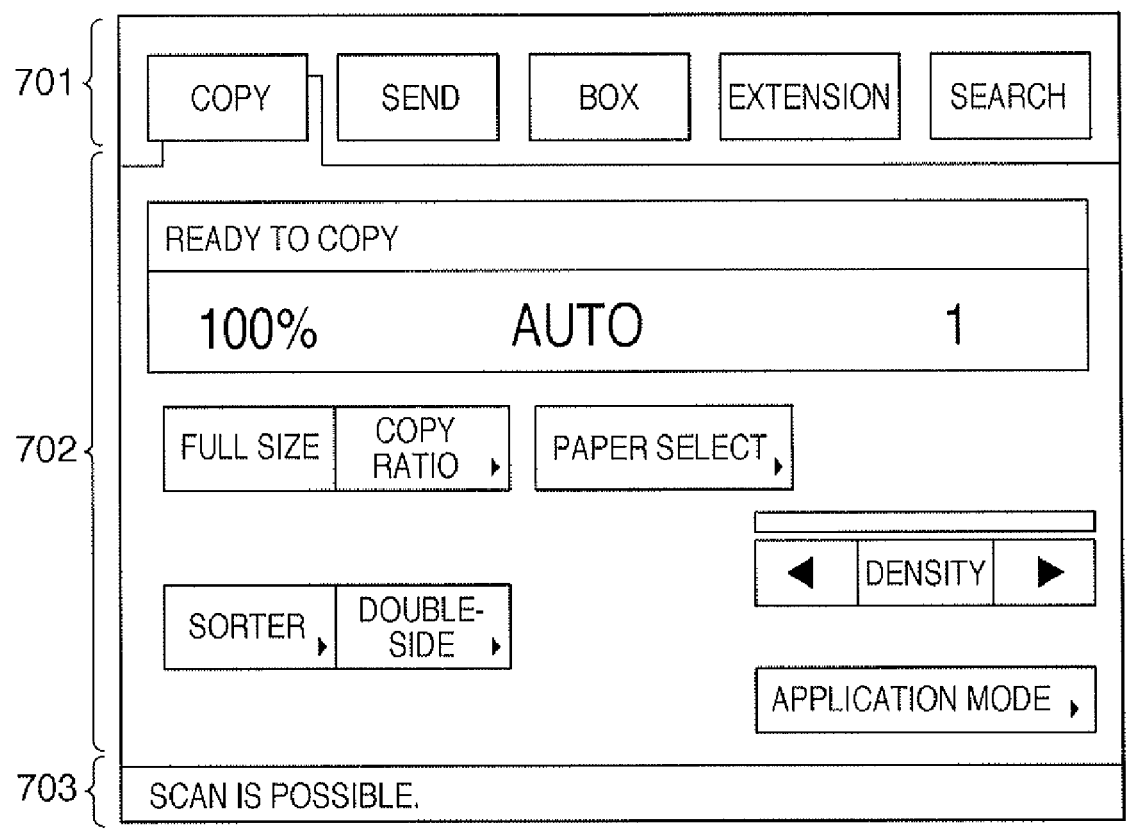
FIG. 7 depicts a view illustrating an example of a standard operation window displayed on the console unit of the image processing apparatus according to the embodiment.

FIG. 7 depicts a view illustrating an example of a standard operation window displayed on the console unit 112 of the image processing apparatus according to the embodiment.

Buttons aligned in a display area 701 at the top in FIG. 7 are used to select one of various functions provided by the image processing apparatus 110. "Copy" is a function of scanning a document by the scanner 113 and printing image data of the read document by the printer 114 to obtain a copy of the document. "Send" is a function of sending, to a variety of output destinations, document data read by the scanner 113 or image data accumulated in the HDD 304. The output destinations include various output destinations to which data can be sent by a wide variety of protocols via the network interface 308, and various output destinations to which data can be sent by a protocol such as facsimile via the modem 309. The user can select some of the output destinations and send data to the selected destination. "Box" is a function of browsing, editing, printing, and transmitting a document file of image data, or code data accumulated in the HDD 304. Document files accumulated in the HDD 304 include image data of a document read by the scanner 113, and data received via the network interface 308. The document files also include accumulated data of print data received from another apparatus via the network interface 308, and facsimile data received from another apparatus via the modem 309. The box function is usable as an e-mail box in the office environment of a user. The box function is also usable for secured printing to enhance the confidentiality of a PDL print job by permitting a user to print on a sheet only after he inputs a password. The box function is also applicable to the HDD 304 of the image processing apparatus 110, the HDDs of the image processing apparatuses 120 and 130, and shared file systems laid open to the public by the personal computer 101 and 102. The box function is applicable when accessing, via the LAN 100, a document file of image data, code data accumulated in a shared file system, database system serviced by the server system 140, and browsing, editing, printing, and transmitting it. "Extension" is a function of invoking a variety of extended functions to, for example, lock the scanner 113 for use by an external apparatus. "Search" is a function of searching for a desired document from the box functions of the image processing apparatus 110 and other image processing apparatuses, a shared file system laid open to the public by an information processing apparatus, and a shared file system, database system serviced by the server system 140.

In FIG. 7, a display area 702 is an example of an operation window when the user selects the copy function. A status display area 703 is used to display various messages to the user, including the functions of the image processing apparatus 110 and information on the apparatus itself, regardless of a function selected in the display area 701.

Figure 8:
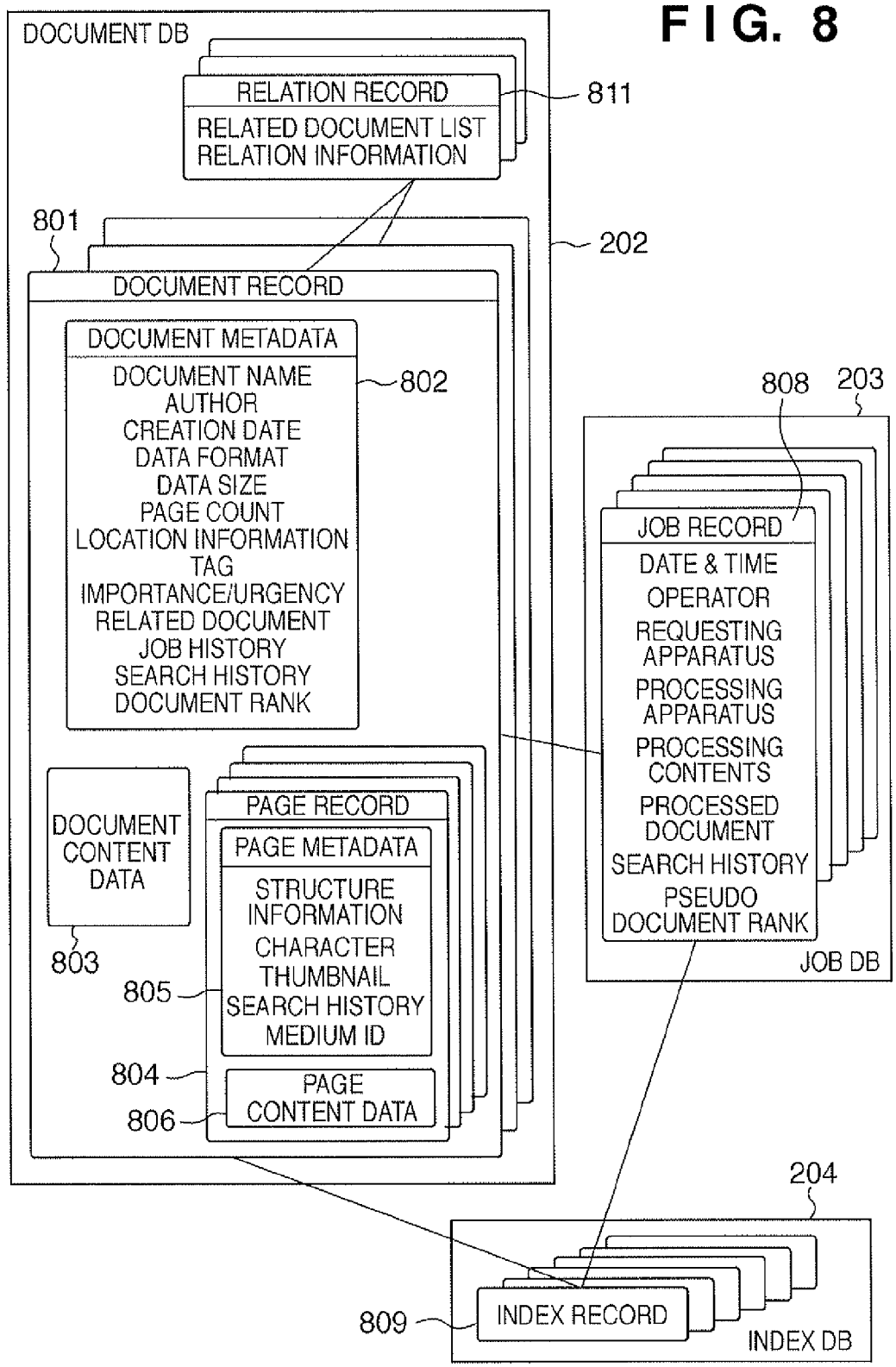
FIG. 8 depicts a schematic view illustrating the abstract data structure of each database stored in a DB management system according to the embodiment.

FIG. 8 depicts a schematic view illustrating the abstract data structure of each database stored in the DB management system 201 according to the embodiment.

The document DB 202 stores a plurality of document records 801 and a plurality of relation records 811. The document record 801 corresponds to a paper document or electronic document file handled by a user. The document record 801 contains document metadata 802, document content data 803, and page records 804 as many as the pages of the document.

The document metadata 802 is a record which stores a variety of metadata related to a document corresponding to the document record 801. The document metadata 802 includes information on the document name, author, creation date, data format, data size, page count, tag, related document (related metadata), job history (job log), and search history (operation history metadata) of a corresponding document. The job history and search history may be acquired from the image processing apparatus 110 which has input the document data. The tag looks like a keyword formed from an arbitrary character string assigned to a document by a user. The user can freely assign a plurality of tags to one document, so the tags are useful to easily classify documents by various criterions and search for them. A plurality of users who will refer to and use a shared document later may add tags. The tag is expected to greatly enrich semantic metadata for classifying and searching for a document. This approach is sometimes called folksonomy. The term "folksonomy" is a combination of "folks" and "taxonomy". The job history is a reference information list for specifying a series of jobs executed for a document. In some cases, one document record holds references to a plurality of job records. For example, when a plurality of jobs target documents which can be specified as an apparently single document, the document is related to a plurality of job records.

The document content data 803 corresponds to the contents of a document itself. When coded document data is stored, data of a text or application program serves as document content data. When the pages of a document are clearly separated, like raster image data of a paper document read by an image scanner, the page record 804 contains content data.

The page record 804 corresponds to each page of a document. Respective page records correspond to raster image data obtained by reading the obverse and reverse of a document sheet by the scanner 113, image data and structure information obtained by developing data of an application program by the development section 210 and dividing it into pages, text data, and metadata. The page record 804 contains page metadata 805 and page content data 806.

The page metadata 805 is a record which stores a variety of metadata related to a page corresponding to the page record 804. The page metadata 805 contains structure information, feature, thumbnail, search history, and medium ID (medium feature data). The structure information is information on a stored page structure analyzed by the structure analysis section 208 and development section 210. The feature is information representing the feature of an image that is extracted by the feature extraction section 207 and forms a stored page. The thumbnail is an image downsized for easy handling by performing resolution conversion (or downscaling) for the image of an entire page or image elements contained in the page. The thumbnail image may be generated when generating the page metadata 805, or generated on demand when it becomes necessary for external retrieval. A task may be asynchronously executed to generate thumbnail images at once by scheduled batch processing. The search history is data representing history information of a search for a corresponding page. The medium ID is information for identifying the recording medium (e.g., paper) of a corresponding page. For example, the medium ID is formed using identification information of a wireless IC microchip embedded in paper. Alternatively, the medium ID is formed using a paper fiber pattern unique to each sheet as identification information, based on a paper fingerprint technique. Alternatively, the medium ID is formed using a visible or invisible image pattern printed on a sheet as identification information. As a technique of coding medium identification information in accordance with an image pattern, 1D and 2D barcode techniques, invisible ink and invisible toner techniques, and magnetic ink and magnetic toner techniques are preferably adopted.

When generating the document record 801 along with a print job, a receiver (not shown) arranged in the paper cassette 401, 402, or 403 in FIG. 4 or on an output paper conveyance path reads identification information if a medium used for printing is a wireless IC microchip-embedded sheet. The identification information is stored in the medium ID in the page metadata 805 of the page record 804. When generating a document record along with a scan job, a receiver (not shown) arranged on the paper conveyance path of the document feeder 405 reads identification information if the scanned medium is a wireless IC microchip-embedded sheet. The identification information is stored in the medium ID in the page metadata 805 of the page record 804. When a sheet-specific paper fiber pattern is used as identification information in a print job, a receiver (not shown) arranged in the paper cassette 401, 402, or 403 or on an output paper conveyance path reads and codes the fiber pattern of an output sheet. The fiber pattern is stored in the medium ID in the page metadata 805 of the page record 804. When generating a document record along with a scan job, the scanner 113 or a fiber pattern reading-dedicated scanner (not shown) arranged on the paper conveyance path of the document feeder 405 reads and codes the fiber pattern of an input sheet. The fiber pattern is stored in the medium ID in the page metadata 805 of the page record 804.

When a visible or invisible image pattern printed on a sheet is used as identification information, a value unique to each page or each document is generated by a technique such as UUID for a print job. A document-unique value is coded to generate an image pattern. The printer 114 prints image data obtained by overlaying the image pattern and image data (page content data) of the print job. When the printed sheet is discharged normally, the document-unique value is stored in the medium ID in the page metadata 805 of the page record 804. When generating the document record 801 along with a scan job, the scanner 113 reads and decodes an image pattern embedded in a document. The obtained document-unique value is stored in the medium ID in the page metadata 805 of the page record 804.

The page content data 806 corresponds to the contents of a page itself. The page content data 806 stores raster image data obtained by reading a paper document page by the scanner 113, or raster document data of each facsimile-received page. The page content data 806 also stores image data of each page such as image data obtained by rendering a code document by the development section 210. Further, the page content data 806 stores text data obtained by performing character recognition for a page image by the OCR section 209, and text information of each page obtained by developing a code document by the development section 210.

The relation record 811 is related to a set of document records 801, and expresses the relation between a document and its related document. When viewed from the document record 801, the relation record 811 can be regarded as a kind of accessory metadata. The relation record 811 contains a related document list and relation information. The related document list is data representing a plurality of document records whose relations are described by the relation record 811. The relation information is data representing the relations between a plurality of items of document data linked by the related document list.

The job DB 203 includes a plurality of job records 808. The job record 808 corresponds to each document processing job executed by a user. When viewed from the document record 801, the job record 808 can be regarded as a kind of accessory metadata. The job record 808 contains the date & time, operator, requesting apparatus, processing apparatus, processing contents, and processed document. The date & time indicates data representing the date & time when a job was executed. The operator indicates data for specifying a user who executed a job. The requesting apparatus indicates an apparatus which requested execution of a job (for example, when the personal computer 101 requests the image processing apparatus 110 to print, the requesting apparatus is the personal computer 101). The processing apparatus indicates an apparatus which substantially processed a job (for example, when the personal computer 101 requests the image processing apparatus 110 to print, the processing apparatus is the image processing apparatus 110). The processing contents indicate information for specifying the processing contents of a job. The processing contents contain information for specifying how the job type, and various selectable options and various settable parameters for each job type were selected and set to perform processing. The processed document indicates a reference information list for specifying a document processed by a job. One job record sometimes refers to a plurality of document records when, for example, one job was executed for a plurality of documents.

The index DB 204 includes a plurality of index records 809. The index record 809 is index information for quickly searching the document DB 202 and job DB 203 for data. The index record 809 refers to a plurality of document records 801 and a plurality of job records 808. The index information is used to quickly search for a document record containing an image similar to an image given as a search key. The index information is also used to quickly perform a full text search for the document record 801 containing the document content data 803 and page content data 806 in accordance with a text given as a search key. The index information is also used to quickly search for the document record 801 or job record 808 having metadata meeting a condition given as a search key. The index generation section 211 generates the index information.

[First Embodiment]

Figure 9:
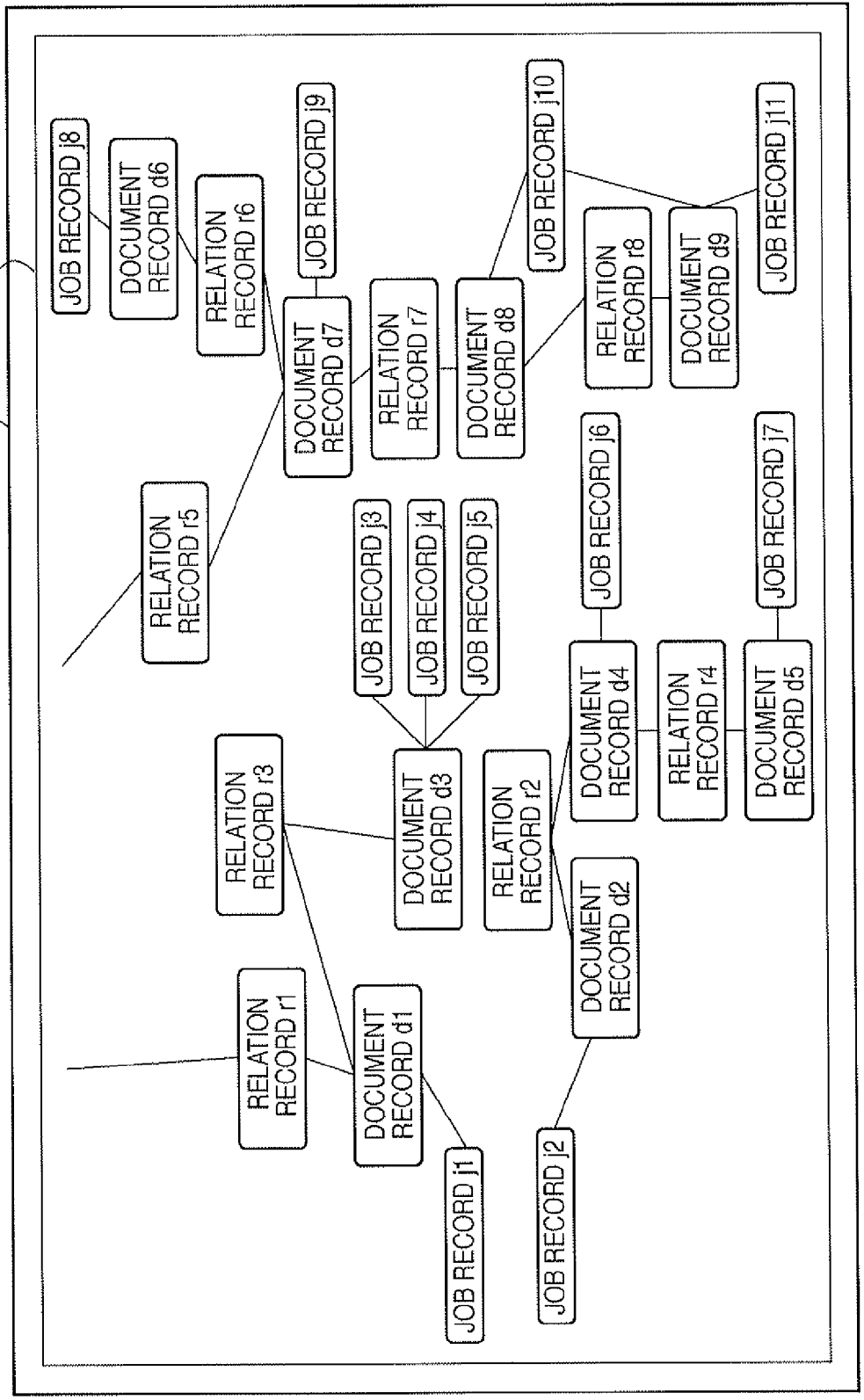
FIG. 9 is an instance relational diagram describing an example of the concrete data structure of each database stored in a DB management system at a given timing in a first embodiment.

FIG. 9 is an instance relational diagram describing an example of the concrete data structure of each database stored in a DB management system 201 at a given timing in the first embodiment.

A DB management system data structure 901 exemplifies the instances of document records, relation records, and job records and their relations which are built in the DB management system 201 according to the abstract data structure shown in FIG. 8. A data structure 902 exemplifies instances and their relations present at a given timing. A document record instance d1 is the instance of a document record 801 corresponding to one concrete document. This also applies to document record instances d2, d3, d4, d5, d6, d7, d8, and d9. A relation record instance r1 is the instance of a relation record 811 corresponding to one concrete relation. The relation record instance r1 relates a document record instance (not shown) to the document record instance d1. Relation record instances r2, r3, r4, r5, r6, r7, and r8 are similar to the relation record instance r1. A job record j1 is the instance of a job record 808 corresponding to one concrete job. The job record j1 holds information of a job executed for the document record instance d1, and is related to the document record instance d1. This also applies to job record instances j2, j3, j4, j5, j6, j7, j8, j9, j10, and j11.

Figure 10:
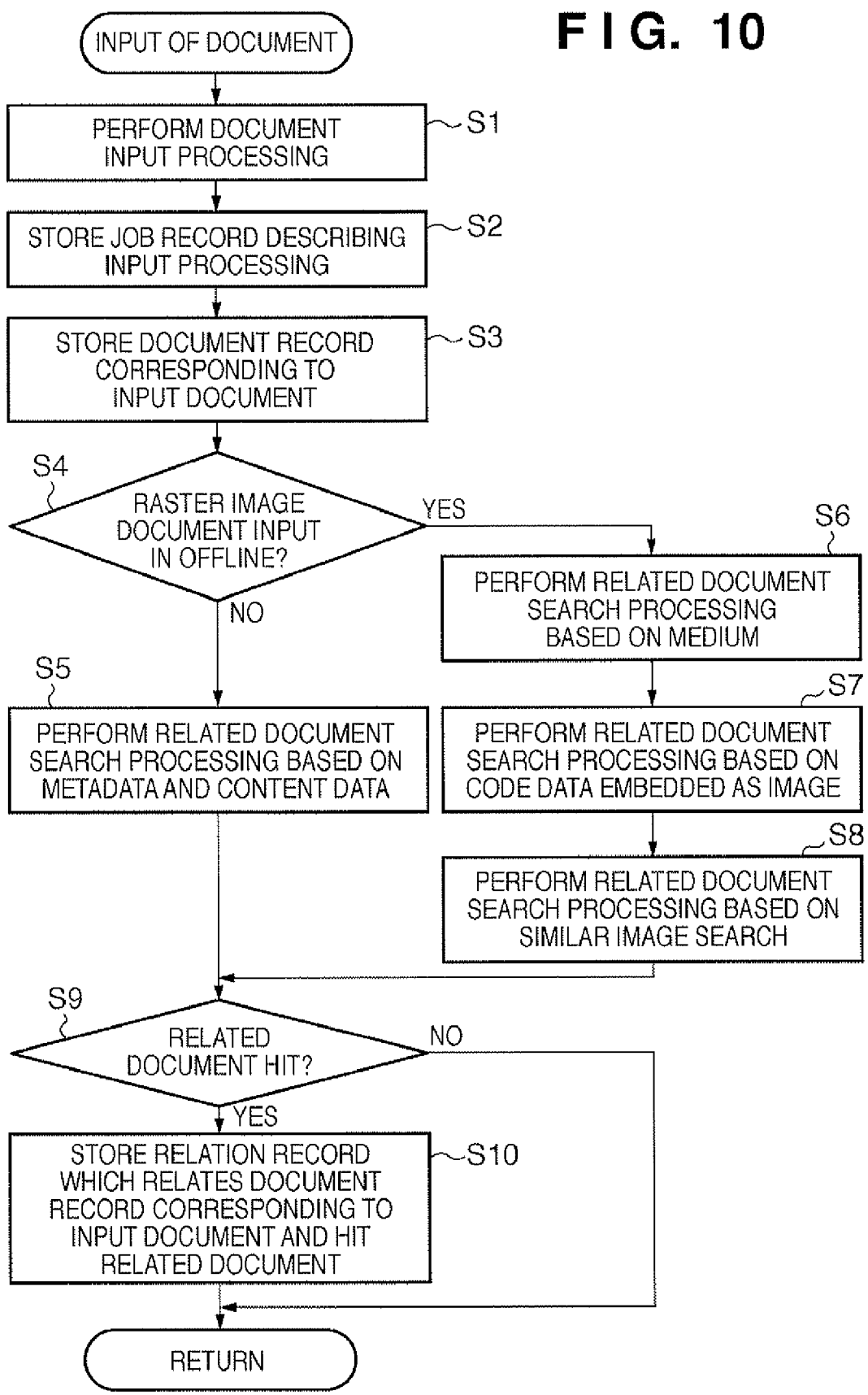
FIG. 10 is a flowchart describing the sequence of document input processing in the image processing apparatus of a document processing system according to the first embodiment.

FIG. 10 is a flowchart describing the sequence of document input processing in the image processing apparatus of a document processing system according to the first embodiment. An embedded application program executed by the CPU 301 of the image processing apparatus 110 achieves the sequence shown in the flowchart.

A series of procedures of the flowchart starts upon receiving document data which is sent from the personal computer 101 to the print function, document transfer function, or document accumulation function of the image processing apparatus 110. The series of procedures of the flowchart may start when the modem 309 receives image data from a public line via the facsimile reception function of the image processing apparatus 110. In this case, the document input processing corresponds to facsimile reception processing. The procedures shown in the flowchart may start when the user selects processing to read image data of a document by the scanner 113 by the copy, send, and box functions in the display area 701 of the console unit 112, and starts a reading operation with the start key 505. In this case, the document input processing corresponds to processing to scan a document and read document data.

In step S1, the image processing apparatus 110 performs various kinds of document input processing. The document input processing includes inputting of document data sent from the personal computer 101 for printing, accumulation in the storage of the image processing apparatus 110 and transferring by facsimile, IFAX, e-mail. The document input processing may be processing to input document data sent from a remote apparatus as a result of reception processing such as facsimile reception, IFAX reception, or e-mail reception. The document input processing may be processing to input, as document data, image data on paper read by the scanner 113 for copying, accumulation in the storage (box function) of the image processing apparatus 110, facsimile/IFAX/e-mail transmission. In this manner, document input processes executed by the image processing apparatus 110 are roughly classified into online document input for inputting online document data via a network or serial interface and offline document input for inputting an offline document by paper scanning. Online document data is data which contains content data uniquely analyzable by computing processing and metadata used by a document management system to manage document data. By using the metadata, the document management system searches for document data or manages a plurality of items of document data in association with each other. To the contrary, offline document data containing raster image data read from paper or received by a facsimile apparatus is offline from the document management system. That is, the offline document data does not contain metadata used by the document management system to manage document data. Note that raster image data may have simple attribute information representing the attribute of an image itself, such as the image creation date & time and resolution. The raster image data is, for example, bitmap image data or compressed image data of bitmap image data.

The process advances to step S2 to generate a job record 808 corresponding to the document input processing executed in step S1, and store the job record 808 in the job DB 203. The process advances to step S3 to generate the document record 801 corresponding to the document data input by the job processing in step S1, and store the document record 801 in the document DB 202. The job record 808 generated in step S2 is related as one metadata to the document record 801 generated in step S3. Another metadata associated with the document data is similarly stored as the document metadata 802 in the document DB 202.

Then, the process advances to step S4 to determine whether the document input processing in S1 is offline input processing of raster document data. If the document input processing in S1 is offline input processing of raster document data, the process advances to step S6; if it is not offline input processing of raster document data, the process advances to step S5. In step S5, a job archive application is searched for a document related to the input document based on the metadata and content data of the input document. More specifically, document records stored in the DB management system 201 are searched for a document record related to the input document. The document input processing is online input processing or code document input processing. A related document record can therefore be found by a data search technique known in the field of a relational database management system (RDBMS). After the end of the processing in step S5, the process advances to step S9.

In steps S6 to S8, related document specifying processing is executed to specify document data related to raster document data. More specifically, related document search processing is performed based on a medium from which the document was input. When the document has been input by scanning a paper document, the medium ID of the paper is identified as described above. The page record 804 is searched for, in which the page metadata 805 has medium ID data identical or similar to the medium ID of the paper. If the page record 804 is found, it can be determined that the document record 801 containing the page record 804 is a document record stored when the physical page medium (paper) of the input document was handled in the past. More specifically, the relation between the input document and the document record 801 generated upon printing on the paper can be found out. Alternatively, the relation between the input document and the document record 801 generated upon scanning the paper and copying data, sending it, or accumulating it in the box, or searching for an image using the paper as a key can be found out.

The process advances to step S7 to perform related document search processing based on code data embedded as an image. When raster document data has been input, metadata and content data embedded as an image can be extracted by analyzing and decoding a 2D barcode contained in the raster image (document), as described above. Based on the extracted code data, the job archive application is searched for a document related to the input document. More specifically, document records stored in the DB management system 201 are searched for a document record related to the input document. The search key is code data decoded from an image, so a related document record can be found by a data search technique known in the field of a relational database management system (RDBMS).

After that, the process advances to step S8 to search the job archive application for document data similar to the raster document data. As a related document, a document with high similarity of the document record 801, that is, a document with high similarity of the document content data 803, a document with high similarity of document metadata is searched for. As a related document, even a document containing a page (similar page) with high similarity of the page record 804, that is, a document containing a page with high similarity of page content data 806 or a page with high similarity of the page metadata 805 is searched for. In particular, a page similar in the structures and features of a plurality of areas which form an image, or a page containing a similar area element is determined to be a page with high similarity using structure data and feature data of the page metadata 805. The process then advances from step S8 to step S9.

In step S9, the related document search result is determined. If at least one related document has successfully been found, the process advances to step S10; if the search fails, the process ends. In step S10, the relation records 811 which relates the document record 801 generated in step S1 to the document records 801 of related documents found in steps S5 to S8 are generated by the number of related documents. The generated relation records 811 are stored in the document DB 202. The related document list of each relation record 811 records references to two document records 801 corresponding to the input document and a related document. The relation information records information for identifying a variety of relations explained in step S3. As for a similarity-based relation, a value expressing the degree of similarity is also recorded in the relation information.

Figure 11:
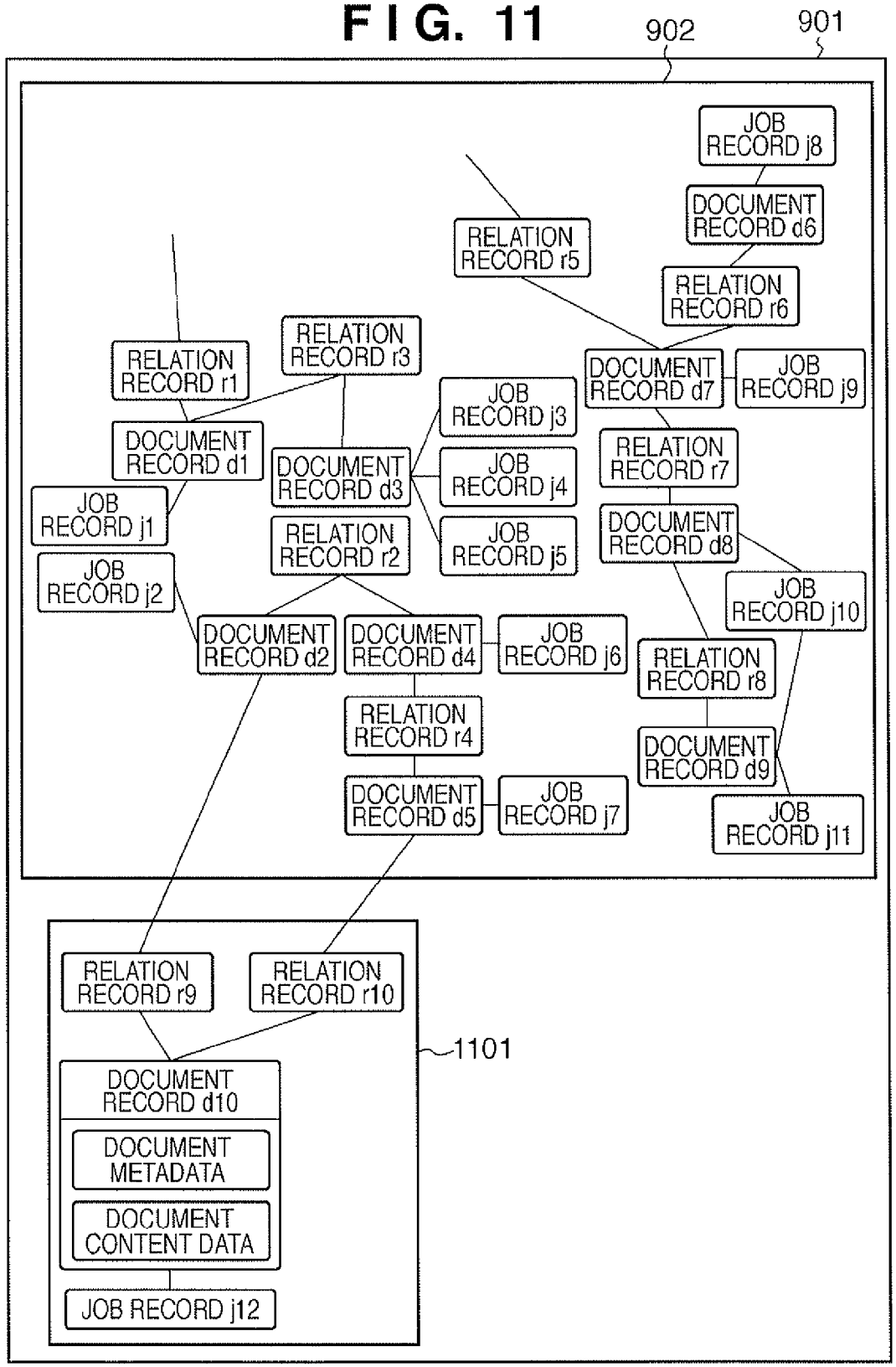
FIG. 11 is an instance relational diagram describing an example of the concrete data structure of each database stored in the DB management system upon completion of document input processing of a code document or metadata-attached document in printing, reception and accumulation in the first embodiment.

FIG. 11 is an instance relational diagram describing an example of the concrete data structure of each database stored in the DB management system 201 upon completion of document input processing of a code document or metadata-attached document in printing, reception or accumulation in the first embodiment. Note that the DB management system data structure 902 is the same as the DB management system data structure 902 in FIG. 9. In FIG. 11, a data structure 1101 is added to the data structure example shown in FIG. 9.

The data structure 1101 contains a document record instance d10, job record instance j12, and relation record instances r9 and r10. The document record instance d10 is the instance of the document record 801 corresponding to a code document or metadata-attached document input by printing, reception, accumulation, or the like. The job record instance j12 is the instance of the job record 808 which records information on the document input processing. The relation record instance r9 is an instance generated and accumulated to relate the related document record instance d2, which was hit in the search of step S5 and has already existed in the document DB 202, to the document record instance d10 corresponding to the input document. Similarly, the relation record instance r10 is an instance generated and accumulated to relate the related document record instance d5, which was hit in the search of step S5 and has existed in the document DB 202, to the document record instance d10 corresponding to the input document.

Figure 12:
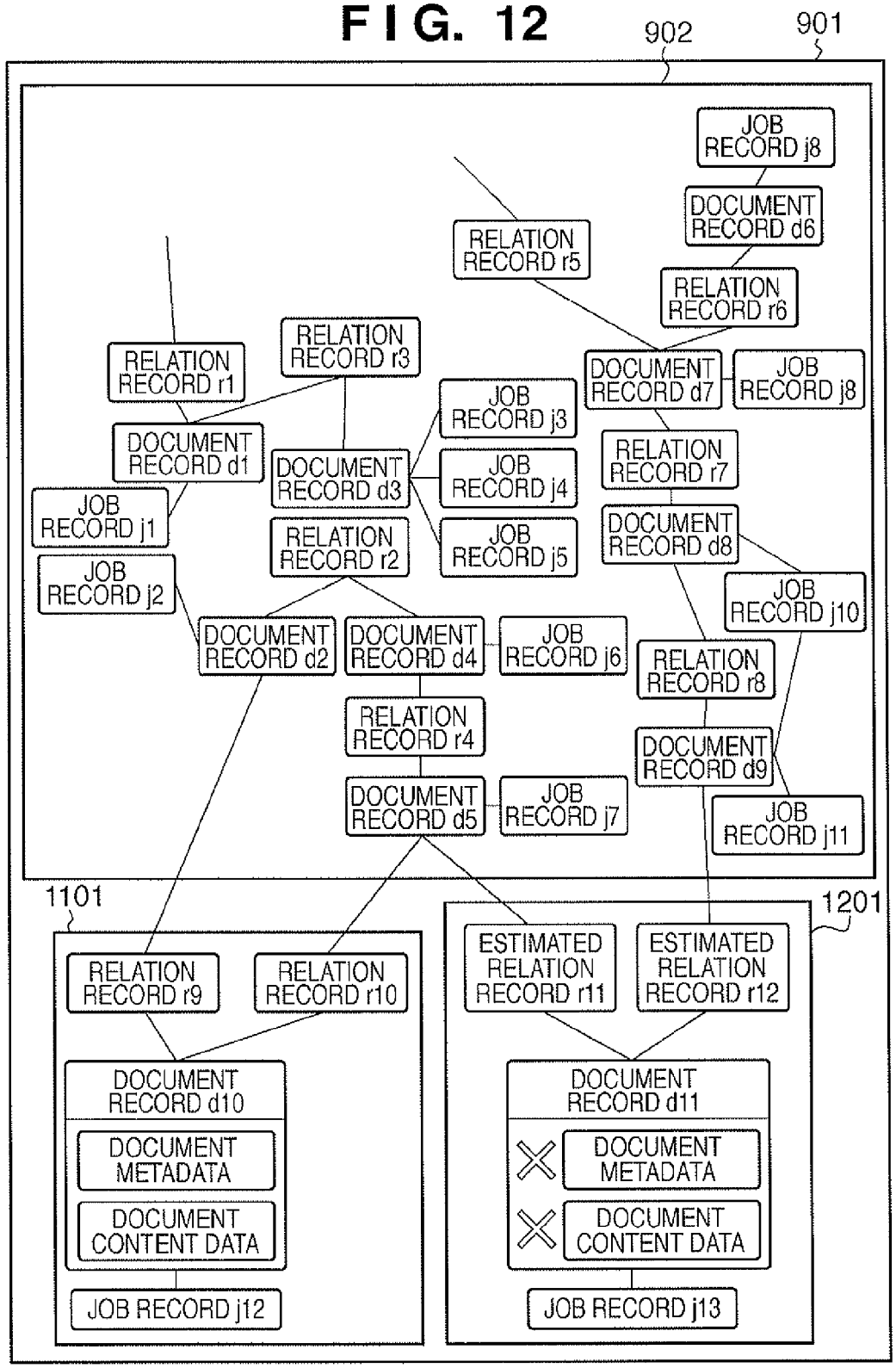
FIG. 12 is an instance relational diagram describing an example of the concrete data structure of each database stored in the DB management system upon completion of document input processing by scanning a paper document or facsimile-receiving raster document data in the first embodiment.

FIG. 12 is an instance relational diagram describing an example of the concrete data structure of each database stored in the DB management system 201 upon completion of document input processing by scanning a paper document or facsimile-receiving a raster image in the first embodiment. A data structure 1201 is added to the instance relational diagram exemplifying the concrete data structure of each database stored in the DB management system 201 shown in FIG. 11. The remaining data structure is the same as that shown in FIG. 11, and a description thereof will not be repeated.

The data structure 1201 contains a document record instance d11, a job record instance j13, and estimated relation record instances r11 and r12.

The document record instance d11 is the instance of the document record 801 corresponding to raster document data input by scanning, facsimile or reception. The document record instance d11 corresponds to a document obtained by offline input of scanning paper, and thus has neither document metadata nor document content data or has only relatively poor data (indicated by "x" in FIG. 12). The job record instance j13 is the instance of the job record 808 which records information on the document input processing. The estimated relation record instance r11 is an instance generated and accumulated to relate the related document record instance d5, which was hit in the similar image search of step S8 and exists in the DB 202, to the document record instance d11 corresponding to the input document. Also, the estimated relation record instance r12 is an instance generated and accumulated to relate the related document record instance d9, which was hit in the medium ID search of step S6 and exists in the DB 202, to the document record instance d11 corresponding to the input document.

FIG. 13 depicts a view illustrating an example of a data representation using a table structure to represent relation information recorded in the instances of the relation records 811 according to the first embodiment. The DB management system 201 manages the data representation to represent the document DB 202 in the data structure of FIG. 8. FIG. 13 corresponds to the instances exemplified in FIG. 12 and their relation records. In FIG. 13, each row corresponds to information of a digraph from a reference source document to a reference destination document in a relation. Respective columns represent pieces of information of the relation ID, reference source document ID, reference destination document ID, relation type, and degree of relation.

The relation ID is an ID for identifying each instance of the relation record 811 that is expressed as a relation record instance r in FIGS. 9, 11, and 12. The reference source document ID and reference destination document ID are IDs for identifying the instances of the document records 801, and describe a relation from a reference source document to a reference destination document. The relation type represents the type of relation from a reference source to a reference destination. The degree of relation is indicated by a numerical value. The degree of relation takes a value of "0" (exclusive) to "1" (inclusive). A larger value represents a higher degree of relation.

Items of the relation type will be explained.

"Document match (old edition)" is relation information assigned when it is specified from information for identifying a document that documents are identical in different editions. "Document match (old edition)" indicates that a document of a reference source document ID is an old edition of a reference destination document ID. By comparing various kinds of document identification information to be described below, it can be specified that documents are identical in different editions. For example, documents can be determined to be identical when the reference source and reference destination have the same location information URL of the document metadata 802, the same URL indicating the location of a related document of the latest edition, or the same document ID such as the document name. For example, as for a printed paper document, documents can be determined to be identical when the medium ID is recorded in the print job record and the paper document is identical to a document serving as source data of the print job. For example, documents can also be determined to be identical when they have the same document content data 803 and page content data 806. "Document match (new edition)" expresses a relation opposite to "document match (old edition)".

"Manual relating (reference destination)" expresses a relation manually assigned by a user. The user can manually assign a relation between documents in the document DB 202 via the job archive application or the document management system such as a box. When the user relates document A to another document B, the reference source document ID in "manual relating (reference destination)" is the ID of document A, and the reference destination document ID is that of document B. "Manual relating (reference source)" expresses a relation opposite to "manual relating (reference destination)".

"Author match" is relation information assigned when the document metadata 802 of two documents have the same author information. "Author match" is generally a bidirectional relation. A document written by a plurality of authors sometimes has a plurality of relations with other documents in correspondence with the respective authors.

"Inclusion (included)" is relation information assigned when the inclusion relationship is specified between two related documents. The inclusion relationship between document contents can be determined by comparing the document content data 803 or page records 804. "Inclusion (included)" indicates that the contents of a document of a reference destination document ID includes those of a document of a reference source document ID. "Inclusion (including)" is opposite to "inclusion (included)" and indicates that the contents of a document of a reference source document ID includes those of a document of a reference destination document ID.

"Creation date match" is relation information assigned when creation dates in the document metadata 802 match each other. "Creation date match" is generally a bidirectional relation.

"Tag match" is relation information assigned when pieces of tag information in the document metadata 802 have the same tag. "Tag match" is generally a bidirectional relation. A document with a plurality of tags sometimes has a plurality of relations with other documents in correspondence with the respective tags.

"Similar document content data" is relation information assigned when the similarity between the document content data 803 or page records 804 is checked to determine that the similarity exceeds a threshold. "Similar document content data" is generally a bidirectional relation.

"Same job processing target" is relation information assigned to documents having undergone the same job processing. "Same job processing target" is assigned to a combination of documents in the processed document list of the job record 808. "Same job processing target" is generally bidirectional relation information.

"Similar image (re-online input)" is relation information assigned between a document record added to the document DB 202 by document input processing of, for example, scanning a paper medium or facsimile-receiving a raster image (document), and a document record already present in the document DB 202. This relation information is generated by the sequence of FIG. 10 when a document is input. Instead of generating the relation information at the same time as document input, a relation record may be generated and stored by the same batch processing as that in steps S6 to S10 of FIG. 10. Generating a relation record by the batch processing can achieve high-speed document input processing, and implement a more advanced search than related document search processing executable upon document input.

A reference source document ID in "similar image (re-digitized input)" represents a related document record present in the document DB 202, and a reference destination document ID represents an added document record. "Similar image (online)" expresses a relation opposite to "similar image (re-digitized input)".

"Medium ID match (re-digitized input)" is relation information assigned between a document record added to the document DB 202 by document input processing of, for example, scanning a paper medium or facsimile-receiving a raster image (document), and a document record present in the document DB 202. This relation information is generated and stored by the sequence of FIG. 10 when a document is input. Instead of generating the relation information at the same time as document input, a relation record may be generated and stored by the same batch processing as that in steps S6 to S10 of FIG. 10. Generating a relation record by the batch processing can achieve high-speed document input processing, and implement a more advanced search than related document search processing executable upon document input. A reference source document ID in "medium ID match (re-digitized input)" represents a related document record present in the document DB 202, and a reference destination document ID represents an added document record. "Medium ID match (online)" expresses a relation opposite to "medium ID match (re-digitized input)".

Figure 14A:
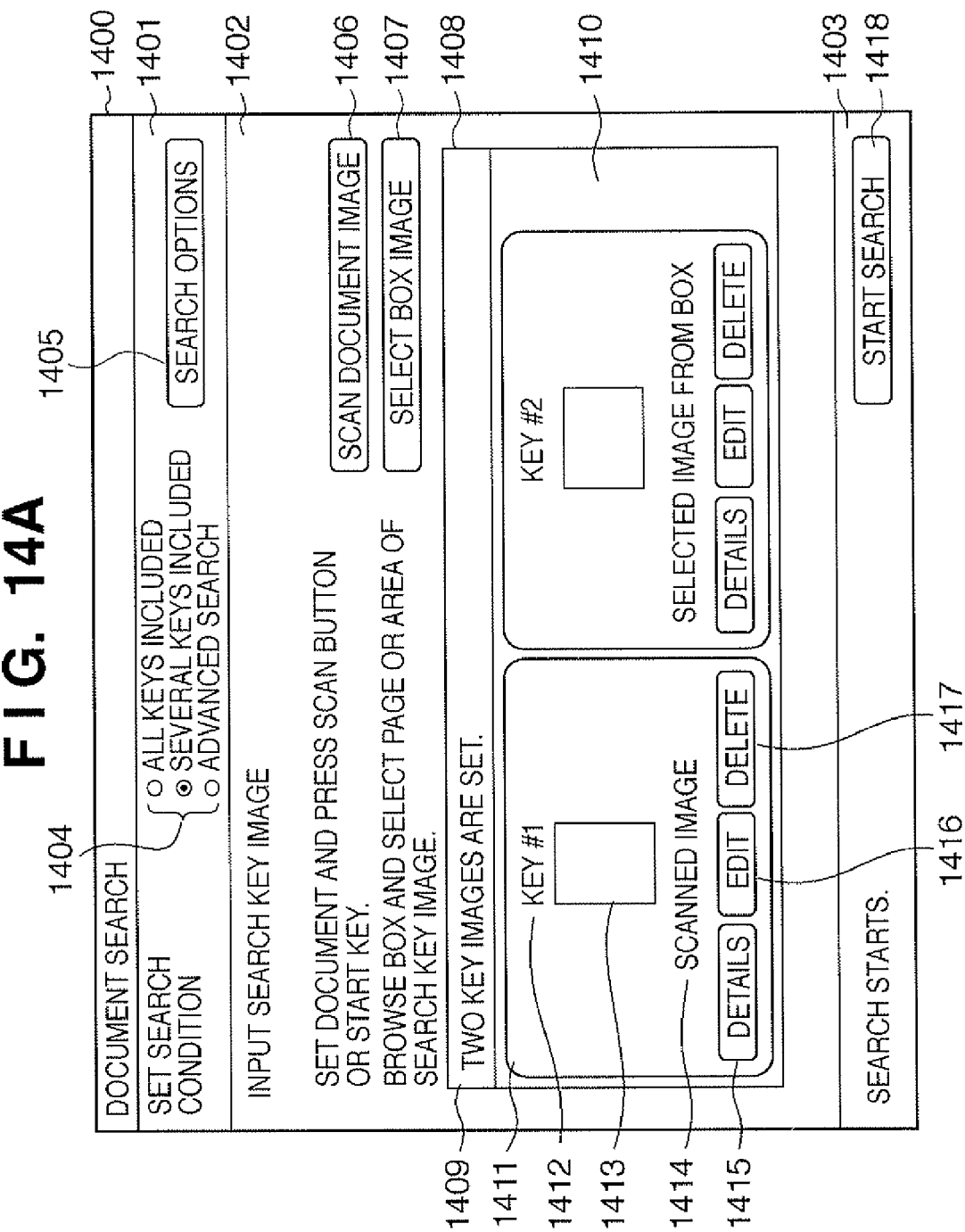
FIGS. 14A and 14B depict views describing examples of document search windows serving as basic windows of a document search application according to the first embodiment.
Figure 14B:
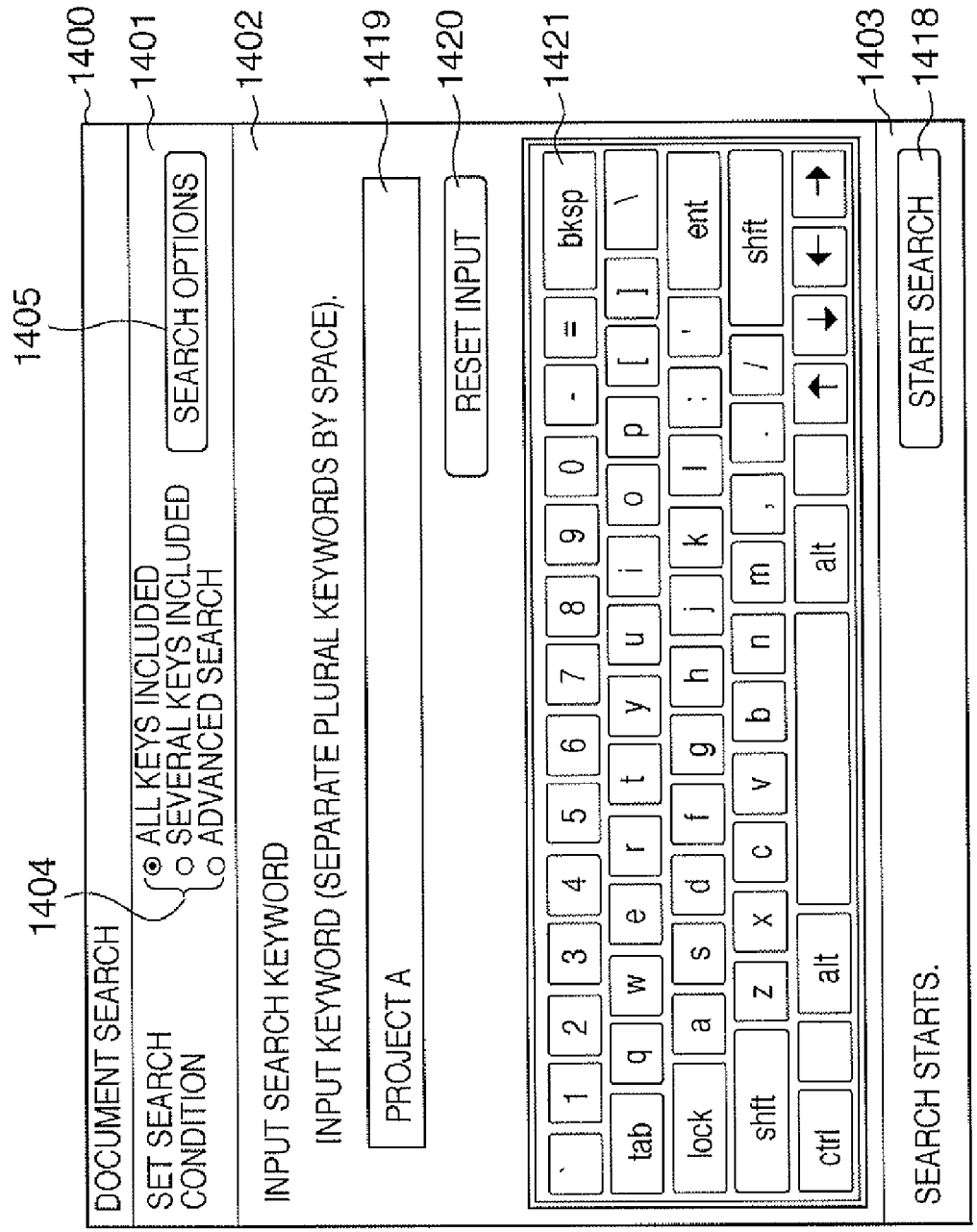

FIGS. 14A and 14B depict views illustrating examples of document search windows serving as basic windows of a document search application according to the first embodiment. In the following drawings, the user presses the display area of an underlined character string to open a corresponding detailed information display window, and can confirm details of each piece of information. The window is displayed on the display area of the console unit 112.

A document search window 1400 is the basic window of the document search application. The document search application according to the embodiment displays the search window 1400 in the display area 702 (FIG. 7) of the console unit 112. The document search window 1400 includes a search conditions setting area 1401, search key input area 1402, and search start designation area 1403.

The search conditions setting area 1401 is an area for setting and confirming search conditions. A search conditions radio button 1404 is used to select a basic search condition and confirm a selected setting. A choice "all keys included" indicates searching for documents hit for all set search keys. "Several keys included" indicates searching for documents hit for some of set search keys. "Advanced search" indicates searching for documents hit under more detailed search conditions set with a search option button 1405. The search option button 1405 is used to open a window for setting detailed search conditions. Setting of detailed search conditions includes setting of advanced search conditions used as a criterion to determine a document hit when search is executed in the advanced search mode. As a detailed search option, a condition to use metadata search and full text search can be set together with similar image search.

Metadata search is a search method of designating a search condition for each of data items stored in the document metadata and page metadata 805 of the document record 801 corresponding to a document, and the job record 808 corresponding to the document record 801. The following search conditions can be set for metadata search. More specifically, the user can designate search conditions based on the document name, owner, creation date, data format, page count, tag, related document, job history (date & time, operator, requesting apparatus, processing apparatus, processing contents, and another document processed by a target job), and page structure information. This enables a search based on a related document and the search history of a target document, in addition to a general search based on the document name, owner, creation date & time, and tag. A page which forms the document can also be searched based on portrait (vertically elongated)/landscape (horizontally elongated), paper size, page count of n (inclusive) to m (exclusive), color/monochrome, and the ratio of an image and text. A document can also be searched based on a job history representing the date, place, operator, and method of processing executed for the document.

In a full text search, a text (character string) is set as a search key, and a document containing the set character string in the full text is searched for. A document text is a text contained in page content data in either the document content data 803 or page record 804 of the document record 801. Text data contained in the document metadata 802 and page metadata 805 can also be added to full text search targets. Text data contained in the job record 808 related to a document can also be added to full text search targets. In this case, when the job record 808 is hit, the corresponding document record 801 is set to be hit, too.

The search key input area 1402 in FIG. 14A is an area for inputting a search key. The search key input area 1402 displays information for setting and confirming an image serving as a search key in a similar image search.

A document scan button 1406 is used to read a document by the scanner 113 of the image processing apparatus 110 and set the image data as a search key in a similar image search. The user presses the document scan button 1406 to open an image scan window. The image scan window allows the user to set document reading parameters, similar to document reading settings for the copy and send functions, and document reading settings of a general scanner device driver based on a well-known interface such as TWAIN. The user presses the start key 505 of the console unit 112 to scan a document according to the set document reading parameters and input the scanned image data as a search key image. If the image scan window is still open upon completion of document scanning, the window disappears. When the user presses the start key 505 without pressing the document scan button 1406, a document is scanned according to default document reading parameters or document reading parameters set at that time.

A box image selection button 1407 is used to select a search key image from pre-stored documents using the box function of the image processing apparatus 110. The box function allows the user to browse the HDD 304 and select a document containing an image to be used as a search key image. Image data and code data stored in the HDDs of the image processing apparatuses 120 and 130, shared file systems laid open to the public by the information processing apparatuses 101 and 102, are also selectable as search key images. Image data and code data accumulated in a shared file system and database system serviced by the server system 140 are also selectable as search key images.

A search key image setting area 1408 is used to confirm and manipulate a group of set search key images. A search key image setting status message 1409 represents the setting status of a search key image, and displays the number of set search key images. A search key image display area 1410 is used to browse set search key images. The area 1410 displays side by side a set of search key icons corresponding to images set as search keys. When the user inputs a search key image with the document scan button 1406 or box image selection button 1407, a search key icon corresponding to a search key image is added to the area 1410. The user can designate scanning of the obverse and reverse of a document sheet or a plurality of document sheets by depressing the document scan button 1406, or reads a document formed from a plurality of pages selected with the box image selection button 1407, and the user can select one or more images as search key images among the images of the pages of the document. In this case, the user can select to add a plurality of search key icons corresponding to image data of the read pages. The user can also select to add one search key icon corresponding to a document containing a plurality of page images. A search key icon 1411 corresponds to one search key image. The user can designate various operations to the search key image via the search key icon 1411. A search key ID 1412 is an identifier for specifying the search key image. A search key thumbnail 1413 is the thumbnail image of the search key image. The user presses the search key thumbnail 1413 to open an image viewer window and display the search key image larger in size than the thumbnail. The user can confirm details of the search key image from the image viewer window. A search key outline 1414 is a display of a simple description of the search key image. A search key details button 1415 is used to confirm detailed information on the search key image. The user can press the button 1415 to open a search key details window which displays information on the search key image in more detail than the search key outline 1414. In the search key details window, the user can set a search condition unique to the search key image. The user can also save the search key image in the box to reuse it in a future search. A search key edit button 1416 is used to edit the search key image. The user presses the button 1416 to open a search key edit window for editing the search key image. In the search key edit window, the user can edit the search key image into a desired one by performing various image processes including trimming, masking, and noise removal. The user can also divide the search key image into a plurality of search key images. One search key image corresponding to a document containing a plurality of page images can be divided into search key images corresponding to the respective page images. A search key delete button 1417 is used to delete the search key image. This description also applies to the search key icon of an image which is selected from the box and has the search key ID 1412 "key #2". For illustrative convenience, the reference numerals of the respective keys are omitted.

The search start designation area 1403 is an area for activating search processing. A search start button 1418 is used to start search processing. The user presses the search start button 1418 to issue a search processing request to the job archive application serviced by the server system 140. At this time, the user requests search processing using search conditions set in the search conditions setting area 1401 and search key images set in the search key input area 1402.

In contrast, the search key input area 1402 in FIG. 14B is an area for inputting a search key. The search key input area 1402 displays information for setting and confirming a keyword serving as a search key in a keyword search. A search keyword field 1419 displays keywords used in a keyword search.

An input reset button 1420 is used to clear a set search keyword. A screen keyboard 1421 is a virtual keyboard on the display unit that is used to set a search keyword.?

Figure 15:
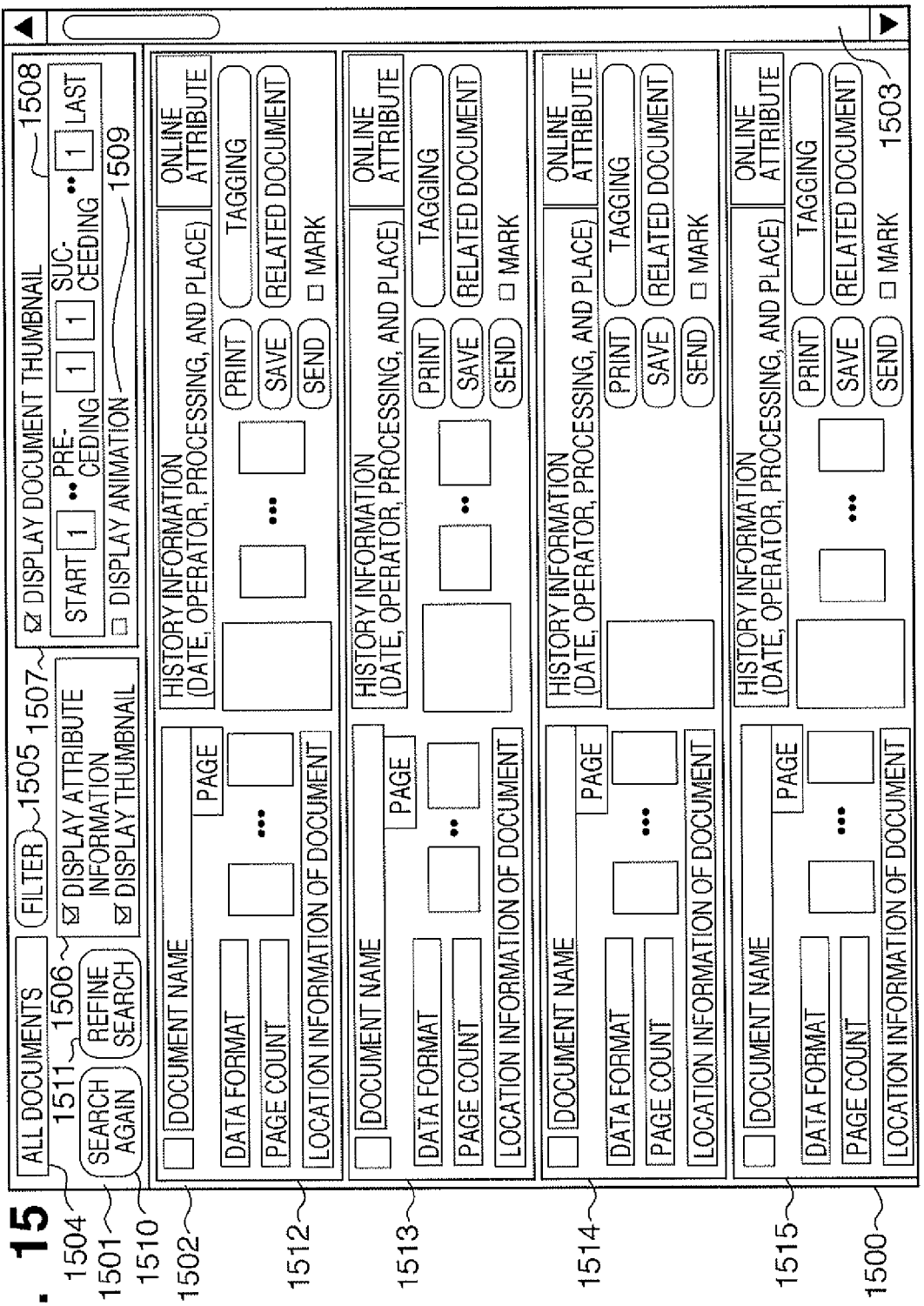
FIG. 15 depicts a view describing an example of a document search result list window in the document search application according to the first embodiment.

FIG. 15 depicts a view illustrating an example of a document search result list window in the document search application according to the first embodiment.

A document search result list window 1500 is an example of a window which displays search results when the document search application receives a response to a search processing request from the job archive application. The document search application according to the embodiment displays the document search result list window in the display area 702 of the console unit 112. The document search result list window 1500 includes a search list operation area 1501, search list display area 1502, and scroll bar 1503.

The search list operation area 1501 is an area for manipulating search result list display control. A display filtering state 1504 exhibits display filtering executed for a document displayed in the search list display area 1502 among a plurality of documents hit in a search. The display filtering state 1504 can display all hit documents (i.e., "all documents", no filtering) received from the retrieval section 212 of the server system 140, or documents selected from hit documents under a condition set by the display filter.

A display filter setting button 1505 is used to set a display filter condition. The user presses the display filter setting button 1505 to open a display filter setting window. The display filter setting window prompts the user to set a desired filter condition. The user can set, as a filter condition, a condition based on various kinds of information contained in the document records 801 of hit documents. More specifically, the user can set, for example, a pattern matching condition for pieces of information stored in the document metadata 802, the page metadata 805 of the page record 804 of a hit page, and the job record 808 related to a document. In other words, the user can set a filter condition similar to a detailed search option settable with the search option button 1405. For example, filtering can be done based on a related document and the search history of a document, in addition to general filtering based on the document name, and creation date & time, and tag. As for a page which forms the document, filtering can be done based on portrait (vertically elongated)/landscape (horizontally elongated), paper size, and page count of n (inclusive) to m (exclusive). Further, filtering can be done based on color/grayscale (continuous tone image)/monochrome binary image, and the ratio of an image and text. Filtering can also be done based on a job-related criterion of the date, place, operator, and method of processing executed for the document.

A display item setting area 1506 is an area for controlling an item to be displayed for each document when the search list display area 1502 displays a document hit in a search. Every time the user presses a checkbox square or a label character string attached to the check box, the check box is alternately switched between selected and deselected states. When "display attribute information" is selected, the search list display area 1502 displays metadata of a document, including the document name, data format, page count, and document location information. When "display thumbnail" is selected, the search list display area 1502 displays the thumbnail image of a page hit under a search condition.

A document thumbnail setting area 1507 is an area for controlling the display form of the document thumbnail of each document when the search list display area 1502 displays a document hit in a search. When "display thumbnail" in the display item setting area 1506 is selected and a check box "display document thumbnail" is selected, a document thumbnail is displayed. The document thumbnail is a set of thumbnails arranged side by side in correspondence with the pages of the document so that the user can easily grasp an outline of the document visually.

A document thumbnail arrangement setting area 1508 is an area for setting the arrangement of thumbnails which form document thumbnails. The document thumbnail arrangement setting area 1508 provides text input fields for inputting four numerical values. Label characters "start", "preceding", "succeeding", and "last" are attached to the text input fields. A numerical value in "start" sets the number of thumbnails of pages from the start page of a document. A numerical value in "preceding" sets the number of thumbnails of pages preceding a page hit in a search. A numerical value in "succeeding" sets the number of thumbnails of pages succeeding a page hit in a search. A numerical value in "last" sets the number of thumbnails of pages from the last page of the document. A document thumbnail animation display check box 1509 is used to set whether to display the animation of a document thumbnail. A re-search button 1510 is used to return to the document search window 1400 shown in FIG. 14A or 14B. A search refinement button 1511 is used to return to the document search window 1400 and execute search again upon refinement. The user presses the search refinement button 1511 after marking a document to be added as a search key (document containing an image to be added as a search key) from documents displayed in the search list display area 1502. Then, the window returns to the document search window 1400 to add the marked document as a search key in the search key image display area 1410. The user can execute search again upon refinement.

It is possible to easily add as many appropriate search key images as possible. The search hit rate of desired documents increases, and the user can easily find out a document the user wants. A similar image more complying with user intention can be found by analyzing the feature amount of an added search key image and adjusting the distribution of various feature amounts in similarity determination. More specifically, it can be determined that a search key image added by the user in search refinement is a sample image with high similarity subjectively for the user who performs search. The distribution to combine a plurality of feature amounts and a similarity determination algorithm is adjusted to more highly evaluate the similarity of the search key image. For example, when original and added search key images have high shape-based similarity and low tone-based similarity, priority is given to shape-based similarity over tone-based similarity in search refinement. In the same way, the distribution can be properly adjusted by giving priority to tone, color pattern, object structure tree, or the like.

The search list display area 1502 is an area for displaying a list of documents meeting a search condition as a result of a search. Each of search hit document displays 1512, 1513, 1514, and 1515 displays information corresponding to a document meeting the search condition. At a default setting, a document having a higher hit rate is displayed higher in the list. When documents have the same hit rate, a document having a higher document rank (rank information) numerically representing a document value is displayed higher in the list. At this time, the user can press the filter setting button 1505 to rearrange documents in an order other than the default and display them again in the document list. For example, documents can be displayed in ascending or descending order based on various metadata related to the documents, including the document creation date, final reference date, document name, data format, page count, document location information, and the date & time, operator, apparatus, and processing contents of a job executed for the document. Note that the list display is updated immediately when the display order of the search list is set again. In each hit document display of the search list display area 1502, "document name", "page", "history information", "online attribute", "data format", "page count", and "document location information" display the actual values of a document in corresponding metadata.

The document hit rate which determines a default display order will be explained in brief. Similar image search is based on similarity unique to each algorithm. Similarity is generally a continuous amount expressing the "degree of similarity" and does not take a binary value "similar or different". However, an image whose similarity is lower than a predetermined threshold is regarded as a different image and discarded for implementation of the embodiment. Images whose similarity is higher than the predetermined threshold are classified into images of relatively high similarity and those of relatively low similarity. The hit rate is calculated higher for a document containing an image having higher similarity to a given search key image than a document containing an image having relatively low similarity. Since a plurality of search keys can be designated, the hit rate of a document meeting a larger number of search conditions is set higher than that of a document meeting a smaller number of search conditions. When a plurality of search key images are designated in a similar image search, the hit rate of a document containing many images having high similarity is set high. When the radio button "all keys included" in FIGS. 14A and 14B is selected to perform a search, no document is hit unless a document matches all the given search keys. Note that the total number of documents displayable in one window may be increased by simplifying or downsizing a document displayed low in the list among documents displayed in the search list display area 1502, compared to a document displayed high.

The scroll bar 1503 is used to scroll the document search result list window 1500. In most cases, many documents are displayed in the search list display area 1502, and all of them cannot fall within the display area of the display 501 of the console unit 112. For this reason, while scrolling the window, the user finds out a desired document from the document list. A page feed button (not shown) or the like may be arranged at, for example, the bottom of the search list display area 1502 to display a list of found documents divisionally on a plurality of pages. The document search result list may be printed in response to press of a list print button (not shown) arranged at, for example, the button of the search list display area 1502.

Figure 16:
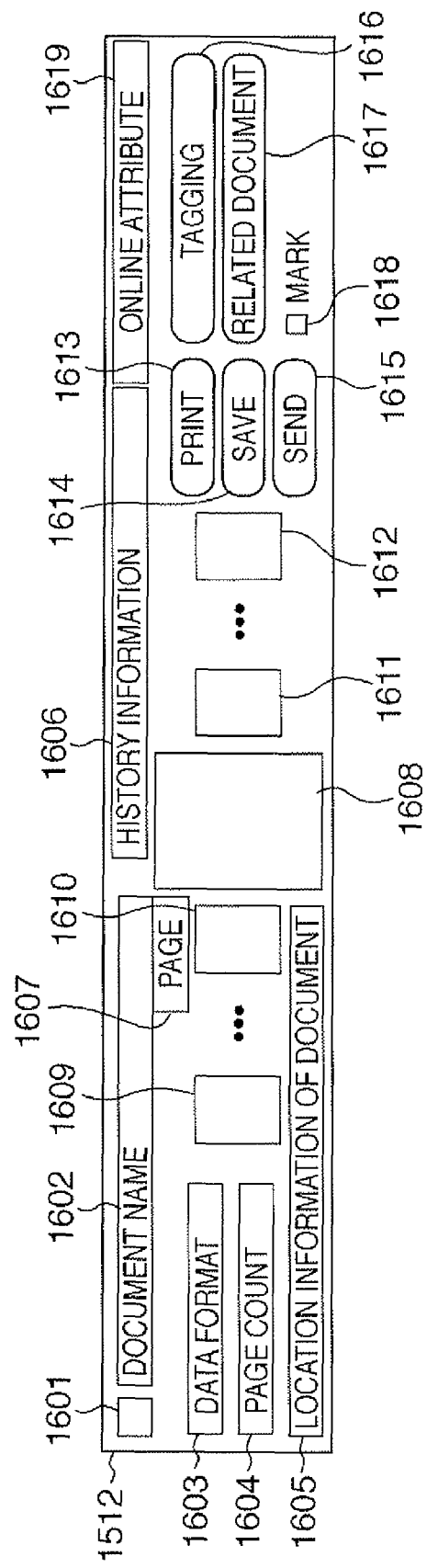
FIG. 16 depicts a view describing an example of a search hit document display according to the first embodiment.

FIG. 16 depicts is a view describing an example of a search hit document display according to the first embodiment. Since the search hit document displays 1512 to 1515 in FIG. 15 have the same arrangement, the search hit document display 1512 will be exemplified.

A data format icon 1601 represents the data format of a searched document. A document name 1602 displays the document name of the searched document. A data format 1603 displays the data format of the document. A page count 1604 displays the page count of the document. Document location information 1605 displays information for specifying a storage position such as a file server where the document is saved. The document location information is identified by a URI, or a file path character string in the file server and file system. If the searched document is a document archived in the job archive system, then the document location information may display a position where copy data of the document collected by the job is saved. If a position where original data of the document is saved can be specified, the document location information may display the position. History information 1606 represents the history of job processing and search executed in the past for the searched document. From the history information 1606, the user can confirm processing executed for the searched document, the time of the processing, the operator, and the apparatus used for the processing. A page 1607 displays the page number of a page hit under the condition of a search key among the pages of the searched document. A hit page thumbnail 1608 displays a thumbnail image representing an outline of a page hit under the condition of the search key among the pages of the document. A start page thumbnail 1609 displays a thumbnail image representing an outline of the start page of the document. In this case, as many thumbnail images as a page count set in the document thumbnail arrangement setting area 1508 of FIG. 15 are displayed side by side. A preceding page thumbnail 1610 displays a thumbnail image representing an outline of a page preceding a page hit for the search key. In this case, as many thumbnail images as a page count set in the document thumbnail arrangement setting area 1508 are displayed side by side. A succeeding page thumbnail 1611 displays a thumbnail image representing an outline of a page succeeding a page hit for the search key. In this case, as many thumbnail images as a page count set in the document thumbnail arrangement setting area 1508 are displayed side by side. A last page thumbnail 1612 displays a thumbnail image representing an outline of the last page of the document. In this case, as many thumbnail images as a page count set in the document thumbnail arrangement setting area 1508 are displayed side by side.

When displaying an enormous number of pages in the document thumbnail, the pages are adjusted so that small thumbnails at a higher reduction ratio are displayed to display many thumbnail images in a limited display area. Alternatively, the thumbnail of a page with relatively low priority may be downsized and displayed, or an overlapping page may be arranged and displayed so that part of it is hidden under a preceding page. Alternatively, pages are desirably adjusted so that their thumbnails are fitted in a limited display area by omitting the display. If the display area is insufficient, then a page having high priority to display it preferentially in the document thumbnail is selected according to the following algorithm. For example, an early page of a document, or a page hit first in correspondence with a designated search key is displayed preferentially. If pages are hit under a similar image search condition, a page having higher similarity may be displayed preferentially.

A print button 1613 is used to print the document. A save button 1614 is used to save the document in the box function. A send button 1615 is used to send the document by the send function. A tagging button 1616 is used to manipulate the tag of the document. The user presses the tagging button 1616 to open a document tag window. The user can check and edit a tag already set for the document, and newly add and register an arbitrary tag. A related document button 1617 is used to manipulate a document related to the document. The user presses the related document button 1617 to open a related document window. The user can check and edit a document related to the document, and add and register a relation between the document and another one. A marking check box 1618 is used to mark the document. When selectively manipulating some of documents displayed in the list, only documents for which the check box is selected are manipulated. For example, if the user selects the marking check box 1618 and then presses the search refinement button 1511, a re-search continues while adding the marked documents to search keys. An online attribute 1619 represents whether the document is input by offline input processing. If the document is input by offline input processing, "re-digitized input" is displayed; otherwise, "online" is displayed.

Figure 17:
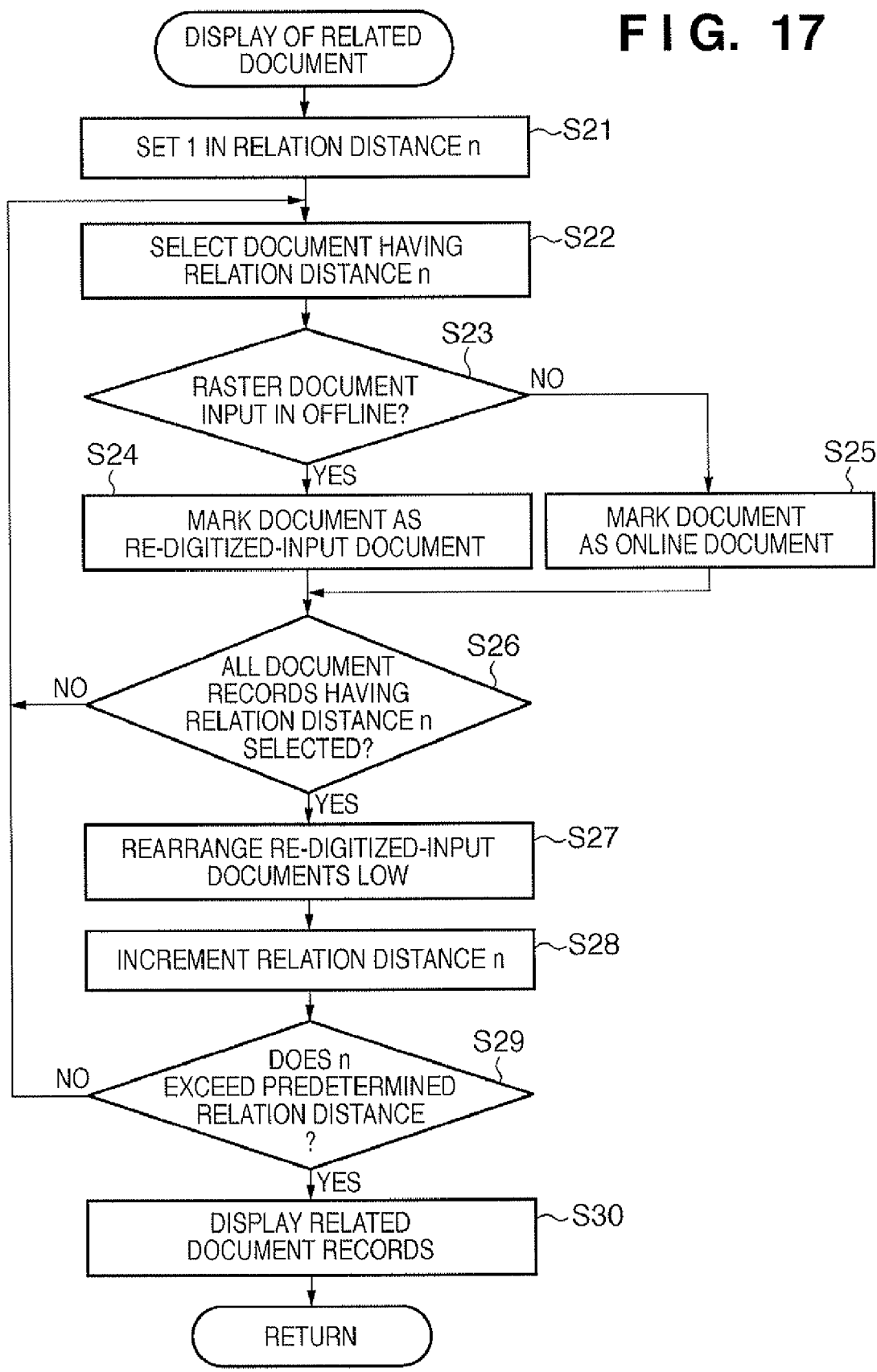
FIG. 17 is a flowchart describing the sequence of processing to display documents related to a document of interest by the document search application according to the first embodiment.

FIG. 17 is a flowchart describing the sequence of processing to display document data related to document data found by the document search application according to the first embodiment. The sequence is part of processing by the document search application, and executed by the CPU 301 of the image processing apparatus 110. The sequence starts when, for example, the user presses the related document button 1617 (FIG. 16) of the search hit document display 1512 for a document corresponding to a document of interest.

In step S21, "1" is set in a relation distance n (n is held in the variable area of the RAM 302) of a related document to be searched for. The process advances to step S22 to search for and select a document record having the relation distance n from the document of interest. The relation distance indicates the minimum value of the number of relation records present between a document record of interest and a related document reachable via relation records linked to the document record of interest in the DB management system data structure 901. When n is "1", document records each reachable via one relation record from a document record of interest are found to select one of them. The process then advances to step S23 to determine whether or not the selected related document has been input offline. If the selected related document has been input offline, the process advances to step S24; if it has not been input offline, the process advances to step S25. In step S24, the selected related document is marked as a re-digitized input document, and the process advances to step S26. In step S25, the selected related document is marked as an online document, and the process advances to step S26. In step S26, it is determined whether all document records having the relation distance n have been selected. If it is determined in step S26 that all document records having the relation distance n have been selected, the process advances to step S27; if not all the document records have been selected, the process returns to step S22 to repeat the foregoing processing.

In step S27, the selected document records having the relation distance n are rearranged to display a re-digitized input document lower than an online document. More specifically, the selected document records are rearranged so that a related document record based on an estimated relation record is displayed lower than one based on a more definite relation record. Thereafter, the process advances to step S28 to increment the relation distance n by one. The process advances to step S29 to determine whether or not the relation distance n has exceeded a system default value or a relation distance designated by the user. If it is determined in step S29 that the relation distance n has not exceeded the system default value or designated relation distance, the process returns to step S22 to execute the above-described processing. If it is determined that the relation distance n has exceeded the system default value or designated relation distance, the process advances to step S30 to display found related document records, and then the process ends. At this time, the document records are rearranged in step S27 so that a re-digitized input document is displayed low. Among documents having the same relation distance, an online document is displayed higher than a re-digitized input document.

According to the sequence in FIG. 17, related document records having the same relation distance are rearranged to display a re-digitized input document low. Instead, a re-digitized input document may be displayed low among all found related document records.

Figure 18:
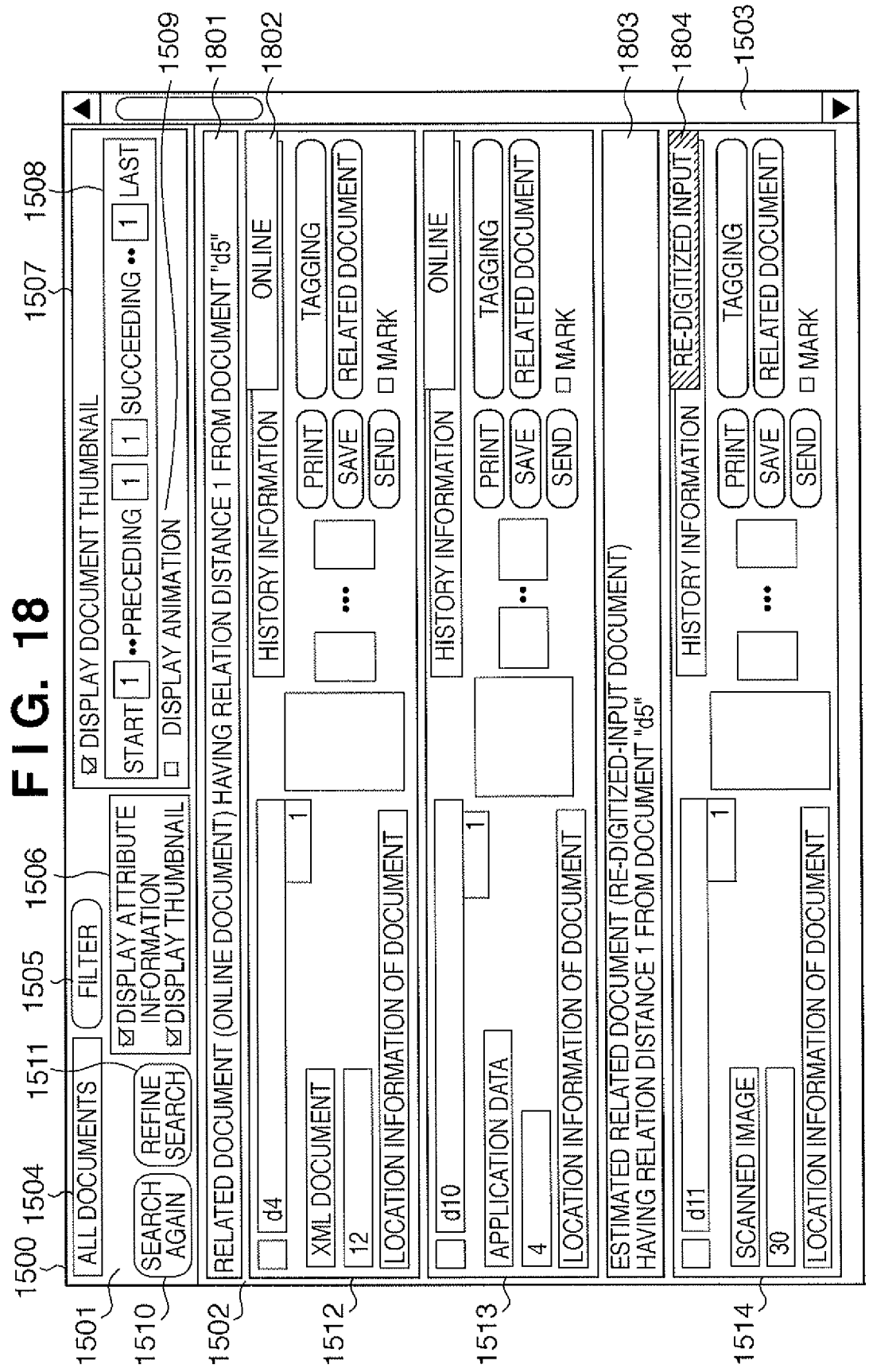
FIG. 18 depicts a view describing an example of a window for the display result of a related document search result list for a document of interest by the document search application according to the first embodiment.

FIG. 18 depicts a view illustrating an example of a window for the display result of a related document search result list for a document of interest by the document search application according to the first embodiment. This window presents, to the user, the correspondence between a document found under search conditions designated in the window shown in FIG. 14A or 14B and related documents found according to the flowchart shown in FIG. 17 as documents related to the found document. The same reference numerals as those in FIG. 15 denote the same parts, and a description thereof will not be repeated. The related document search result list window appears according to, for example, the sequence shown in the flowchart of FIG. 17.

An online document label 1801 having the relation distance "1" represents that document records displayed below are online documents linked to a document of interest at the relation distance "1". An online document display 1802 is a display example of the online attribute 1619 (FIG. 16). In this example, the online document display 1802 represents that a document record corresponding to the search hit document display 1512 is an online document. A re-digitized input document label 1803 having the relation distance "1" represents that document records displayed below are re-digitized input documents linked to the document of interest at the relation distance "1". A re-digitized input document display 1804 is a display example of the online attribute 1619. In this example, the re-digitized input document display 1804 represents that a document record corresponding to the search hit document display 1514 is a re-digitized input document.

In this fashion, a re-digitized input document is displayed lower than an online document in the display of the related document list.

Search and relating of a document to an input document need not be completed immediately after input processing. Batch processing to perform search and relating in a sufficient time may be scheduled.

The DB management system 201 of the job archive system need not be entirely incorporated in the large-volume storage unit 142. A storage and database management system may be distributed in a plurality of apparatuses to build a distributed database and enable a distributed search. For example, a distributed database system can be configured based on the storages of the personal computers 101 and 102 and the HDDs 304 of the image processing apparatuses 110, 120, and 130.

As described above, according to the first embodiment, existing document records in the document DB can be searched for a related document in offline input processing of a document by scanning or facsimile reception. The input document can be stored in relation to the found related document record. When searching for a document record related to one in the document DB, even a document stored by offline input processing can be found as a related document. A document record generated by offline input processing of a document is assigned with unique metadata such as a job history unique to a scan job or facsimile reception job. This can increase the information amount and value obtained from the result of searching for a document related to a document of interest. For example, history information of job processing representing processing executed for a document, the operator, and the time and place of the processing can be held, too. Based on these items of information, even a paper document can be easily found.

It has conventionally been difficult to find out an offline-input document in a code data-based search such as a keyword search. To the contrary, the arrangement of the embodiment can easily find a desired re-digitized input document by tracking it as a related document from an online document hit in the search.

In a system having no development section 210, it is difficult to find out a code document in a similar image search or page structure information-based search. The embodiment can easily find a desired document input as a code document by tracking it as a related document from a re-digitized input document hit in the search.

According to the first embodiment, the search result display of a related document search can provide a display for identifying a document record stored by offline input processing of a document. The user can discriminate online document data and re-digitized input document data at a glance among documents in the search result list.

According to the first embodiment, a document record stored by offline input processing of a document is displayed lower than other document records in the search result display of a related document search. The user can easily see information of a related document, based on code information or online information, earlier than that of a related document based on an estimated relation.

[Second Embodiment]

The second embodiment of the present invention will be described. The second embodiment allows referring to a related re-digitized input document from an online document.

Figure 19:
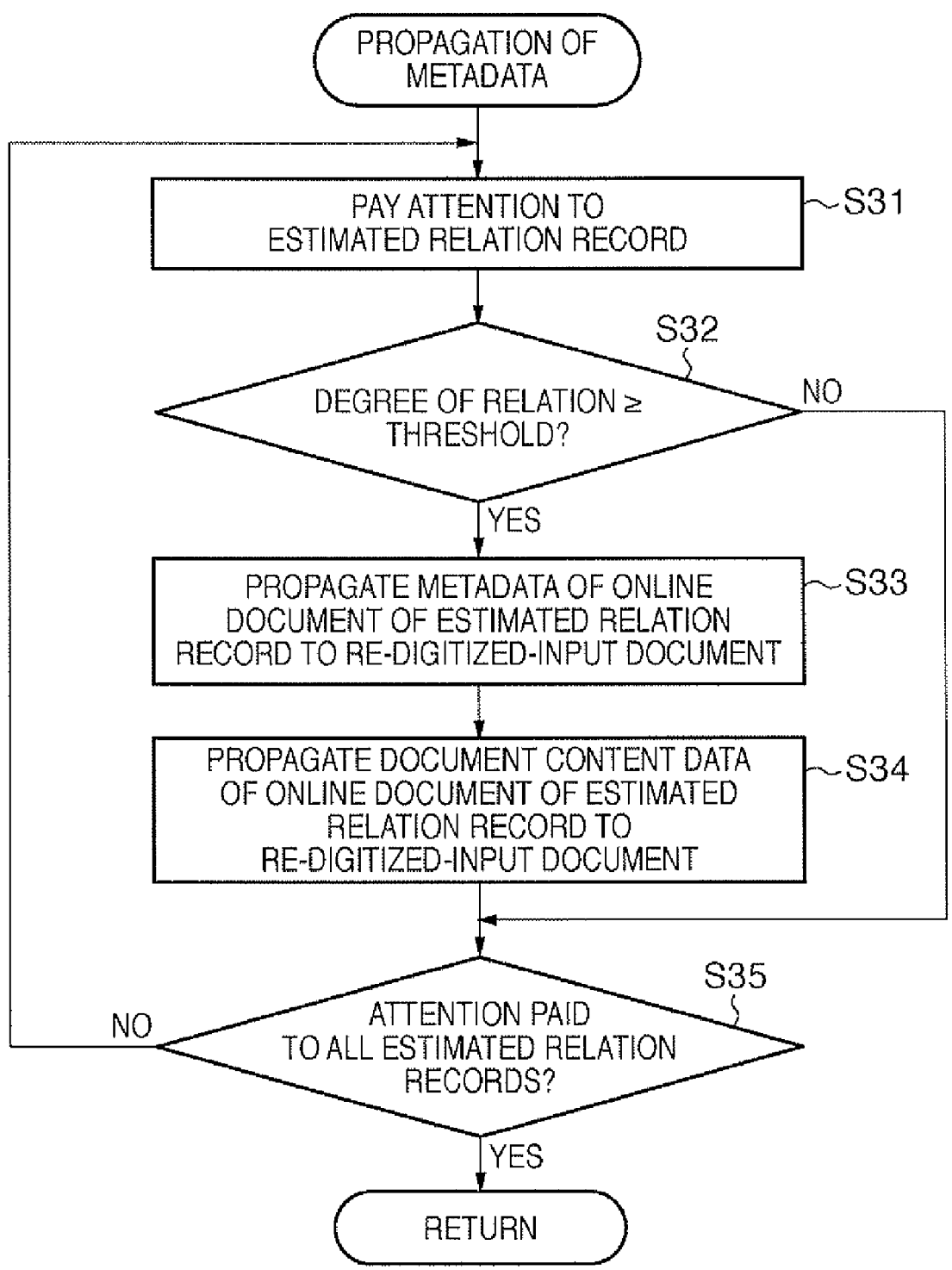
FIG. 19 is a flowchart describing the sequence of processing to propagate metadata and content data from an existing document record to a re-digitized input document record by a document search application according to a second embodiment of the present invention.

FIG. 19 is a flowchart describing the sequence of processing to propagate metadata and content data from an existing document record to a re-digitized input document record by a document search application according to the second embodiment of the present invention. The hardware configurations of a system, image processing apparatus, and the like according to the second embodiment are the same as those in the first embodiment, and a description thereof will not be repeated.

Figure 23:
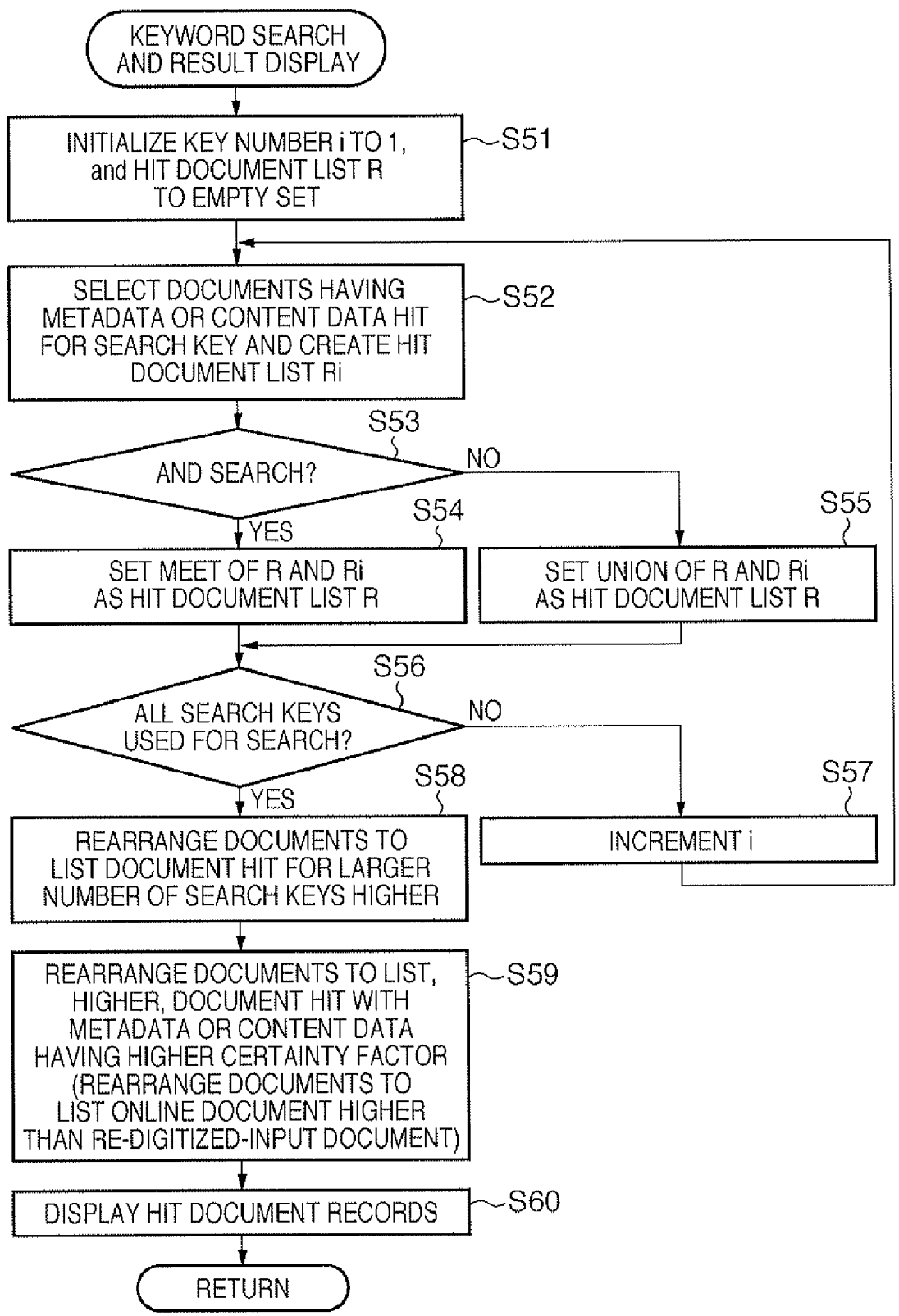
FIG. 23 is a flowchart describing the sequence of keyword search and result display processing by the document search application according to the second embodiment.

The CPU 301 of the image processing apparatus 110 executes this sequence as, for example, processing to manipulate a data structure in the DB management system 201 shown in FIG. 12. The sequence is executed in association with relation records r11 and r12 added by estimation. Thus, the sequence is activated as an additional step for post-processing of offline input processing of raster document data in a document input processing sequence as shown in FIG. 10 described above. Alternatively, the sequence may be activated as batch processing independent of the document input sequence. The sequence may also be activated as pre-processing of search processing as shown in FIG. 23 to be described later.

In step S31, attention is paid to one of estimated relation records. The process advances to step S32 to determine whether or not the degree of relation assigned to the estimated relation record of interest is equal to or higher than a predetermined threshold. If it is determined in step S32 that the degree of relation is equal to or higher than the threshold, the process advances to step S33; if it is determined that the degree of relation is lower than the threshold, the process advances to step S35. In step S33, metadata assigned to online documents already present in the document DB 202 for a set of document records related by the estimated relation record is propagated to a re-digitized input document added to the document DB 202. That is, the same metadata as those assigned to the existing documents is assigned to the added document. The metadata may be propagated by copying document metadata 802. Alternatively, the document metadata 802 of the added document record may be linked to refer to the document metadata 802 of the existing document records.

After that, the process advances to step S34 to propagate, to the re-digitized input document added to the document DB 202, document content data assigned to the online documents already present in the document DB 202 for a set of document records related by the estimated relation record. That is, the same document content data as those assigned to the existing documents is propagated to the added document. The document content data may be propagated by copying document content data 803. Alternatively, the document content data 803 of the added document record may be linked to refer to the document content data 803 of the existing document records. The process then advances to step S35. In step S35, it is determined whether attention has been paid to all estimated relation records. If attention has been paid to all estimated relation records, a series of procedures ends. If attention has not been paid to all estimated relation records, the process returns to step S31 to pay attention to a new estimated relation record and repeat the series of the above described procedures.

Figure 20:
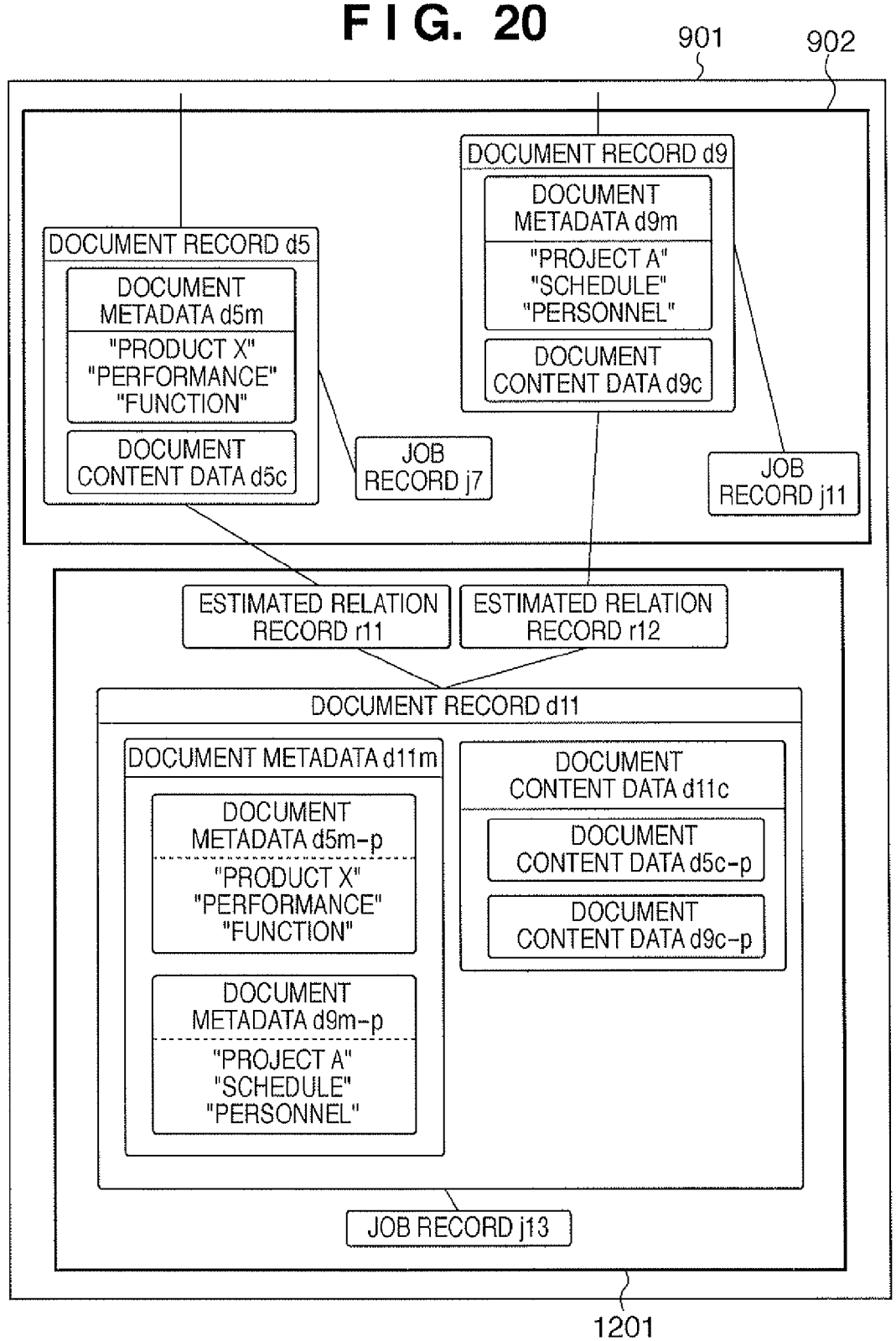
FIG. 20 depicts a view describing an example of a data structure built in a DB management system as a result of propagating metadata and content data to the document record of a re-digitized input document in the second embodiment.

FIG. 20 depicts a view describing a data structure built in the DB management system 201 as a result of propagating metadata and content data to the document record of a re-digitized input document in the second embodiment.

Before performing offline input processing of raster document data, a data structure 902 in the DB management system 201 contains existing document record instances d5 and d9. The document record instance d5 holds corresponding document metadata instance d5$m$ and document content data instance d5$c$. For example, three character strings "product X", "performance", and "function" are assigned to the tag of the document metadata instance d5$m$. The document record instance d9 holds corresponding document metadata instance d9$m$ and document content data instance d9$c$. For example, three character strings "project A", "schedule", and "personnel" are assigned to the tag of the document metadata instance d9$m$.

A data structure 1201 added by offline input processing of raster document data contains a document record instance d11 generated by the input processing, and estimated relation record instances r11 and r12 which relate the document to existing document records estimated to have a relation. The estimated relation record instance r11 links the existing online document record instance d5 to the re-digitized input document record instance d11. The estimated relation record instance r12 links the existing online document record instance d9 to the re-digitized input document record instance d11. The document record instance d11 is generated by offline input processing of raster document data, so document metadata and coded content data obtained by the document input processing itself are very poor or blank. For this reason, the document record instance d11 receives metadata and content data propagated from a related document according to the propagation processing sequence of metadata shown in the flowchart of FIG. 19.

The document metadata instance d11$m$ contains information of document metadata instance d5$m$-$p$ propagated from the document metadata instance d5$m$, and that of document metadata instance d9$m$-$p$ propagated from the document metadata instance d9$m$. That is, the tag of the document metadata instance d11$m$ is handled equivalently to a tag to which, for example, six character strings "product X", "performance", "function", "project A", "schedule", and "personnel" are assigned. The document content data instance d11$c$ contains the contents of document content data instance d5$c$-$p$ propagated from the document content data instance d5$c$, and those of document content data instance d9$c$-$p$ propagated from the document content data instance d9$c$.

Figure 21:
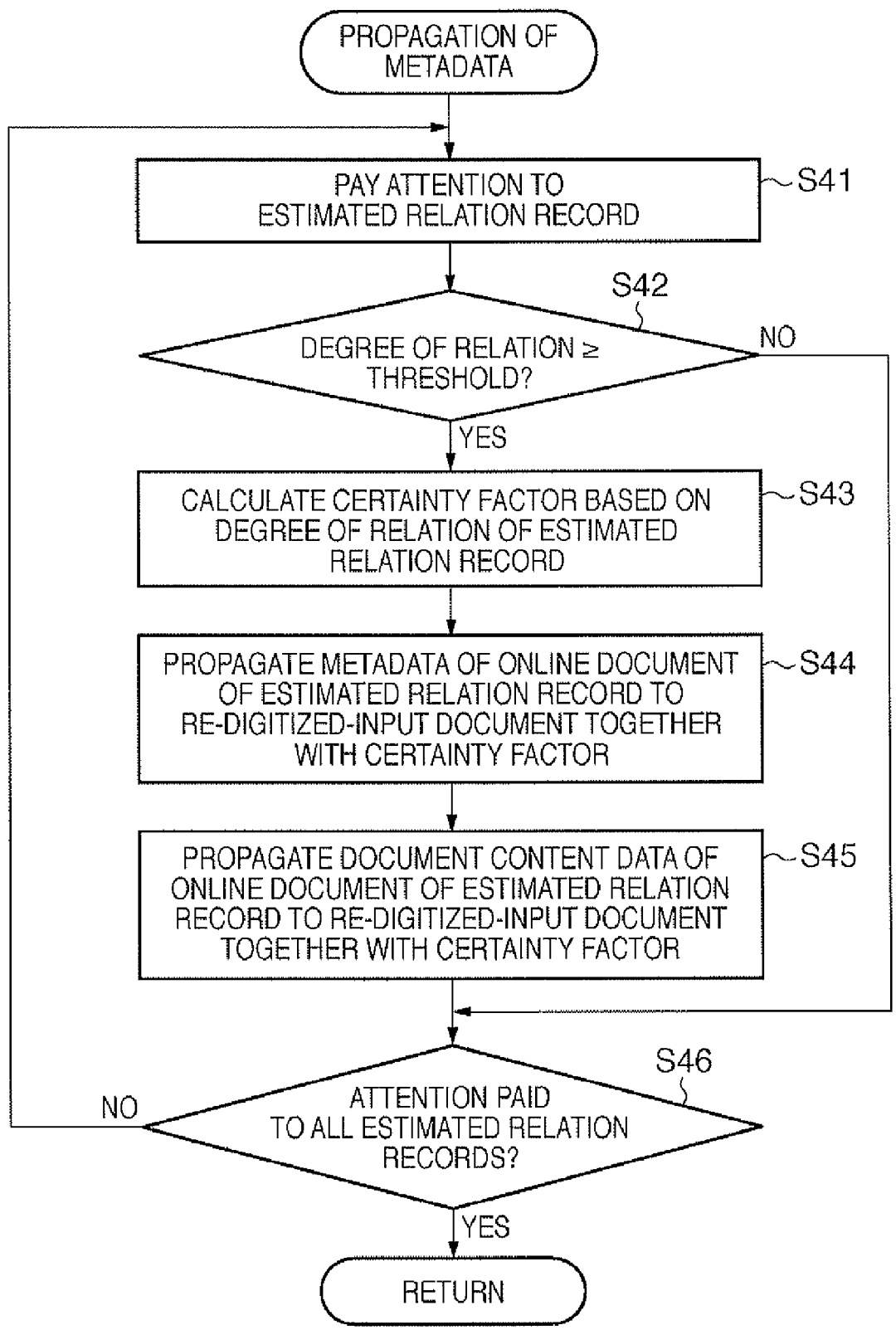
FIG. 21 is a flowchart describing the sequence of processing to propagate metadata and content data from an existing document record to a re-digitized input document record based on the certainty factor by the document search application according to the second embodiment.

FIG. 21 is a flowchart describing the sequence of processing to propagate metadata and content data from an existing document record to a re-digitized input document record based on the certainty factor by the document search application according to the second embodiment. This flowchart is a modification of the sequence shown in FIG. 19. For example, the CPU 301 of the image processing apparatus 110 executes this sequence as processing to manipulate a data structure in the DB management system 201 shown in FIG. 12. The sequence is executed in association with relation record instances r11 and r12 added by estimation. The sequence is therefore activated as an additional step for post-processing of offline input processing of raster document data in a document input processing sequence as shown in FIG. 10. Alternatively, the sequence may be activated as batch processing independent of the document input sequence. The sequence may also be activated as pre-processing of search processing as shown in FIG. 23.

In step S41, attention is paid to one of estimated relation records. The process advances to step S42 to determine whether the degree of relation assigned to the estimated relation record of interest is equal to or higher than a predetermined threshold. If it is determined in step S42 that the degree of relation is equal to or higher than the threshold, the process advances to step S43; if it is lower, the process advances to step S46. In step S43, the certainty factor of the relation is calculated based on the degree of relation assigned to the estimated relation record of interest. Relation estimation between a re-digitized input document record and an existing document record includes certain estimation based on a match of the document ID or medium ID and uncertain estimation based on similarity determination of a page image. For example, the degree of relation within a certain range based on the magnitude of similarity or the like is assigned to an estimated relation record determined by image similarity, expressing the certainty factor of the relation. The certainty factor of an estimated relation is calculated according to a predetermined algorithm based on the relation type and type-specific degree of relation.

The process advances to step S44 to propagate, together with the certainty factor to a re-digitized input document added to the document DB 202, metadata assigned to online documents already present in the document DB 202 for a set of document records related by the estimated relation record. That is, the same metadata as those assigned to the existing documents is assigned to the added document. The metadata may be propagated by copying the document metadata 802. Alternatively, the document metadata 802 of the added document record may be linked to refer to the document metadata 802 of the existing document records.

The process then advances to step S45 to propagate, together with the certainty factor to the re-digitized input document added to the document DB 202, document content data assigned to the online documents already present in the document DB 202 for a set of document records related by the estimated relation record. That is, the same document content data as those assigned to the existing documents is assigned to the added document. The document content data may be propagated by copying the document content data 803. Alternatively, the document content data 803 of the added document record may be linked to refer to the document content data 803 of the existing document records. Thereafter, the process advances to step S46.

In step S46, it is determined whether or not attention has been paid to all estimated relation records. If attention has not been paid to all estimated relation records, the process returns to step S41. If attention has been paid to all estimated relation records, the process ends.

The second embodiment propagates metadata and content data of a document record related to a re-digitized input document record. Accordingly, a re-digitized input document can be searched for based on the metadata and content data.

Figure 22:
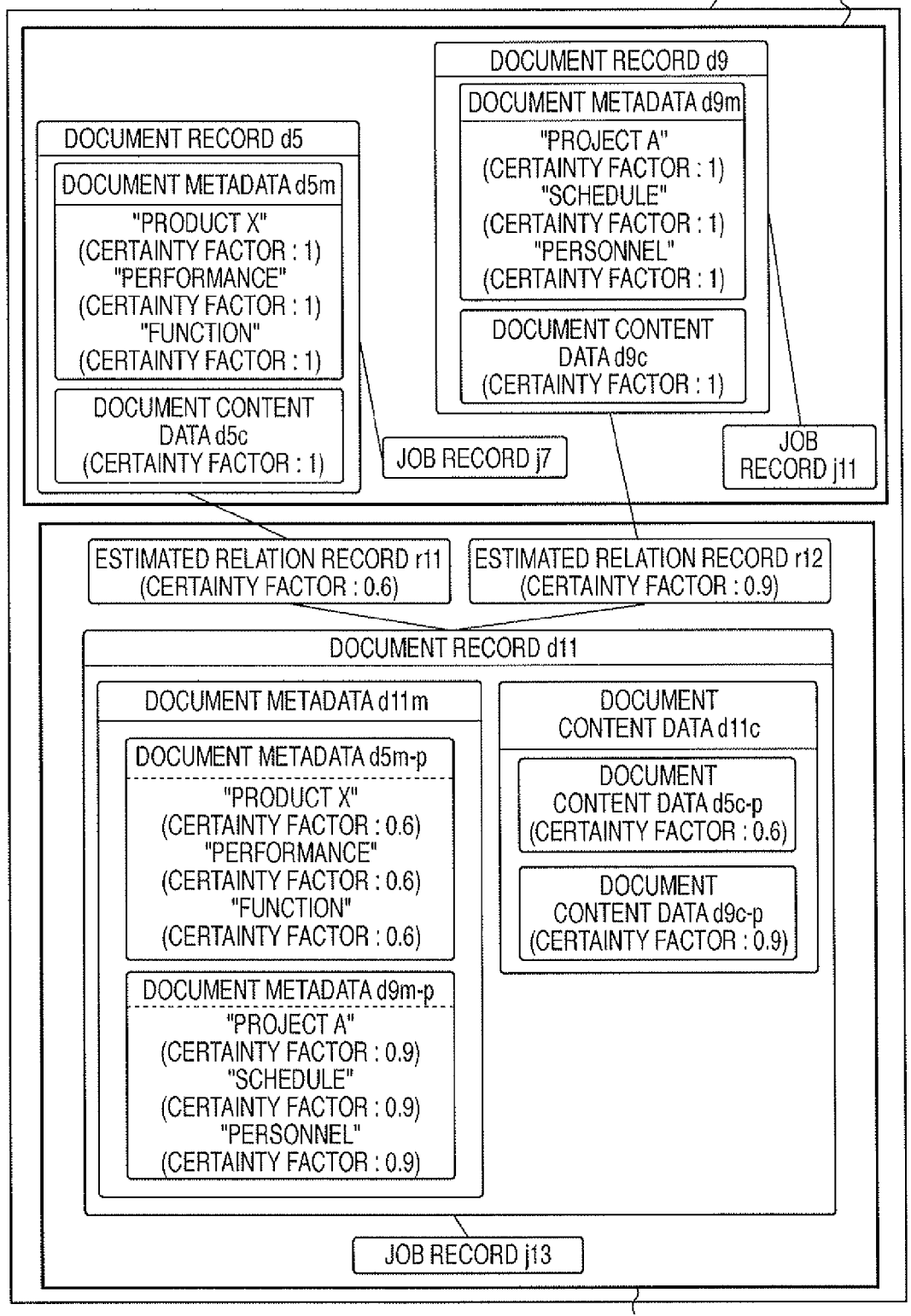
FIG. 22 depicts a view describing an example of a data structure built in the DB management system as a result of propagating metadata and content data together with the certainty factor to the document record of a re-digitized input document by the document search application according to the second embodiment.

FIG. 22 depicts a view describing a data structure built in the DB management system 201 as a result of propagating metadata and content data together with the certainty factor to the document record of a re-digitized input document by the document search application according to the second embodiment. This data structure is a modification of the data structure shown in FIG. 20, and the same reference numerals as those in FIG. 20 denote the same parts.

Before performing offline input processing of raster document data, the data structure 902 in the DB management system 201 contains the existing document record instances d5 and d9. The document record instance d5 holds corresponding document metadata instance d5m and document content data instance d5c. Since the document record instance d5 is generated by, for example, print processing of a code data document, the assigned metadata and content data have a certainty of certainty factor "1". For example, three character strings "product X", "performance", and "function" are assigned to the tag of the document metadata instance d5m.

The document record instance d9 holds corresponding document metadata instance d9m and document content data instance d9c. Since the document record instance d9 is generated by, for example, accumulation processing of a code data document, the assigned metadata and content data have a certainty of certainty factor "1". For example, three character strings "project A", "schedule", and "personnel" are assigned to the tag of the document metadata instance d9m.

The data structure 1201 added by offline input processing of raster document data contains the document record instance d11 generated by the input processing, and the estimated relation record instances r11 and r12 which relate the document to existing document records estimated to have a relation. The estimated relation record instance r11 links the existing online document record instance d5 to the re-digitized input document record instance d11. Since the estimated relation record instance r11 exhibits a relation estimated by, for example, image similarity determination, "0.6" is assigned as the degree of estimated relation. The estimated relation record instance r12 links the existing online document record instance d9 to the re-digitized input document record instance d11. Since the estimated relation record instance r12 exhibits a relation estimated by, for example, similarity determination of the fiber pattern (paper fingerprint) of a paper medium, "0.9" is assigned as the degree of estimated relation.

The document record instance d11 is generated by offline input processing of raster document data, so document metadata and coded content data obtained by the document input processing itself are very poor or blank. For this reason, the document record instance d11 receives metadata and content data propagated from a related document based on the degree of relation according to the propagation processing sequence of metadata shown in the flowchart of FIG. 19. The document metadata instance d11m contains information of the document metadata instance d5m-p propagated from the document metadata instance d5m, and information of the document metadata instance d9m-p propagated from the document metadata instance d9m. That is, the tag of the document metadata instance d11m is handled equivalently to a tag to which, for example, three character strings "product X", "performance", and "function" are assigned with a certainty factor of "0.6", respectively. Further, the tag of the document metadata instance d11m is handled equivalently to a tag to which, for example, three character strings "project A", "schedule", and "personnel" are assigned with a certainty factor of "0.9", respectively. The document content data instance d11c contains the contents of the document content data instance d5c-p propagated from the document content data instance d5c, and the contents of the document content data instance d9c-p propagated from the document content data instance d9c. A certainty factor of "0.6" is assigned to the content data instance d5c-p, whereas a certainty factor of "0.9" is assigned to the content data instance d9c-p.

When propagating metadata and content data between document records having a relation distance of two or more, the degree of relation is decreased for a longer relation distance. That is, data propagated from a distant document record has a lower certainty factor.

FIG. 23 is a flowchart describing the sequence of keyword search and result display processing by the document search application according to the second embodiment. For example, the CPU 301 of the image processing apparatus 110 executes this sequence as processing to manipulate a data structure in the DB management system 201 shown in FIG. 12.

In step S51, a key number i representing a key of interest in a supplied search key list is initialized to "1", and a search hit document list R is initialized to an empty set. The process advances to step S52 to select documents each having metadata or content data hit for a search key, and create a hit document list Ri. Note that the key number i, search hit document list R, and hit document list Ri are set in a RAM 302. The process advances to step S53 to determine whether or not the search condition is an AND search. If the search condition is an AND search, the process advances to step S54; if it is not an AND search, the process proceeds to step S55. In step S54, a logical AND of a document set included in the search hit document list R and a document set included in the hit document list Ri is set as a new search hit document list R. The process then advances to step S56. In step S55, a logical OR of a document set included in the search hit document list R and a document set included in the hit document list Ri is set as a new search hit document list R. The process then advances to step S56. In step S56, it is determined whether all supplied search keys have been used for the search. If it is determined that not all supplied search keys have been used for the search, the process advances to step S57 to increment, by one, the key number i representing a key of interest in the supplied search key list. After then, the process advances to step S52.

If it is determined in step S56 that all supplied search keys have been used for the search, the process advances to step S58 to rearrange documents in the search hit document list R so that a document hit for a larger number of search keys is listed higher. After that, the process advances to step S59 to rearrange documents hit for the same number of keys so that a document hit for metadata having a higher certainty factor or a document hit for content data is listed higher. That is, documents are rearranged so that an online document is listed higher than a re-digitized input document. Also, re-digitized input documents are rearranged so that a document hit for data propagated via an estimated relation having a higher degree of relation is listed higher. The process advances to step S60 to display appropriately rearranged search hit document records. Then, the process ends.

Figure 24B:
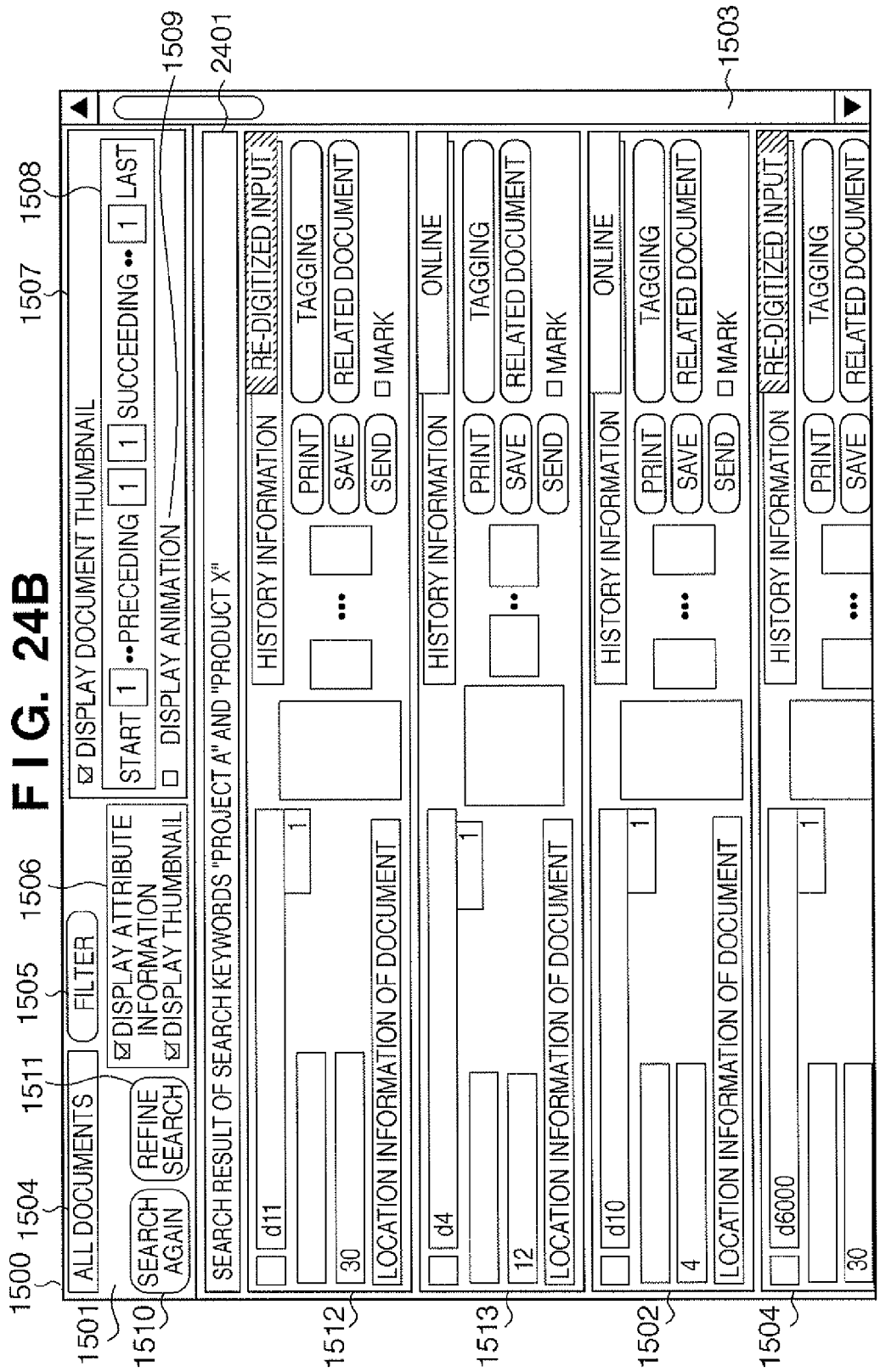

FIGS. 24A and 24B are views showing an example in which a re-digitized input document having metadata propagated via a plurality of estimated relations is hit high in search results in the second embodiment.

FIG. 24A depicts a view illustrating an example of inputting search keys to a document search window shown in FIG. 14B. The same reference numerals as those in FIG. 14B denote the same parts, and a description thereof will not be repeated.

The user selects "several keys included" with the search conditions radio button 1404, and designates to search for a document hit based on some of set search keys. A search keyword field 1419 displays keywords used for keyword search. In the search of FIG. 24A, two keywords "project A" and "product X" are designated.

FIG. 24B depicts a view illustrating an example of a window of a search result list displayed as a result of the search shown in FIG. 24A. FIG. 24B shows an example of the search result list display shown in FIG. 15 described above. The same reference numerals as those in FIG. 15 denote the same parts, and a description thereof will not be repeated.

A keyword search result label 2401 represents that documents displayed below the label 2401 are hit in a search. Each of search hit document displays 1512, 1513, 1514, and 1515 displays information corresponding to a document meeting a search condition. In a keyword search, an online document tends to be displayed high because the certainty factor of the keyword and content data is high. However, in a keyword search with a plurality of search keys designated, a re-digitized input document to which metadata and content data is propagated via a plurality of estimated relations is sometimes hit high. FIG. 24B shows this example. When the data structure in FIG. 22 is processed according to the sequence of FIG. 23 (this also applies to the data structure in FIG. 20), the re-digitized input document record instance d11 is displayed as the search hit document display 1512 higher than the document record instances d4 and d10.

The information processing apparatus 101 may execute the series of processes of the search sequence. A distributed application may also be configured to divide the series of processes into parts, arrange software programs performing the respective processes in a plurality of apparatuses, and execute the processes. For example, it is possible that the image processing apparatus 110 displays the search window and search result list and receives an instruction from a user, and the information processing apparatus 101, the server system 140 and the image processing apparatuses 120 and 130 execute the remaining processes. In contrast, it is possible that the information processing apparatus 101 displays the search window and search result list and receives an instruction from a user, and the image processing apparatus 110 and server system 140 execute the remaining processes. A known example of the distributed application is a Web application implemented by combining a Web browser and Web server.

As described above, according to the second embodiment, metadata and content data of a document record related to a re-digitized input document record are propagated to the re-digitized input document record. A re-digitized input document can be searched for based on the metadata and content data.

For example, in a keyword search with a plurality of search keys designated, even a document record having data propagated via a plurality of relations can be hit higher than a source document record. This feature is beneficial considering a case in which a series of paper documents is formed by printing a plurality of online documents and a re-digitized input document record is generated by copying the paper documents.

In the second embodiment, the "certainty factor" based on the relation type and type-specific degree of relation is also propagated in propagating metadata and content data. Data propagated via an estimated relation having a higher certainty factor more greatly influences the result of subsequent processing such as search. Accordingly, offline-input raster document data can be input online again to the document DB 202 to more properly comply with a human intellectual criterion. For example, when an online document and re-digitized input document are hit similarly in a search, the online document can be displayed higher in the search result list than the re-digitized input document based on an estimated relation. For example, a document hit in a search based on data propagated via an estimated relation having a higher certainty factor can be displayed higher in the search result list.

[Third Embodiment]

The third embodiment which performs document rank propagation of a re-digitized input document will be described. The hardware configurations of a system, image processing apparatus, and the like according to the third embodiment are the same as those in the first embodiment, and a description thereof will not be repeated.

It is well known that a method disclosed in the above-mentioned reference 6 is employed in the PageRank® technique available from Google, USA.

In a database formed from documents each containing a link to refer to another document, like Web, a reference to a document from another one is regarded as a popularity vote to the document, and the importance of the document is determined. A given document distributes its PageRank to documents referred to by the given document. The PageRank of a document referred to by many documents each having high PageRank increases. PageRank is exploited as a value indicating the importance of a document in, for example, display order control of search hit documents in a search engine.

Figure 25:
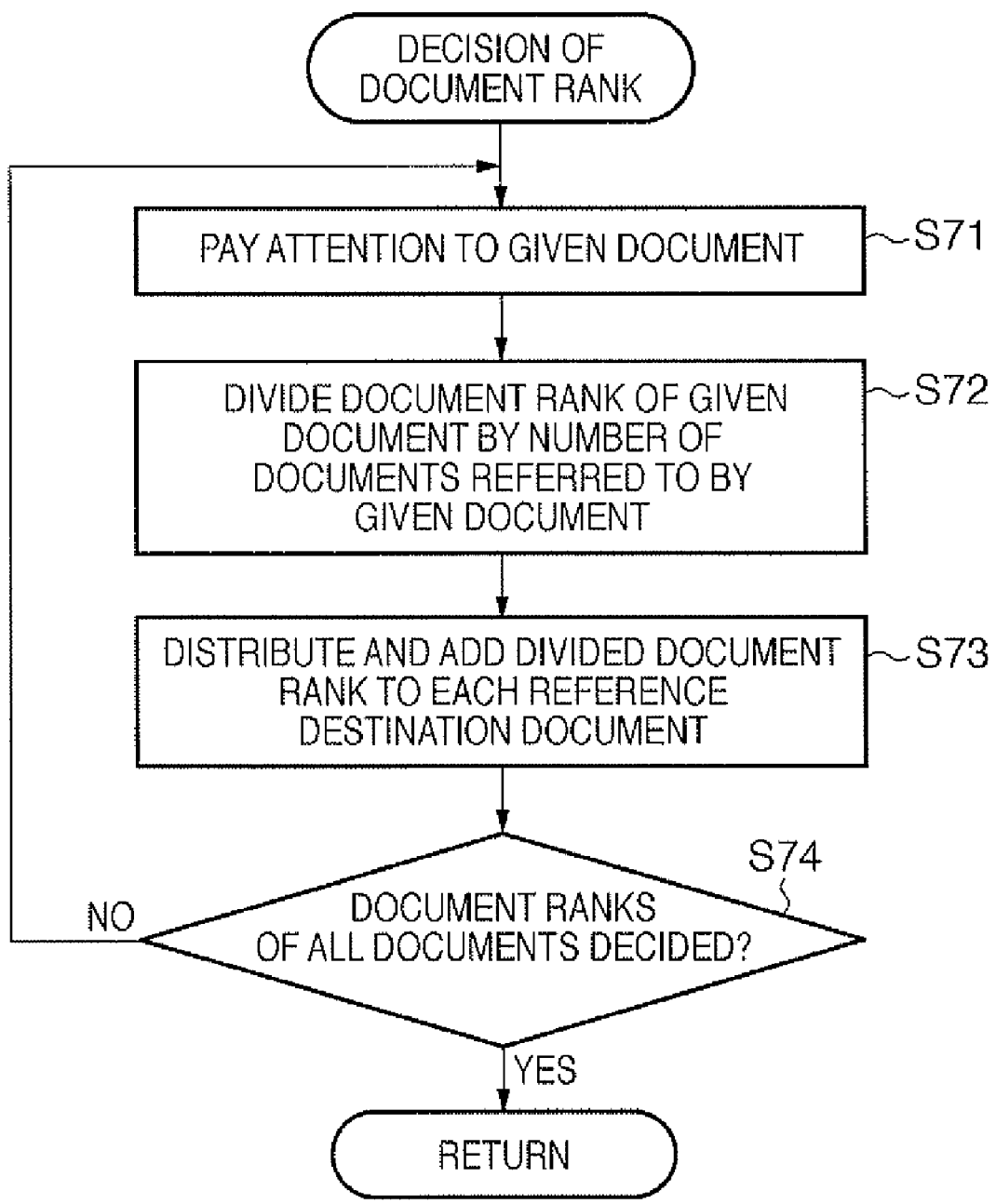
FIG. 25 is a flowchart describing processing to determine a document rank based on the cross-reference network of related documents according to a third embodiment.

FIG. 25 is a flowchart describing processing to determine a document rank based on the cross-reference network of related documents according to the third embodiment. For example, the CPU 301 of the image processing apparatus 110 executes this sequence as processing to manipulate a data structure in the DB management system 201 shown in FIG. 12.

A document rank in the third embodiment is a value held in the document record of the DB management system 201. The basic concept of the document rank is the same as the conventional PageRank technique, and the document rank is determined in accordance with the reference network relationship between documents. More specifically, a document referred to by a larger number of documents each with a higher document rank has a higher document rank.

In step S71, attention is paid to a given document. The process advances to step S72 to divide the document rank of the given document by the number of documents referred to by the given document. The process advances to step S73 to distribute and add the divided document rank to each reference destination document. The process advances to step S74 to determine whether or not the document ranks of all documents have been determined. If the document ranks of all documents have not been determined, the process returns to step S71 to execute the foregoing processing. If the document ranks of all documents have been determined, the process ends.

In an application of the third embodiment, as an index indicating the semantic importance of a document, the document rank is calculated totally from various kinds of information including the reference network relationship between documents. The document rank is based on importance explicitly assigned as metadata of a document. The document rank can also be calculated based on document attributes such as confidentiality, owner, author, save location, and page count. The document rank may be calculated based on the number and types of tags added later to a document, reference count, the reference relationship network of related documents, or the like. As for a document rank based on the cross-reference relationship network of related documents, a document referred to by a larger number of documents each with a high document rank has a high rank, like the above-described algorithm. A document having the history of simultaneous processing (that is, simultaneously printing, transmission, saving, retrieval, or job combination) with a document having a high document rank has a high rank. The document rank is calculated based on such a criterion.

Figure 26:
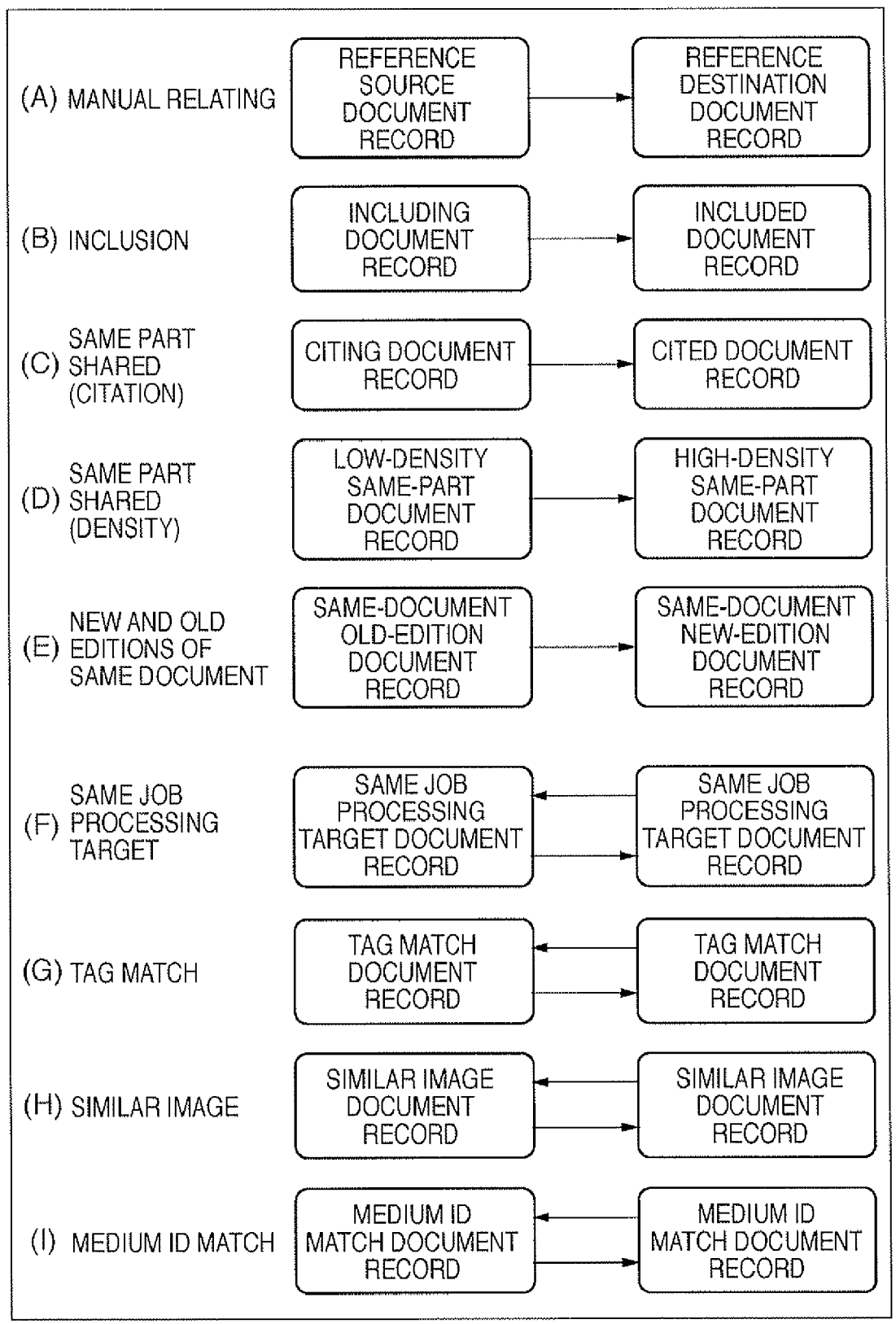
FIG. 26 depicts a view describing an example of propagation of the document rank based on a reference relationship corresponding to the relation type between document instances according to the third embodiment.

FIG. 26 depicts a view describing propagation of the document rank based on a reference relationship corresponding to the relation type between document instances according to the third embodiment.

Document records in the DB management system 201 propagate document ranks in accordance with the digraph of a reference relationship expressed by the relation record.

Relation type (A) is "manual relating". A document rank is propagated from a "reference source" document record to a "reference destination" document record.

Relation type (B) is "inclusion". A document rank is propagated from an "including" document record to an "included" document record.

Relation type (C) is "same part shared (citation)". A document rank is propagated from a "citing" document record to a "cited" document record.

Relation type (D) is "same part shared (density)". A document rank is propagated from a "low-density same part" document record to a "high-density same part" document record.

Relation type (E) is "new and old editions of the same document". A document rank is propagated from a "same-document old-edition" document record to a "same-document new-edition" document record.

Relation type (F) is "same job processing target". A document rank is propagated bidirectionally between "same job processing target" document records.

Relation type (G) is "tag match". A document rank is propagated bidirectionally between "tag match" document records.

Relation type (H) is "similar image". A document rank is propagated bidirectionally between "similar image" document records.

Relation type (I) is "medium ID match". A document rank is propagated bidirectionally between "medium ID match" document records.

Figure 27:
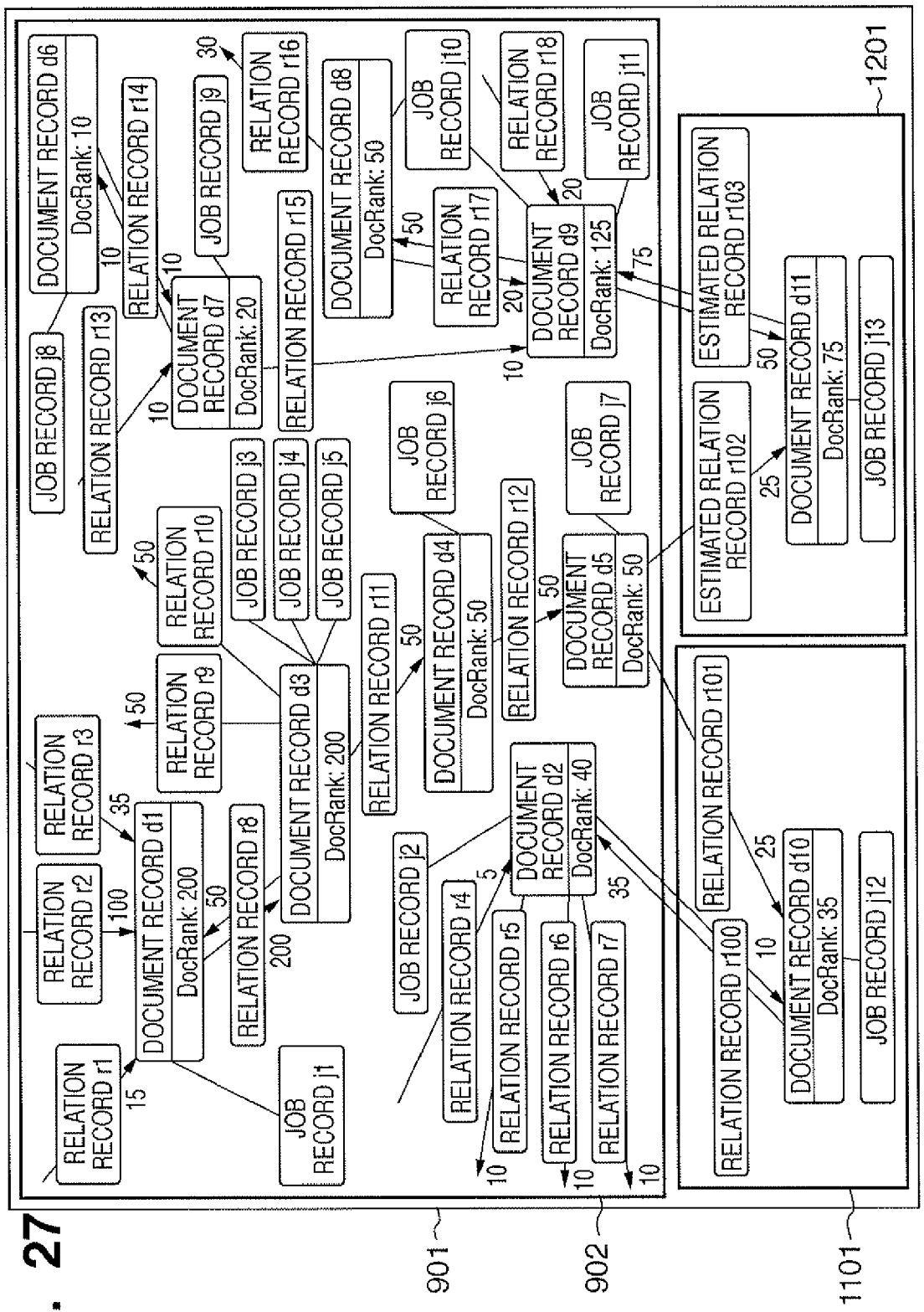
FIG. 27 is an instance relational diagram describing an example of propagation and determination of a document rank in a concrete data structure example of each database stored in a DB management system according to the third embodiment.

FIG. 27 depicts a view describing an instance relational diagram exemplifying propagation and determination of a document rank in a concrete data structure example of each database stored in the DB management system 201 according to the third embodiment. In FIG. 27, an arrow attached to each relation record instance indicates the direction of document rank propagation described with reference to FIG. 26. The same reference numerals as those in FIG. 12 of the first embodiment denote the same parts, and a description thereof will not be repeated.

A document record instance d1 receives distributions of a document rank DocRank from four relation records. More specifically, the document record instance d1 receives document rank distributions "15", "100", "35", and "50" via relation record instances r1, r2, r3, and r8. Hence, the document rank value of the document record instance d1 is "200", which is the sum of received distributions. The document record instance d1 supplies a document rank distribution via one relation record. More specifically, the document record instance d1 transfers the document rank "200" to a document record instance d3 via the relation record instance r8. The document record instance d3 receives a document rank distribution from one relation record instance. More specifically, the document record instance d3 receives the document rank "200" via the relation record instance r8. The document rank value of the document record instance d3 is "200", which is the sum of received distributions. The document record instance d3 supplies a document rank distribution via four relation record instances. The document rank distribution propagated from the document record instance d3 to each related document instance is "50". More specifically, the document record instance d3 transfers the document rank "50" to each of the document record instance d1 via the relation record instance r8, document records (not shown) via relation record instances r9 and r10, and a document record instance d4 via a relation record instance r11.

Similarly, a document rank specific to each document record is determine in accordance with the relationship of document rank propagation in the relation network.

A data structure 1201 is added by inputting raster document data by scanning or facsimile reception. Estimated relation record instances r102 and r103 are incorporated in the relation network which propagates a document rank, similar to the relation between online documents and that between code documents. As a result, an appropriate document rank is determined for a re-digitized input document record instance d11. Before adding the data structure 1201 upon input processing of raster document data by scanning or facsimile reception, no relation is found out between online document record instances d5 and d9 already present in the DB 202. However, the data structure 1201 is added to propagate the document ranks of the document record instances d5 and d9 via the document record instance d11. More proper document ranks can therefore be assigned to even online document record instances. In this example, a document rank distribution is propagated from the document record instance d5 to the document record instance d9 upon establishing relations with the document record instance d11, thereby increasing the document rank of the document record instance d9. That is, the value of the document record instance d9 is discovered again upon input processing of raster document data corresponding to the document record instance d11. A document corresponding to the document record instance d9 is evaluated high.

FIGS. 28A and 28B depict views describing a data representation using a table structure to represent relation information accompanied by propagation of document ranks recorded in the instances of relation records 811 by a document search application according to the third embodiment. The DB management system 201 manages the data representation to represent the document DB 202 in the data structure of FIG. 8. FIGS. 28A and 28B correspond to the instances exemplified in FIG. 27 and their relations. In FIGS. 28A and 28B, each row corresponds to information of a digraph from a reference source document to a reference destination document in a relation. Respective columns represent pieces of information of the relation ID, reference source document ID, reference destination document ID, relation type, and rank propagation. These pieces of information form a relation.

The relation ID is an ID for identifying each instance of the relation record 811 (FIG. 8). The reference source document ID and reference destination document ID are IDs for identifying the instances of document records 801. These rows describe a relation from a reference source document to a reference destination document. The relation type corresponds to a relation direction. The contents of the relation type have been explained with reference to FIG. 26. Rank propagation represents the presence/absence of document rank propagation in a relation direction. "1" indicates distributing a document rank from a reference source document to a reference destination document. "0" indicates distributing no document rank.

As described above, according to the third embodiment, the document rank is propagated according to the relation between an input document and a related document found from existing document records in the document DB 202 in offline input processing of raster document data obtained by scanning or facsimile reception. Consequently, a document rank representing the value of an offline-input document can be determined for the document record of the document.

When a relation with a re-digitized input document is newly stored, a new relation is generated between existing online document records in the document DB 202 that have not been related to each other before. As a result, the document rank of an existing online document can be calculated again more properly. In other words, offline input processing of raster document data can increase the document record calculation accuracy indicting an importance unique to each document record in the document DB 202.

According to the third embodiment, the document rank of a document can be increased based on processing performed for a given document or the cross-reference network of related documents. Consequently, the "Wisdom of Crowds" can be fully used. That is, the document rank of a document is automatically increased depending on the action of a user to raster document data obtained by paper scanning or facsimile reception. It can be determined that a frequently processed document (and a related online document) is important for a user regardless of whether the document is an electronic or paper document. The third embodiment can achieve the importance determination reflecting this trend in the real world much more. The third embodiment can provide a system which easily finds out a document the user wants more quickly by controlling the display order of the search result list or the like based on the document rank.

[Fourth Embodiment]

The fourth embodiment of the present invention will be described. The fourth embodiment improves the document rank in consideration of the processing contents of a job.

Figure 29:
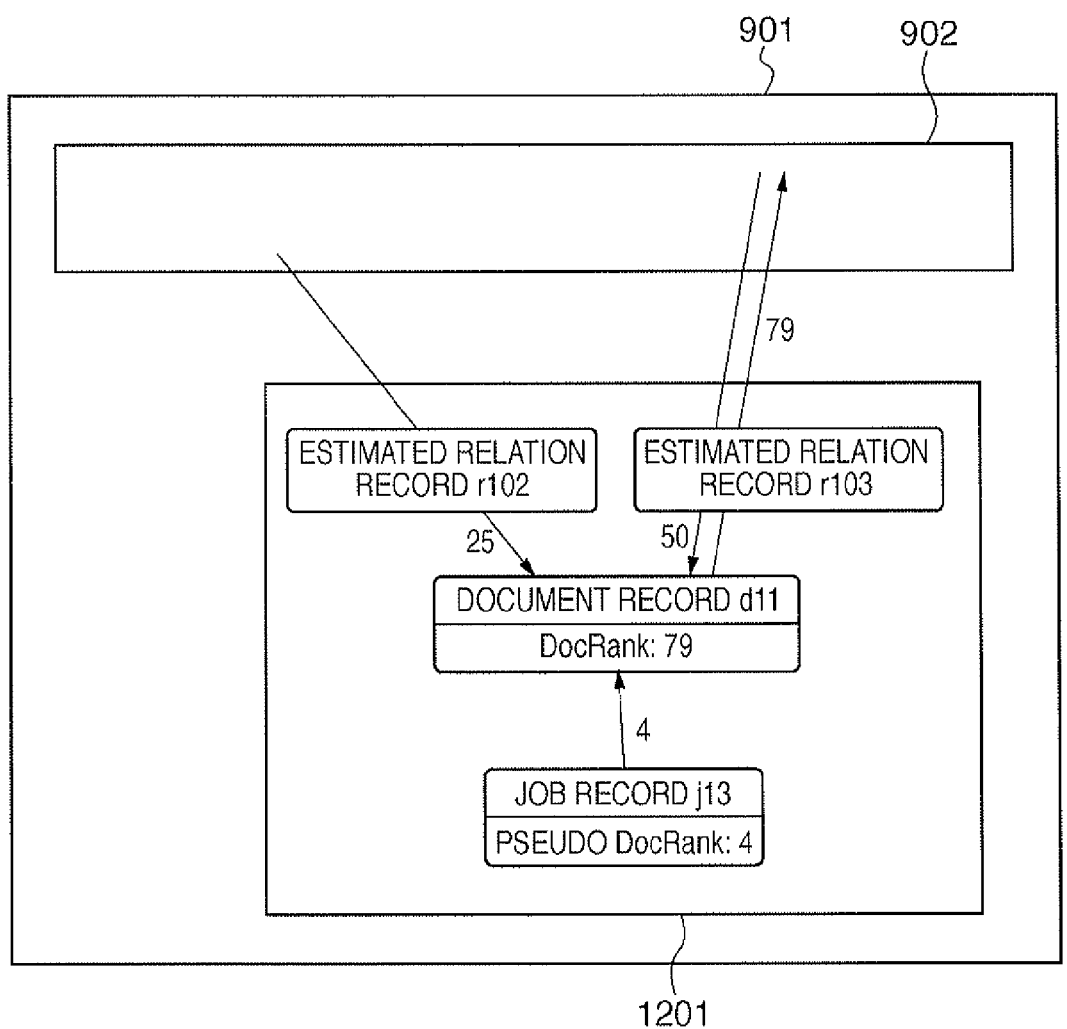
FIG. 29 is an instance relational diagram describing an example of propagation and determination of a document rank in consideration of a job record in a concrete data structure example of each database stored in a DB management system by a document search application according to a fourth embodiment.

FIG. 29 depicts a view describing an instance relational diagram exemplifying propagation and determination of a document rank in consideration of a job record in a concrete data structure example of each database stored in the DB management system 201 by a document search application according to the fourth embodiment. FIG. 29 corresponds to part of the instance relational diagram of FIG. 27. The same reference numerals as those in FIG. 27 denote the same parts, and a description thereof will not be repeated.

A job record instance j13 is one instance of a job record 808 (FIG. 8). The job record 808 corresponds to each document processing job executed by a user. The job record 808 according to the fourth embodiment records "pseudo DocRank" attribute data in addition to the attributes shown in FIG. 8 such as the date & time, operator, requesting apparatus, processing apparatus, processing contents, and processed document. A pseudo document rank "4" is assigned to the job record instance j13.

The pseudo DocRank data is a pseudo document rank determined in accordance with the attribute of a document processing job executed by a user. A pseudo document rank value is determined according to a predetermined algorithm (to be described later) designed to reflect the importance of a target document suggested by job processing. The pseudo document rank propagates through a document record instance network built in the DB management system 201 according to the same arrangement as that in the third embodiment.

The pseudo document rank "4" assigned to the job record instance j13 is propagated to a document record instance d11 referred to as the processing target document of the job record instance j13. If the job record targets a plurality of documents, the pseudo document rank value is distributed to the document records of the target documents. In document rank determination of the document record instance d11, the pseudo document rank "4" distributed from the job record instance j13 is handled equivalently to a document rank distributed from another document record, contributing to determining the document rank of the document record instance d11. In the example of FIG. 29, the document rank value of the document record instance d11 is determined to be "79" by adding the pseudo document rank "4" and document ranks "50" and "25" distributed from other document record instances. The document rank of the document record instance d11 to which the job record instance j13 contributes is propagated from the document to another one via a relation record representing the reference relationship from the document to the other one. In the example of FIG. 29, the document rank "79" influenced by the job record instance j13 is propagated to another document record via an estimated relation record instance r103.

Figure 30A:
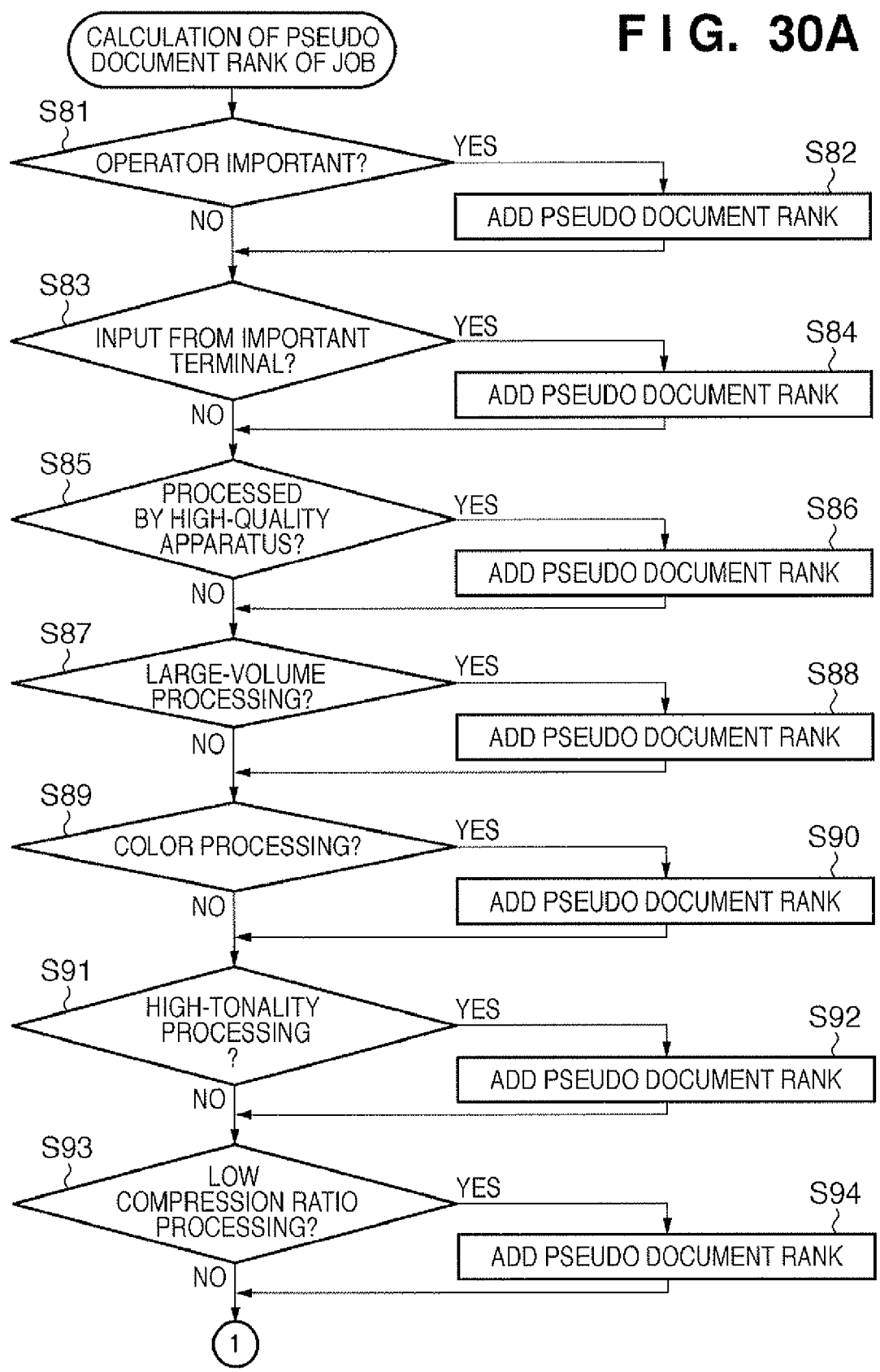
FIGS. 30A and 30B are flowcharts describing a sequence to determine a pseudo document rank value for a job record instance by the document search application according to the fourth embodiment.
Figure 30B:
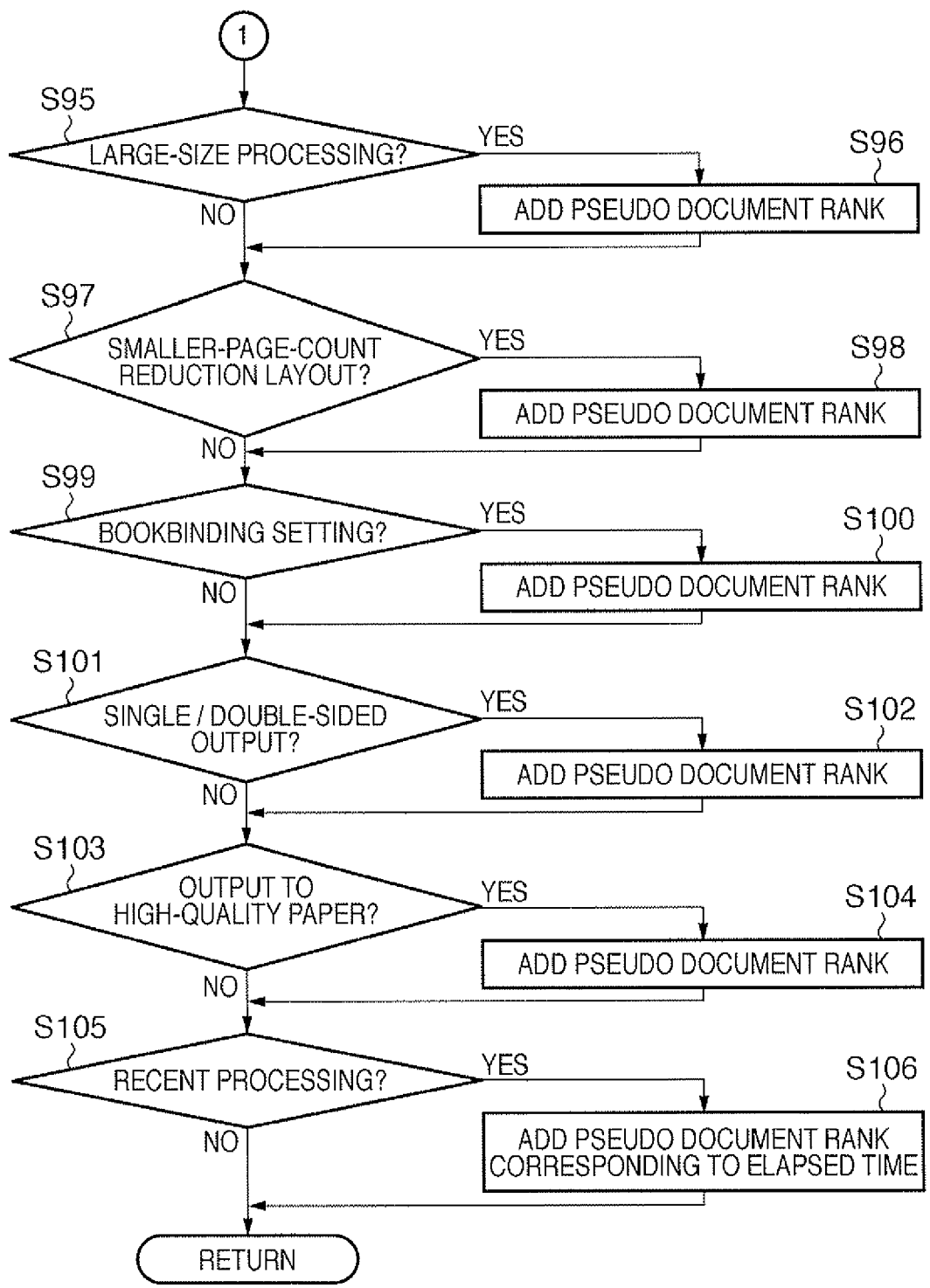

FIGS. 30A and 30B are flowcharts describing a sequence to determine a pseudo document rank value for a job record instance by the document search application according to the fourth embodiment. For example, the CPU 301 of the image processing apparatus 110 executes this sequence as processing to manipulate a data structure in the DB management system 201 shown in FIG. 12.

A pseudo document rank unique to a job record instance is determined to reflect the importance of a target document suggested by job processing. The pseudo document rank of a job record instance is determined as follows in accordance with the processing attribute of the job record 808, date & time, operator, requesting apparatus, processing apparatus, processing contents, processed document, and the like.

A high pseudo document rank is assigned to a job run by an operator in charge of handling important documents (steps S81 and S82). A higher pseudo document rank is assigned to a job, input of which was requested from a terminal apparatus managed to handle important documents (steps S83 and S84). A higher pseudo document rank is assigned to a job processed by a high-quality finishing apparatus than a job processed by a poor-quality draft confirmation apparatus (steps S85 and S86). A higher pseudo document rank is assigned to large-volume processing or long-term processing (steps S87 and S88). For example, a higher pseudo document rank is assigned to a large-volume copy job or large-volume send job.

A high pseudo document rank is assigned to a job such as scanning, printing, transmission, reception, or accumulation that was processed with the setting of a high-quality processing parameter. For example, a higher pseudo document rank is assigned to color processing than monochrome processing (steps S89 and S90). As for halftone processing, a higher pseudo document rank is assigned to processing of a high tonality (steps S91 and S92). A higher pseudo document rank is assigned to processing in which non-compression or lossless compression is designated than processing in which lossy compression is designated. Among lossy compression processes, a higher pseudo document rank is assigned to processing with a low compression ratio designated than processing with a high compression ratio designated (steps S93 and S94). A high pseudo document rank is assigned to a job in which a large size is set (steps S95 and S96). A higher pseudo document rank is assigned to a job set to assign a document page as one output page without designating a reduction layout than a job set to assign 2-up by a reduction layout. A higher pseudo document rank is assigned to a 2up job than a 4up job (steps S97 and S98). As for jobs accompanied by printing on paper, a higher pseudo document rank is assigned to a job having a bookbinding setting than a job having no bookbinding setting (steps S99 and S100). In a user environment where double-sided printing is recommended for paper cost reduction, a higher pseudo document rank is assigned to a double-sided print job than a single-sided print job. In a user environment where the reuse of the reverse of a printed sheet is recommended for paper cost reduction, a higher pseudo document rank is assigned to a double-sided print job than a single-sided print job (steps S101 and S102). A higher pseudo document rank is assigned to a job which designates a paper feed cassette or paper grade to feed higher-quality paper (steps S103 and S104). Further, a pseudo document rank is assigned depending on the elapsed time in accordance with the date & time attribute of job processing held in the job record 808 so that a job executed recently has a higher pseudo document rank than a job executed before (steps S105 and S106). The pseudo document rank determined based on this algorithm is variable depending on the calculation timing.

A pseudo document rank to be assigned to a job record instance can be calculated at a timing independent of execution of a corresponding job. A pseudo document rank can be calculated when a document rank and pseudo document rank need to be determined upon adding a document record or another job record. A pseudo document rank can also be calculated by regular or irregular batch processing.

FIG. 31 depicts a view illustrating an example of a window for displaying and manipulating information on a document related to an input document displayed on the console unit 112 of the image processing apparatus 110 according to the fourth embodiment. In this window example, a dialog window appears on the copy operation window of FIG. 7. The same reference numerals as those in FIG. 7 denote the same parts, and a description thereof will not be repeated.

A scan completion dialog window 3101 represents the completion of scan processing for copying. Related document information 3102 is a user interface area where information on a document related to a scanned input document is displayed to manipulate the related document. Related document summary information 3103 is a message character string representing various kinds of summary information derived by automatically analyzing and statistically processing document records 801 related to the input document. A case will be examined, in which an original document of a newer edition than a document serving as the original of an input document is found by analyzing the document records 801 related to the input document. In this case, a message suggesting the presence of a revised edition of the scanned document is displayed. In some cases, an input document is referred to by many related documents or subjected to many job processes (e.g., scanning, printing, sending, accumulation, and search) as a result of analyzing the document records 801 related to the input document. For example, when the document record 801 having many metadata (e.g., tags) is found, this is considered to suggest the presence of a document which may be more importance than a scanned document. Information representing the latest time when a job targeting a related document was executed is displayed as a result of analyzing the document records 801 related to an input document. Information representing the frequency at which a job targeting a related document was executed within a recent predetermined period is displayed as a result of analyzing the document records 801 related to an input document.

A related document display button 3104 is used to open a related document display window for displaying information of the document records 801 related to an input document. The related document display window has the same arrangement as that shown in FIG. 18, and displays a list of related documents. User friendliness of browsing can be enhanced by graphically displaying the semantic relation network of related documents as a network chart expressing a graph using documents as nodes and relations as arcs. A "close" button 3105 is used to close the scan completion dialog window 3101 and return to a previous window display.

As described above, according to the fourth embodiment, the pseudo document rank is calculated in accordance with information of job processing, and distributed to the document rank of a document record subjected to the job processing. The importance of the document can be calculated more appropriately in accordance with how the job was executed for the document. Especially in offline input processing of raster document data, like scanning of a paper document or facsimile reception, a document rank can be calculated in consideration of job information, similar to a job for a code document or online processing.

A document copied in high volume or a document copied carefully with high quality (and its related document) is important for a user. The fourth embodiment can implement importance determination reflecting this trend in the real world much more. The fourth embodiment can provide a system which easily finds out a document the user wants more quickly by controlling the display order of the search result list based on the document rank.

According to the fourth embodiment, the pseudo document rank is repetitively calculated in accordance with the time elapsed after executing job processing, and distributed to the document rank of a document record subjected to the job processing. The importance of the document can be calculated more appropriately in accordance with the job executed for the document. Related documents frequently copied, facsimile-received, accumulated in the box, or hit in a search recently are important for a user. The fourth embodiment can achieve importance determination reflecting this trend in the real world much more.

According to the fourth embodiment, when the user runs a variety of document processes in an image processing apparatus, the user can be notified of the presence of a document in the storage that is related to the target document. This allows the user to exploit the "Wisdom of Crowds". That is, the user can easily grasp the action of another user to the target document. For example, the user can easily grasp the latest version corresponding to an input document, the presence of a document drawing a greater deal of attention, or the degree of attention from another user to an input document.

[Other Embodiment]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

As described above, according to the embodiments, offline-input raster document data and metadata of processing executed for the document data can be related to document data and metadata which have already been registered in a database.

The embodiments can provide a document database system and image input apparatus capable of a more advance document data search by using metadata of document data in the storage that is related to raster document data when searching for the raster document data.

Also, the offline action of a user to raster document data can also be utilized to derive the "Wisdom of Crowds" from a semantic network formed by document data, metadata, and their relations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-256639, filed Oct. 1, 2008, which is hereby incorporated by reference herein in its entirety.

What is claimed is:

1. A document processing system comprising:
    a storage unit constructed to store plural items of document data, plural items of metadata pertaining to a content of each item of document data, and relation information representing relations between the plural items of document data;
    an input unit constructed to input image data;
    a specifying unit constructed to specify document data related to the image data input by the input unit among the plural items of document data stored in the storage unit; and
    a control unit constructed to control the storage unit to store relation information representing a relation between the image data input by the input unit and the related document data specified by the specifying unit, and to store metadata of the related document data specified by the specifying unit as metadata of the image data input by the input unit, wherein the storage unit is controlled to store the metadata of the related document data if a similarity of the image data input by the input unit and the related document data specified by the specifying unit is equal to or higher than a predetermined threshold,
    wherein the metadata of the related document data specified by the specifying unit is stored with a certainty factor based on the similarity, and
    wherein the certainty factor is calculated according to a predetermined algorithm based on a relation type and type-specific degree of relation.

2. The system according to claim 1, further comprising a reading unit constructed to read an image on a document to generate image data based on the image, wherein the input unit inputs the image data generated by the reading unit.

3. The system according to claim 1, wherein the input unit is able to input document data with metadata, and if the input unit inputs document data containing metadata, the specifying unit specifies document data related to input document data input by the input unit based on the metadata of the input document data and the plural items of metadata pertaining to a content of each item of document data stored in the storage unit.

4. The system according to claim 1, further comprising:
    a search unit constructed to search for document data stored in the storage unit; and a presentation unit constructed to present, based on the relation information, the document data found by the search unit and document data related to the found document data in correspondence with each other.

5. The system according to claim 1, further comprising a decision unit constructed to determine document ranks of the plural items of document data stored in the storage unit, based on the relation information.

6. The system according to claim 1, further comprising a notification unit constructed to notify presence of document data related to the input image data, in response to input of the image data by the input unit.

7. A method of controlling a document processing system having a storage unit constructed to store plural items of document data, plural items of metadata pertaining to a content of each item of document data, and relation information representing relations between the plural items of document data, the method comprising:

inputting image data;

specifying document data related to the input image data among the plural items of document data stored in the storage unit; and controlling the storage unit to store relation information representing a relation between the input image data and the specified related document data, and to store metadata of the specified related document data as metadata of the input image data, wherein the storage unit is controlled to store the metadata of the related document data if a similarity of the input image data and the specified related document data is equal to or higher than a predetermined threshold, wherein the metadata of the related document data specified by the specifying is stored with a certainty factor based on the similarity, and wherein the certainty factor is calculated according to a predetermined algorithm based on a relation type and type-specific degree of relation.

8. A computer-readable storage medium storing a program for causing a computer to execute a document processing system control method defined in claim 7.

* * * * *